US008892691B2

(12) United States Patent
Pantos et al.

(10) Patent No.: US 8,892,691 B2
(45) Date of Patent: Nov. 18, 2014

(54) REAL-TIME OR NEAR REAL-TIME STREAMING

(75) Inventors: Roger Pantos, Cupertino, CA (US); Alan Tseng, Baltimore, MD (US); William May, Jr., Sunnyvale, CA (US); James David Batson, Sunnyvale, CA (US)

(73) Assignee: Apple Inc., Cupertino, CA (US)

( * ) Notice: Subject to any disclaimer, the term of this patent is extended or adjusted under 35 U.S.C. 154(b) by 6 days.

(21) Appl. No.: 13/082,324

(22) Filed: Apr. 7, 2011

(65) Prior Publication Data

US 2011/0252118 A1 Oct. 13, 2011

Related U.S. Application Data

(60) Provisional application No. 61/321,767, filed on Apr. 7, 2010, provisional application No. 61/351,824, filed on Jun. 4, 2010.

(51) Int. Cl.
*G06F 15/16* (2006.01)
*G06F 17/30* (2006.01)
*H04L 29/06* (2006.01)

(52) U.S. Cl.
CPC ...... *G06F 17/30053* (2013.01); *H04L 65/4092* (2013.01); *H04L 65/607* (2013.01); *H04L 65/4084* (2013.01)
USPC .......................................................... 709/219

(58) Field of Classification Search
USPC .......................................................... 709/219
See application file for complete search history.

(56) References Cited

U.S. PATENT DOCUMENTS

| | | | |
|---|---|---|---|
| 5,065,396 | A | 11/1991 | Castellano et al. |
| 5,361,259 | A | 11/1994 | Hunt et al. |
| 5,493,514 | A | 2/1996 | Keith et al. |
| 5,550,982 | A | 8/1996 | Long et al. |
| 5,579,239 | A | 11/1996 | Freeman et al. |

(Continued)

FOREIGN PATENT DOCUMENTS

| | | |
|---|---|---|
| CA | 2 247 588 C | 9/1998 |
| DE | 102007041143 A1 | 3/2009 |

(Continued)

OTHER PUBLICATIONS

R. Pantos Ed., HTTP Live Streaming, May 1, 2009, Internet Engineering Task Force.*

(Continued)

*Primary Examiner* — Ario Etienne
*Assistant Examiner* — Blake Rubin
(74) *Attorney, Agent, or Firm* — Blakely, Sokoloff, Taylor & Zafman LLP

(57) ABSTRACT

Methods and apparatuses provide real-time or near real-time streaming of content, specified in one or more playlists, using transfer protocols such as an HTTP compliant protocol. In one embodiment, a method can execute a user application on a client device to present media files and to control presentation of the media files. The method can further run a media serving process on the client device to retrieve a playlist specifying the media files and a media source at which the media files are available, to retrieve the media files from the media source, and to decode the media files retrieved. The media serving process can call the user application to process a custom URL in order to obtain an object referred to by the custom URL.

38 Claims, 35 Drawing Sheets

(56) References Cited

U.S. PATENT DOCUMENTS

| | | |
|---|---|---|
| 5,583,859 A | 12/1996 | Feldmeier |
| 5,610,841 A | 3/1997 | Tanaka et al. |
| 5,613,032 A | 3/1997 | Cruz et al. |
| 5,627,936 A | 5/1997 | Prasad et al. |
| 5,663,951 A | 9/1997 | Danneels et al. |
| 5,668,948 A | 9/1997 | Belknap et al. |
| 5,719,786 A | 2/1998 | Nelson et al. |
| 5,751,951 A | 5/1998 | Osborne et al. |
| 5,751,968 A | 5/1998 | Cohen |
| 5,778,374 A | 7/1998 | Dang et al. |
| 5,805,823 A | 9/1998 | Seitz |
| 5,819,160 A | 10/1998 | Foladare et al. |
| 5,821,986 A | 10/1998 | Yuan et al. |
| 5,835,495 A | 11/1998 | Ferriere |
| 5,867,230 A | 2/1999 | Wang et al. |
| 5,892,915 A | 4/1999 | Duso et al. |
| 5,928,330 A | 7/1999 | Goetz et al. |
| 5,933,603 A | 8/1999 | Vahalia et al. |
| 5,938,734 A | 8/1999 | Yao et al. |
| 5,956,716 A | 9/1999 | Kenner et al. |
| 5,974,503 A | 10/1999 | Venkatesh et al. |
| 5,987,510 A | 11/1999 | Imai et al. |
| 5,996,015 A | 11/1999 | Day et al. |
| 6,014,694 A | 1/2000 | Aharoni et al. |
| 6,032,193 A | 2/2000 | Sullivan |
| 6,151,632 A | 11/2000 | Chaddha et al. |
| 6,173,328 B1 | 1/2001 | Sato |
| 6,292,834 B1 | 9/2001 | Ravi et al. |
| 6,377,995 B2 | 4/2002 | Agraharam et al. |
| 6,385,596 B1 | 5/2002 | Wiser et al. |
| 6,389,473 B1 | 5/2002 | Carmel et al. |
| 6,625,750 B1 | 9/2003 | Duso et al. |
| 6,847,778 B1 | 1/2005 | Vallone et al. |
| 6,925,495 B2 | 8/2005 | Hegde et al. |
| 6,990,497 B2 | 1/2006 | O'Rourke et al. |
| 7,020,710 B2 | 3/2006 | Weber et al. |
| 7,039,784 B1 | 5/2006 | Chen et al. |
| 7,113,983 B1 | 9/2006 | Terada et al. |
| 7,260,564 B1 | 8/2007 | Lynn et al. |
| 7,272,296 B2 | 9/2007 | Mears et al. |
| 7,287,083 B1 | 10/2007 | Nay et al. |
| 7,290,058 B2 | 10/2007 | Zhu et al. |
| 7,308,717 B2 * | 12/2007 | Koved et al. .............. 726/27 |
| 7,318,017 B2 | 1/2008 | Swoboda |
| 7,334,016 B2 | 2/2008 | Fishhaut et al. |
| 7,349,663 B1 | 3/2008 | Joseph |
| 7,434,154 B2 | 10/2008 | Konetski |
| 7,471,834 B2 | 12/2008 | Sull et al. |
| 7,484,103 B2 * | 1/2009 | Woo et al. .............. 713/189 |
| 7,496,643 B2 | 2/2009 | O'Rourke et al. |
| 7,590,656 B2 | 9/2009 | Plastina et al. |
| 7,647,297 B2 | 1/2010 | LaChapelle et al. |
| 7,664,872 B2 | 2/2010 | Osborne et al. |
| 7,680,824 B2 | 3/2010 | Plastina et al. |
| 7,721,103 B2 * | 5/2010 | Risan et al. .............. 713/176 |
| 7,730,420 B1 | 6/2010 | Miller et al. |
| 7,769,829 B1 | 8/2010 | Riggs et al. |
| 7,917,557 B2 | 3/2011 | Shteyn et al. |
| 7,987,490 B2 | 7/2011 | Ansari et al. |
| 8,099,473 B2 | 1/2012 | Biderman et al. |
| 8,099,476 B2 | 1/2012 | Biderman et al. |
| 8,156,089 B2 | 4/2012 | Pantos et al. |
| 8,176,058 B2 | 5/2012 | Ott |
| 8,180,645 B2 | 5/2012 | Johnson et al. |
| 8,265,140 B2 | 9/2012 | Mehrotra |
| 8,275,709 B2 * | 9/2012 | Wang et al. .............. 705/40 |
| 8,275,880 B2 | 9/2012 | Allard et al. |
| 8,321,042 B2 | 11/2012 | Nagayama |
| 8,327,013 B2 | 12/2012 | McGowan et al. |
| 8,341,662 B1 | 12/2012 | Bassett et al. |
| 8,359,007 B2 | 1/2013 | White et al. |
| 8,364,296 B2 | 1/2013 | Wilhelm |
| 8,375,137 B2 | 2/2013 | Bowman |
| 8,386,306 B2 | 2/2013 | Lapcevic |
| 8,392,600 B2 | 3/2013 | Outlaw |
| 8,452,855 B2 | 5/2013 | Higgins et al. |
| 8,510,555 B2 | 8/2013 | Tam |
| 8,527,877 B2 | 9/2013 | Wohlert |
| 8,532,464 B2 | 9/2013 | Randall |
| 8,544,050 B2 | 9/2013 | Brown et al. |
| 8,554,880 B2 | 10/2013 | Shishido et al. |
| 8,584,175 B2 | 11/2013 | Nathan et al. |
| 8,588,680 B2 | 11/2013 | White et al. |
| 8,589,332 B2 | 11/2013 | Brooks et al. |
| 2002/0007418 A1 | 1/2002 | Hegde et al. |
| 2002/0029166 A1 | 3/2002 | Jacobs et al. |
| 2002/0037151 A1 | 3/2002 | Goto et al. |
| 2002/0046315 A1 | 4/2002 | Miller et al. |
| 2002/0057287 A1 | 5/2002 | Crow et al. |
| 2002/0069218 A1 | 6/2002 | Sull et al. |
| 2002/0083182 A1 | 6/2002 | Alvarado et al. |
| 2002/0120675 A1 | 8/2002 | Everett et al. |
| 2002/0147634 A1 | 10/2002 | Jacoby et al. |
| 2002/0177914 A1 | 11/2002 | Chase |
| 2003/0061305 A1 | 3/2003 | Copley et al. |
| 2003/0068046 A1 | 4/2003 | Lindqvist et al. |
| 2003/0093790 A1 | 5/2003 | Logan et al. |
| 2003/0186645 A1 | 10/2003 | Mori |
| 2003/0195940 A1 | 10/2003 | Basu et al. |
| 2004/0003268 A1 * | 1/2004 | Bourne et al. .............. 713/193 |
| 2004/0078812 A1 | 4/2004 | Calvert |
| 2004/0083273 A1 | 4/2004 | Madison et al. |
| 2004/0086120 A1 | 5/2004 | Akins et al. |
| 2004/0123725 A1 | 7/2004 | Kim |
| 2004/0231004 A1 | 11/2004 | Seo |
| 2004/0250293 A1 | 12/2004 | Ryal et al. |
| 2004/0254887 A1 * | 12/2004 | Jacoby .............. 705/52 |
| 2004/0260835 A1 | 12/2004 | Welk et al. |
| 2004/0268224 A1 | 12/2004 | Balkus et al. |
| 2005/0005025 A1 | 1/2005 | Harville et al. |
| 2005/0080876 A1 | 4/2005 | Peiffer et al. |
| 2005/0097057 A1 * | 5/2005 | DeMello et al. .............. 705/57 |
| 2005/0105894 A1 | 5/2005 | Jung et al. |
| 2005/0108320 A1 | 5/2005 | Lord et al. |
| 2005/0203917 A1 | 9/2005 | Freeberg et al. |
| 2005/0262251 A1 | 11/2005 | Klemets et al. |
| 2006/0020609 A1 | 1/2006 | LaChapelle et al. |
| 2006/0093318 A1 | 5/2006 | Cohen et al. |
| 2006/0143667 A1 | 6/2006 | Kurosawa |
| 2006/0153537 A1 | 7/2006 | Kaneko et al. |
| 2006/0195479 A1 | 8/2006 | Spiegelman et al. |
| 2006/0265503 A1 | 11/2006 | Jones et al. |
| 2007/0005428 A1 | 1/2007 | Jacobs et al. |
| 2007/0016865 A1 | 1/2007 | Johnson et al. |
| 2007/0038728 A1 | 2/2007 | Jacobs et al. |
| 2007/0081669 A1 | 4/2007 | Takashima et al. |
| 2007/0088804 A1 | 4/2007 | Qureshey et al. |
| 2007/0101163 A1 | 5/2007 | Ando et al. |
| 2007/0136679 A1 | 6/2007 | Yang |
| 2007/0162611 A1 | 7/2007 | Yu et al. |
| 2007/0198515 A1 | 8/2007 | Ando et al. |
| 2007/0214182 A1 | 9/2007 | Rosenberg |
| 2007/0233784 A1 | 10/2007 | O'rourke et al. |
| 2007/0274672 A1 | 11/2007 | Itoi |
| 2007/0282905 A1 | 12/2007 | Karlberg |
| 2008/0008439 A1 | 1/2008 | Liu et al. |
| 2008/0008447 A1 | 1/2008 | Iwase et al. |
| 2008/0010648 A1 | 1/2008 | Ando et al. |
| 2008/0045804 A1 | 2/2008 | Williams |
| 2008/0056075 A1 * | 3/2008 | Kalis .............. 369/30.05 |
| 2008/0059532 A1 | 3/2008 | Kazmi et al. |
| 2008/0060029 A1 | 3/2008 | Park et al. |
| 2008/0075437 A1 | 3/2008 | Hamada et al. |
| 2008/0091717 A1 | 4/2008 | Garbow et al. |
| 2008/0101762 A1 | 5/2008 | Kellock et al. |
| 2008/0109888 A1 * | 5/2008 | Ullah .............. 726/7 |
| 2008/0133603 A1 * | 6/2008 | Fischer et al. .............. 707/104.1 |
| 2008/0133701 A1 | 6/2008 | Kazmi et al. |
| 2008/0134236 A1 | 6/2008 | Iijima et al. |
| 2008/0140720 A1 * | 6/2008 | Six et al. .............. 707/104.1 |
| 2008/0147826 A1 | 6/2008 | Velusamy et al. |
| 2008/0159715 A1 | 7/2008 | Fuasaro et al. |
| 2008/0195743 A1 | 8/2008 | Brueck et al. |
| 2008/0209066 A1 | 8/2008 | Spio et al. |

(56) References Cited

U.S. PATENT DOCUMENTS

| | | |
|---|---|---|
| 2008/0235566 A1 | 9/2008 | Carlson et al. |
| 2008/0250319 A1 | 10/2008 | Lee et al. |
| 2008/0256129 A1 | 10/2008 | Salinas et al. |
| 2008/0270308 A1 | 10/2008 | Peterka et al. |
| 2008/0301317 A1 | 12/2008 | Lee et al. |
| 2009/0106202 A1 | 4/2009 | Mizrahi |
| 2009/0138513 A1 | 5/2009 | Wen et al. |
| 2009/0144258 A1 | 6/2009 | Taylor |
| 2009/0157731 A1 | 6/2009 | Zigler et al. |
| 2009/0157899 A1 | 6/2009 | Gagliardi et al. |
| 2009/0177792 A1 | 7/2009 | Guo et al. |
| 2009/0249222 A1 | 10/2009 | Schmidt et al. |
| 2009/0287841 A1 | 11/2009 | Chapweske et al. |
| 2009/0319899 A1 | 12/2009 | Moon et al. |
| 2010/0030908 A1 | 2/2010 | Courtemanche et al. |
| 2010/0040349 A1 | 2/2010 | Landy |
| 2010/0057928 A1 | 3/2010 | Kapoor et al. |
| 2010/0077095 A1* | 3/2010 | Wong et al. ............ 709/231 |
| 2010/0115123 A1 | 5/2010 | Airamo |
| 2010/0119208 A1* | 5/2010 | Davis et al. ............ 386/83 |
| 2010/0135637 A1 | 6/2010 | McDermott et al. |
| 2010/0161825 A1 | 6/2010 | Ronca et al. |
| 2010/0169303 A1 | 7/2010 | Biderman et al. |
| 2010/0169453 A1 | 7/2010 | Biderman et al. |
| 2010/0169458 A1 | 7/2010 | Biderman et al. |
| 2010/0169459 A1 | 7/2010 | Biderman et al. |
| 2010/0185891 A1 | 7/2010 | Basso |
| 2010/0235472 A1 | 9/2010 | Sood et al. |
| 2010/0274674 A1 | 10/2010 | Roberts et al. |
| 2010/0281042 A1* | 11/2010 | Windes et al. ............ 707/756 |
| 2010/0281178 A1 | 11/2010 | Sullivan |
| 2011/0022471 A1 | 1/2011 | Brueck et al. |
| 2011/0072105 A1 | 3/2011 | Biderman et al. |
| 2011/0080940 A1 | 4/2011 | Bocharov et al. |
| 2011/0082924 A1 | 4/2011 | Gopalakrishnan |
| 2011/0082946 A1 | 4/2011 | Gopalakrishnan |
| 2011/0096828 A1 | 4/2011 | Chen et al. |
| 2011/0116764 A1 | 5/2011 | Ramamurthy et al. |
| 2011/0116772 A1 | 5/2011 | Kwon et al. |
| 2011/0119394 A1 | 5/2011 | Wang et al. |
| 2011/0125918 A1 | 5/2011 | Ha et al. |
| 2011/0150437 A1 | 6/2011 | Kim |
| 2011/0173345 A1 | 7/2011 | Knox et al. |
| 2011/0202641 A1* | 8/2011 | Kahn et al. ............ 709/221 |
| 2011/0214061 A1* | 9/2011 | King et al. ............ 715/736 |
| 2011/0231660 A1* | 9/2011 | Kanungo ............ 713/168 |
| 2011/0246616 A1* | 10/2011 | Ronca et al. ............ 709/219 |
| 2011/0246621 A1 | 10/2011 | May et al. |
| 2011/0246623 A1 | 10/2011 | Pantos et al. |
| 2011/0246661 A1* | 10/2011 | Manzari et al. ............ 709/231 |
| 2011/0295974 A1* | 12/2011 | Kashef et al. ............ 709/217 |
| 2011/0307623 A1 | 12/2011 | George et al. |
| 2012/0110120 A1 | 5/2012 | Willig et al. |
| 2012/0124179 A1 | 5/2012 | Cappio et al. |
| 2012/0144195 A1* | 6/2012 | Nair et al. ............ 713/168 |
| 2012/0144445 A1 | 6/2012 | Bonta et al. |
| 2012/0173751 A1 | 7/2012 | Braness et al. |
| 2012/0232681 A1 | 9/2012 | Mundy et al. |
| 2012/0233345 A1 | 9/2012 | Hannuksela |
| 2012/0239661 A1* | 9/2012 | Giblin ............ 707/741 |
| 2012/0259946 A1 | 10/2012 | Stockhammer et al. |
| 2012/0271688 A1 | 10/2012 | Jaouen et al. |
| 2012/0278449 A1 | 11/2012 | Wu et al. |
| 2012/0284804 A1* | 11/2012 | Lindquist et al. ............ 726/29 |
| 2012/0290644 A1 | 11/2012 | Gabin et al. |
| 2012/0297423 A1* | 11/2012 | Kanojia et al. ............ 725/48 |
| 2012/0315009 A1* | 12/2012 | Evans et al. ............ 386/230 |
| 2012/0317303 A1 | 12/2012 | Wang |
| 2012/0323917 A1 | 12/2012 | Mercer et al. |
| 2012/0324058 A1 | 12/2012 | Biderman et al. |
| 2013/0024539 A9 | 1/2013 | Khedouri et al. |
| 2013/0031165 A1 | 1/2013 | Pantos et al. |
| 2013/0117335 A1 | 5/2013 | Jellison et al. |
| 2013/0124994 A1 | 5/2013 | Chen et al. |
| 2013/0173745 A1 | 7/2013 | Biderman |
| 2013/0216053 A1 | 8/2013 | Disch |
| 2013/0297652 A1 | 11/2013 | Higgins et al. |
| 2013/0325628 A1 | 12/2013 | White et al. |
| 2013/0336635 A1 | 12/2013 | Randall |

FOREIGN PATENT DOCUMENTS

| | | |
|---|---|---|
| EP | 0 614 317 A2 | 2/1994 |
| EP | 0 720 374 A1 | 12/1994 |
| EP | 0 680 185 A2 | 4/1995 |
| EP | 0 762 300 A2 | 9/1996 |
| EP | 0 827 336 A2 | 8/1997 |
| EP | 0 859 535 A2 | 2/1998 |
| EP | 0984584 A1 | 3/2000 |
| EP | 1 056 093 A1 | 11/2000 |
| EP | 1 117 047 A1 | 7/2001 |
| EP | 1113642 A2 | 7/2001 |
| EP | 1 158 799 A1 | 11/2001 |
| EP | 1427218 A2 | 6/2004 |
| EP | 1 737 182 A2 | 12/2006 |
| GB | 2 400 531 A | 10/2004 |
| JP | 2000151595 | 5/2000 |
| JP | 2006-352663 | 12/2006 |
| JP | 2007-158414 | 6/2007 |
| KR | 1020080038655 | 5/2008 |
| RU | 2 272 318 C2 | 3/2006 |
| TW | 200950406 A1 | 12/2009 |
| WO | WO 97/12447 | 4/1997 |
| WO | WO 97/17775 | 5/1997 |
| WO | WO 97/30551 | 8/1997 |
| WO | WO 98/44733 | 3/1998 |
| WO | WO 01/38993 A1 | 5/2001 |
| WO | WO01/67753 A | 9/2001 |
| WO | WO 02/057943 A1 | 7/2002 |
| WO | WO 03/023781 A1 | 3/2003 |
| WO | WO 03/025933 A1 | 3/2003 |
| WO | WO 2005/004485 | 1/2005 |
| WO | WO 2005/091161 A1 | 9/2005 |
| WO | WO2006/007651 A1 | 1/2006 |
| WO | WO 2007/028081 A2 | 3/2007 |
| WO | WO 2007/078394 A2 | 7/2007 |
| WO | WO2007/111312 A1 | 10/2007 |
| WO | WO 2008/058257 A2 | 5/2008 |
| WO | WO 2008/058259 A2 | 5/2008 |
| WO | WO 2008/081415 A2 | 7/2008 |
| WO | WO 2010/078281 A2 | 7/2010 |

OTHER PUBLICATIONS

Paolillo et al., "The Social Structure of tagging Internet Video on del.icio.us", 40th Hawaii International Conference on System Sciences, 2007, Jan. 1, 2007 (pp. 1-10).

Gebhard et al., "Virtual Internet Broadcasting", IEEE Communications Magazine, vol. 39, No. 6, Jun. 1, 2001, (pp. 182-188).

Jensen et al., "A Data and Query Model for Dynamic Playlist Generation", Data Engineering Workshop, 2007 IEEE 23rd Int'l Conference, Apr. 1, 2007, ( pp. 65-74).

Lee et al., "A Scalable Video Codec Design for Streaming Over Distributed Peer to Peer Network", vol. 1, Globecom '02, IEEE Global Telecommunications Conference, Nov. 17, 2002, (pp. 539-543).

Zhang et al., "Profile Based Focused Crawler for Social Media Sharing Websites", 20th IEEE Int'l Conference on Tools with Artificial Intelligence, Nov. 3, 2008, ( pp. 317-324).

Pantos, R., "HTTP Live Streaming", May 1, 2009, (pp. 1-17), located on the internet, http://tools.ietf.org/html/draft-pantos-http-live-streaming-00.

PCT Notification of Transmittal of the International Search Report and the Written Opinion of the International Searching Authority, or the Declaration, mailed Nov. 26, 2010, ( 40 Pages).

RFC 1951—Deutsch, P., "Deflate Compressed Data Format Specification Version 1.3", Network Working Group, May 1996, http://www.ietf.org/rfc/rfc1951.txt.

RFC 1952—Deutsch, P., "GZIP File Format Specification Version 4.3", Network Working Group, May 1996, http://www.ietf.org/rfc/rfc1952.txt.

(56) References Cited

OTHER PUBLICATIONS

RFC 2046—Freed, N., et al., "Multipurpose Internet Mail Extensions (MIME) Part Two: Media Types", Network Working Group, Nov. 1996.
RFC 2119—Bradner, S., "Key words for use in RFCs to Indicate Requirements Levels", Network Working Group, Mar. 1997.
RFC 2279—Yergeau, F., "UTF-8, a transformation format of Unicode and ISO-10646", Network Working Group, Jan. 1998.
RFC 2396—Berners-Lee, T., et al., "Uniform Resource Identifiers (URI): Generic Syntax and Semantics", Network Working Group, Aug. 1998.
RFC 2616—Fielding, R., et al., "Hypertext Transfer Protocol—HTTP/1.1", Network Working Group, Jun. 1999.
RFC 2964—Moore, K., et al., "Use of HTTP State Management", Network Working Group, Oct. 2000.
RFC 2965—Kristol, D., et al., "HTTP State Management Mechanism", Network Working Group, Oct. 2000.
RFC 3629—Yergeau, F., "UTF-8, a transformation format of ISO 10646", Network Working Group, Nov. 2003.
RFC 3852—Housley, R., "Cryptographic Message Syntax (CMS)", Network Working Group, Jul. 2004.
RFC 3986—Berners-Lee, T., et al., "Uniform Resource Identifier (URI): Generic Syntax", Network Working Group, Jan. 2005.
RFC 4281—Gellens, R., et al., "The Codecs Parameter for 'Bucket' Media Types", Network Working Group, Nov. 2005.
RFC 5246—Dierks, T., et al., "The Transport Layer Security (TLS) Protocol Version 1.2", Network Working Group, Aug. 2008.
RFC 5652—Housley, R., "Cryptographic Message Syntax (CMS)", Network Working Group, Sep. 2009.
ISO 8601—International Organization for Standardization, "ISO 8601:2004: Data elements and interchange formats—Information interchange—Representation of dates and times", 40 pages, Dec. 2004.
AES 128—U.S. Department of Commerce / National Institute of Standards and Technology, "Advanced Encryption Standard (AES)", Federal Information Processing Standards Publication 197, http://csrc.nist.gov/publications/fips/fips197/fips-197.pdf, Nov. 26, 2001.
M3U—Nullsoft, Inc., "The M3U Playlist format, originally invented for the Winamp media player", http:wikipedia.org/wiki/M3U.
ID3—id3.org, "The ID3 audio file data tagging format", http:www.id3.org/Developer_Information.
US ASCII—American National Standards Institute, "ANSI X3.4-1986, Information Systems—Coded Character Sets 7-Bit American National Standard Code for Information Interchange (7-Bit-ASCII)", Dec. 1986.
PCT Invitation to Pay Additional Fees and, where applicable, Protest Fee for PCT/US2009/069624 containing Communication relating to the Results of the Partial International Search, Jul. 20, 2010, 7 pages.
Shahin, "Streaming over HTTP with JavaScript: AJAX video player", http://www.codeproject.com/kb/Ajax/AJAXVideoPlayer.aspx, Oct. 24, 2006, 8 pages, XP 002583453.
Slein, J., et al., "WebDAV Ordered Collections Protocol", Network Working Group, Feb. 28, 2003, 43 pages, XP 15029917.
Hydrogenaudio, "Request: Playlist Compression", http://www.hydrogenaudio.org/forums, Apr. 3 and Apr. 5, 2004, 2 pages.
PCT International Search Report and Written Opinion of the International Searching Authority, PCT/US2011/031623, mailed May 27, 2011.
PCT International Search Report and Written Opinion of the International Searching Authority, PCT/US2009/069624, mailed Nov. 26, 2010.
PCT International Search Report and Written Opinion of the Searching Authority for PCT/US2012/020837, mailed May 31, 2012, (12 pgs.).
PCT International Search Report and Written Opinion of the International Searching Authority, PCT/US2011/031000, mailed Jul. 15, 2011.
PCT Invitation to Pay Additional Fees and, Where Applicable, Protest Fee, for PCT/US2012/040027, mailed Jul. 17, 2012.

Web Based Programming Tutorials, Web Programming Unleashed, Bob Breedlove, et al., 1996.
Antonio Miguel Ferreira, VDOlive Technology, Chapter 31, http://www.podgoretsky.com/ftp/docs/Internet/Web%20Programming%20Unleashed/ch31.htm#CONTENTS, downloaded Sep. 13, 2011.
Fabio Kon et al., "A Component-Based Architecture for Scalable Distributed Multimedia", In Proceedings of the 14th International Conference on Advanced Science and Technology (ICAST'98), pp. 121-135, Lucent Technologies, Naperville, Apr. 1998.
Codec Central, VDOLive, 1995-98 Terran Interactive, Inc., makers of Media Cleaner Pro.
Jane Hunter et al., SuperNOVA Project, DSTC Technical Report TR97-10, Aug. 1997.
Article: America Online Chooses VDOLive; Showcasing Internet Video and to be Available to All AOL Members, Mar. 13, 1997.
Haakon Bryhni et al., On-demand Regional Television over the Internet, From Proceedings of the Fourth ACM International Multimedia Cofnerence, Nov. 18-22, 1996, Boston, USA.
Olav Sandsta et al., "Design and Implementation of the Elvira Video Server", pp. 259-270. Proceedings of Norsk Informatikkonferanse 1996, pp. 259-270, Nov. 18-20, 1996.
Brett Atwood, "Video 'Netcasting' Is Making Strides Online", The Enter*Active File, Billboard Mar. 2, 1996.
VDOLive, Plug-Ins, Sep. 1997, vol. 5 Issue 9.
VDOLive Servers, Server Updates, VDOLive Servers, Version 3.02, Feb. 5, 1998.
Gus Venditto, Instant Video, Waiting for video files to download becomes virtually a thing of the past, Internet World magazine, Vo. 7, No. 11, (c) 1996, Mecklermedia Corporation.
John F. McGowan, Ph.D., AVI Overview, 1996-1999, http://www.rahul.net/jfm/.
Navin Chaddha et al., "An End to End Software Only Scalable Video Delivery System", Proceedings of the 5th International Conference on Network and Operating System Support for Digital Audio and Video, Durahm, NH, Apr. 1995, pp. 1-12, also in Lecture Notes in Computer Science, T. Little and R. Gusella (Eds), vol. 1018.
Kien A. Hua et al., Skyscraper Broadcasting: A New Broadcasting Scheme for Metropolitan Video-on-Demand Systems, 1997 ACM, 0-89791-905-X/97/0009, pp. 89-100.
Michael Merz et al., "Iterative Transmission of Media Streams", 1997 ACM 0-89791-991-2/97/11, pp. 283-290.
Elan Amir et al., An Application Level Video Gateway, Multimedia '95, Proceedings of the third ACM International conference on Multimedia, 1995.
Andy Hopper, "Pandora—an experimental system for multimedia applications", ORL-90-1, published in 'Operating Systems Review' Jan. 12, 1990, pp. 1-16.
Alan Jones et al., "Handling Audio and Video Streams in a Distributed Environment", 1993, 13 pages.
Jens Meggers et al., "A Video Gateway to Support Video Streaming to Mobile Clients", ACTS Mobile Summit '97.
Shanwei Cen et al., A Distributed Real-Time MPEG Video Audio Player, NOSSDAV '95 Proceedigns of the 5th International Workshop on network and Operating System Support for Digital Audio and Video, 1995.
Ching-Chih Han et al., Scheduling MPEG-Compressed Video Streams with Firm Deadline Constraints, Proceedings ACM Multimedia Nov. 5-9, 1995, pp. 411-422.
Laurence Crutcher, "The Networked Video Jukebox", IEEE Transactions on Circuits and Systems for Video Technology, vol. 4, No. 2, Apr. 1994, pp. 105-120.
Hang Liu et al., "Adaptive source rate control for real-time wireless video transmission", Mobile Networks and Applications 3 (1998), pp. 49-60.
Emblaze Full Motion Animation, Israel.news.admin, downloaded Sep. 9, 2010.
Real time video streaming with java!!!!, comp.lang.java.programmer, downloaded Sep. 9, 2010.
Real Time video, comp.lang.java.programmer, downloaded Sep. 9, 2010.

(56) References Cited

OTHER PUBLICATIONS

Dwight Silverman, Hullaballoo.caneck.caneck: Aggies burn up Internet/A&M fans can view bonfire via computer link, Oct. 29, 1994.
Alon Cohen, "Innovation in the Network DVR space", Alon Cohen's Blog, Nov. 8, 2008.
Zhigang Chen et al., "Real Time Video and Audio in the World Wide Web", Dec. 12, 1995.
Lawrence A. Rowe, "The Berkeley Distributed Video-on Demand System", Report No. UCB/CSD-97-959, Oct. 1995.
Marilyn A. Gillen, "High-Quality, Real-Time Music a Reality", The Enter*Active File, Billboard, Sep. 30, 1995.
Michael Carreira et al., "Capture-Time Indexing Paradigm, Authoring Tool, and Browsing Environment for Digital Broadcast Video", MCL Technical Report, Jan. 8, 1995, In Proc. Multimedia Computing and Networking, IS&T/SPIE Symposium on Electronic Imaging Science and Technology, SPIE vol. 2417, Feb. 1995, pp. 380-388.
Zhigang Chen et al., Video and Audio: Organization and Retrieval in the WWW (1996).
Michael Y. M. Chiu et al., "Partial Video Sequence Caching Scheme for VOD Systems with Heterogeneous Clients", IEEE Transactions on Industrial Electronics, vol. 45, No. 1, Feb. 1998, pp. 44-51.
M. Reha Civanlar et al., A practical system for MPEG-2-based video-on-demand over ATM packet networks and the WWW, Signal Processing: Image Communication 8 (1996), pp. 221-227.
Steven Ray McCanne, "Scalable Compression and Transmission of Internet Multicast Video", Report No. UCB/CSD-96-928, Dec. 16, 1996.
Marcel Dasen et al., "An Error Tolerant, Scalable Video Stream Encoding and Compression for Mobile Computing", In Proceedings of ACTS Mobile Summit 96, pp. 762-771, Nov. 1996.
Tom Davey, "Smoother Video", Intranets Internet, Information Week; Mar. 24, 1997, 623; ABI/INFORM Global, p. 83.
Edmund X. DeJesus, "How the Internet will Replace Broadcasting", pp. 1-8, from Byte Magazine, Feb. 1996, pp. 51-54, 56, 60, 62, 64.
Sean Fulton, "An Evolving Competitor", Communications Week, Manhasset: Jul. 22, 1996, p. 55.
Justin Hibbard, "Streaming Speeds Up", InformationWeek; Sep. 29, 1997; 650; ABI/INFORM Global, p. 98.
Joseph Y. Hui, "Client-Server Synchronization and Buffering for Variable Rate Multimedia Retrievals", IEEE Journal on Selected Areas in Communications, vol. 14, No. 1, Jan. 1996, pp. 226-237.
Anonymous, "Intense Java hype leaving a path of confusion, uncertainty: Study", Computing Canada, Jan. 6, 1997; 23, 1; ABI/INFORM Global p. S10.
Real-Time Digital Video Multicasts to PC Desktops via Existing LANs, WANs, and the Internet, IP/TV, Precept Software, Inc., 1996.
Richard Karpinski, "Easy Audio on the World Wide Web—Sprucing up a home page with audio can be simple, and the best part is, it's free", Communications Week, Manhasset: Apr. 15, 1996, p. IA.03.
Peter T. Kirstein et al., Multimedia Integrated Conferencing for Europe (MICE-II), The Final Report on Esprit Project 7606, University College London, Jan. 1996, pp. 1-18.
M. Handley et al., SDP: Session Description Protocol, Apr. 1998, pp. 1-42.
"Synchronized Multimedia Integration Language", W3C Working Draft, Feb. 2, 1998, pp. 1-33.
See-Mong Tan et al., "Adaptation and Synchronization in Bandwidth-Constrained Internet Video and Audio", World Wide Web Consortium Workshiop on Real Time Multimedia in the WWW (RTMW '96), INRIA Sophia Antipolis, France, Oct. 1996.
K. Jonas et al., "Get a KISS-communication infrastructure for streaming services in a heterogeneous environment", Multimedia '98 Proceedings of the sixth ACM international conference eon Multimedia, 1998.
Ranga S. Ramanujan et al., Adaptive Streaming of MPEG Video over IP Networks, 1997 IEEE, pp. 398-409.
Asit Dan et al., "A dynamic policy of segment replication for load-balancing in video-on-demand servers", Multimedia Systems (1995) 3: 93-103.

Mark Handley/Van Jacobson, "SDP: Session Description Protocol", Jan. 22, 1997.
Maja Matijasevic, "An Overview of Multicast-based Multimedia and Virtual Reality Applications for Multi-user Collaborative Environments", Dec. 2, 1996.
Guide to the VDOLive Broadcast Server, Software Release 1.0, Documentation Version 1.1, Dec. 5, 1996.
Guide to the VDOLive Video Server, Software Version 2.1, Manual Version 2.1, Dec. 24, 1996.
Guide to the VDOLive Tools, Software Version 2.1, Manual Version 2.1, Dec. 26, 1996.
Making your VDOLive Content available on the World Wide Web, Documentation Version 2.3, Dec. 26, 1996.
Guide to VDOPhone Internet, Software Version 2.0, Documentation Version 2.01, Dec. 8, 1996.
Vocaltec introduces Internet wave for high-quality music and voice broadcasting over the internet, available for free download, IWave sets the standard for internet broadcasting by enabling organizations, individuals to broadcast shows, lectures, discussions, music and more in outstanding audio quality to Internet users worldwide, Northvale, NJ, Sep. 22, 1995.
Anonymous, "Vosaic Debuts VOSAIC Audio for Java", Information Today: Apr. 1997; 14, 4; ABI/INFORM Global, pp. 44.
M. H. Willebeek-LeMair et al., Bamba—Audio and video streaming over the Internet, IBM J. Res. Develop, vol. 42, No. 2, Mar. 1998, pp. 269-280.
Louis C. Yun et al., "Digital Video in a Fading Interference Wireless Environment", 1996 IEEE, pp. 1069-1072.
HTML, Living Standard, last updated May 16, 2011, http://www.whatwg.org/specs/web-apps/current-work/ downloaded May 17, 2011, 484 pages.
PCT International Preliminary Report on Patentability for PCT/US2009/069624 filed Dec. 28, 2009, mailed Jul. 14, 2011.
PCT International Preliminary Report on Patentability for PCT/US2009/069624 filed Dec. 28, 2009, mailed Jul. 14, 2011, 27 pages.
Combined Search and Examination Report under Sections 17 & 18(3) for application No. GB1105581.1, date of search Jul. 14, 2011, date of report Jul. 15, 2011, 4 pages.
Combined Search and Examination Report under Sections 17 & 18(3) for application No. GB1105900.3, date of search Jul. 28, 2011, date of report Aug. 1, 2011, 6 pages.
Pantos, R.: "HTTP Live Streaming", May 1, 2009; available at: http://tools.ietf.org/pdf/draft-pantos-http-live-streaming-00.pdf.
Pantos, R.: "HTTP Live Streaming" [online], published Apr. 2, 2010, IETF. Available at http://tools.ietf.org/pdf/draft-pantos-http-live-streaming-03.pdf.
Paul England, Robert Allen, Ron Underwood, "RAVE: Real-time services for the Weg", Computer Networks and ISDN Systems 28 (1996) pp. 1547-1558.
YouTube Embedded Player, Santa Claus is Coming to Town (Animagic Version), downloaded Nov. 10, 2011, http://www.youtube.com/watch?v=MB3TCiA1rgI&ob=av2n.
Francisco Valverde, Oscar Pastor, "Dealing with REST Services in Model-driven Web Engineering Methods", www.programmableweb.com/apis, 8 pages, 2005.
U.S. Patent Application and Figures filed Mar. 23, 2005, U.S. Appl. No. 11/088,326, "Approach for Downloading Data Over Networks Using Automatic Bandwidth Detection".
PCT International Search Report and Written Opinion of the International Searching Authority for PCT/US2011/064346, mailed Aug. 24, 2012.
Singapore Examination Report for Singapore Patent Application No. 201104810-5, mailed Sep. 14, 2012.
PCT International Search Report and Written Opinion of the International Searching Authority for PCT/US2012/040031, mailed Sep. 5, 2012.
PCT International Search Report and Written Opinion of the International Searching Authority for PCT/US2012/040027, mailed Sep. 12, 2012.
PCT Invitation to Pay Additional Fees and, Where Application, Protest Fee, for PCT/US2012/040027, mailed Jul. 17, 2012.
Blu-Ray Disc: "White paper Blu-ray Disc Format. 2.B Audio Visual Application Formal Specifications for BD-ROM", Internet Citation,

(56) References Cited

OTHER PUBLICATIONS

Mar. 2005, XP007903517, retrieved from the Internet: URL: http://www.blu-raydisc.com/assets/downloadablefile/2b_bdrom_audiovisualapplication_0305-12955-13403.pdf [retrieved on Nov. 16, 2007].

PCT International Preliminary Report on Patentability for PCT/US2011/031000, mailed Oct. 11, 2012.

European Search Report for EP Application EP 12 16 2824, dated Feb. 19, 2013, 5 pages.

PCT International Preliminary Report on Patentability issued on Dec. 4, 2013 for PCT/US2012/040031.

PCT International Preliminary Report on Patentability issued on Dec. 4, 2013 for PCT/US2012/040027.

"HTTP Live Streaming," Wikipedia, Jun. 2, 2013.

"Adaptive Bitrate Streaming," Wikipedia, Jun. 2, 2013.

Pantos, R. and May, W. "HTTP Live Streaming draft-pantos-http-live-streaming-07" Sep. 30, 2011.

Muller, Christopher and Timmerer, Christian. "A VLC Media Player Plugin Enabling Dynamic Adaptive Streaming over HTTP," ACM, Dec. 1, 2011.

Extended Search Report for Application No. EP 10176485.0, mailed Oct. 23, 2012, 8 pages.

International Preliminary Report on Patentability for PCT/US2011/064346, mailed Jun. 27, 2013.

PCT International Preliminary Report on Patentability for PCT/US2012/020837, mailed Jul. 25, 2013.

Jim Batson et al., "HTTP Live Streaming Protocol Specification: HTTP Live Streaming", Mar. 15, 2009, pp. 1-9.

Dave Nelson, "Getting Started with IIS Live Smooth Streaming", Mar. 18, 2009, pp. 1-12.

Andrew Fecheyr-Lippens, "A Review of HTTP Live Streaming", Jan. 2010, pp. 1-30.

* cited by examiner

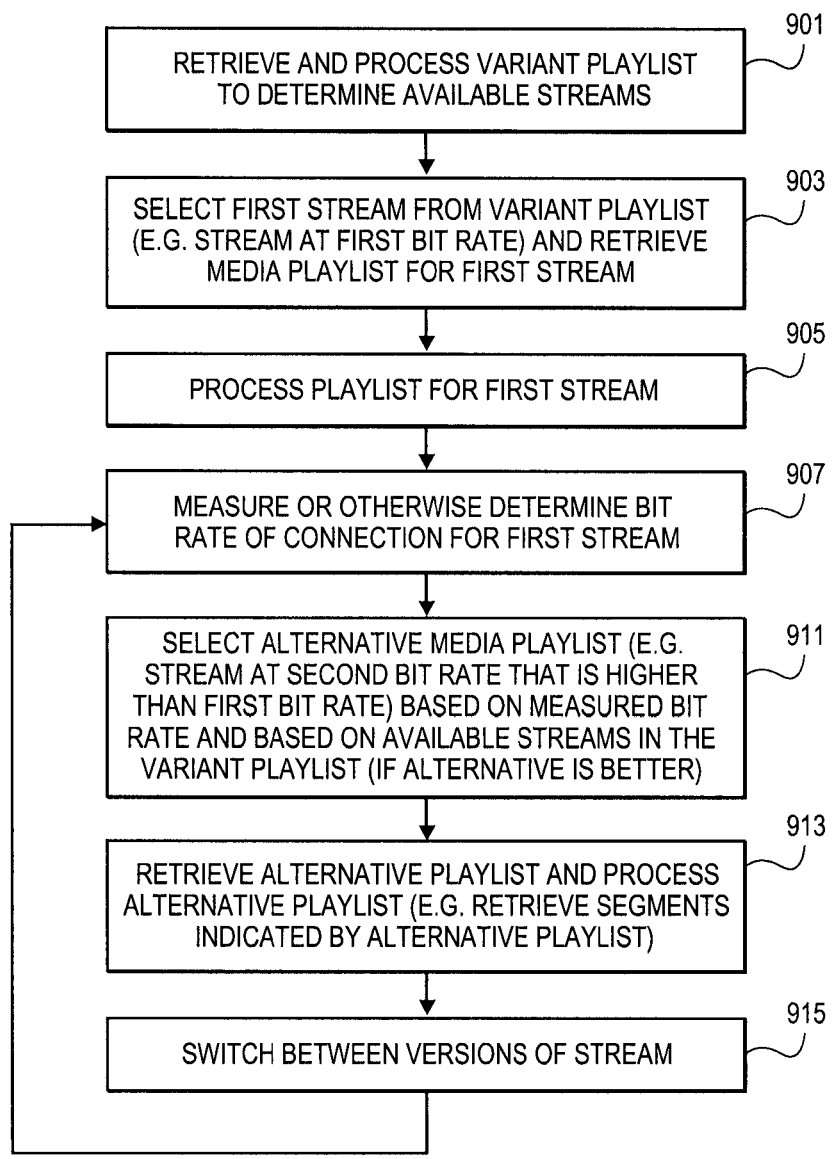

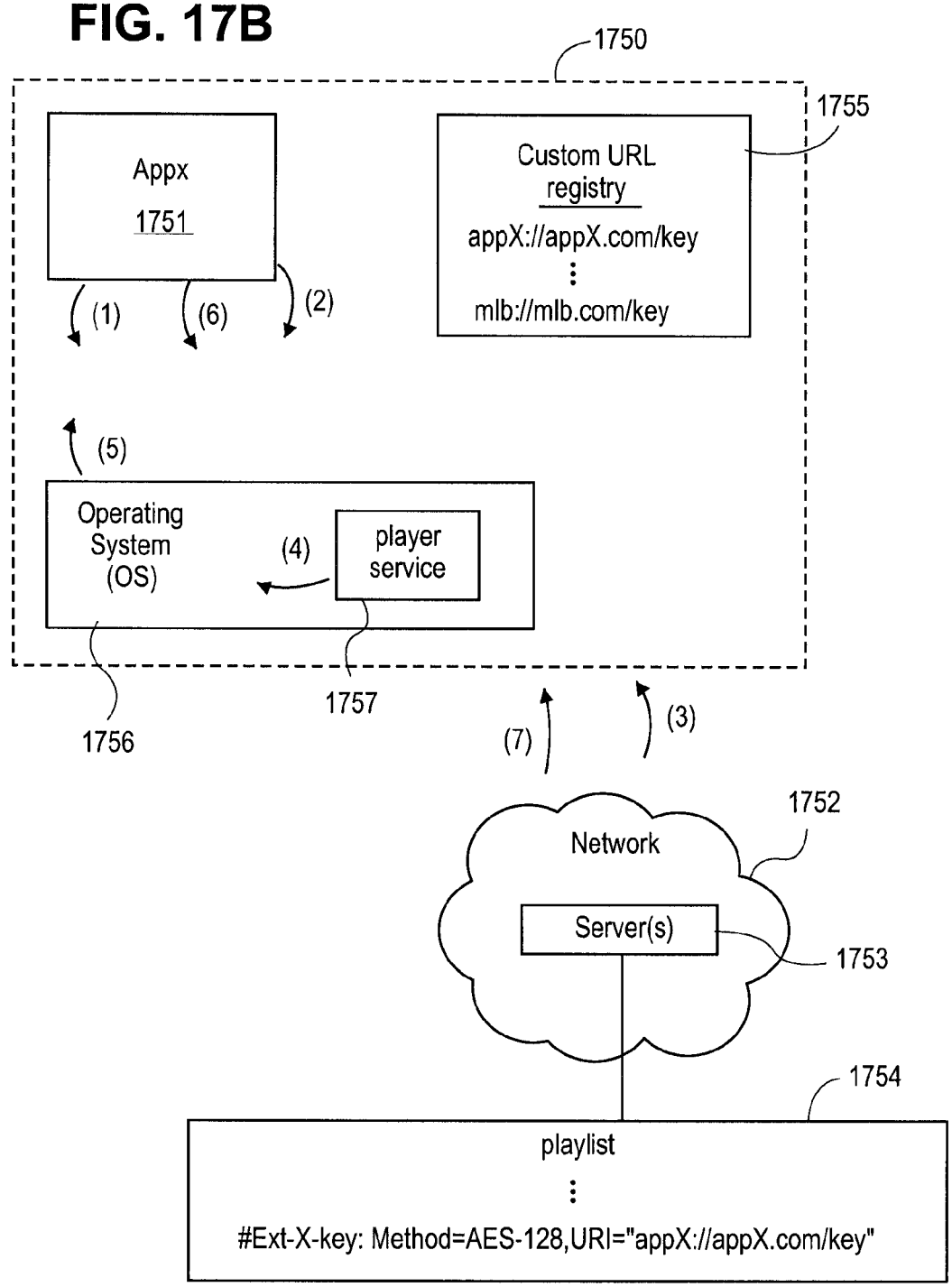

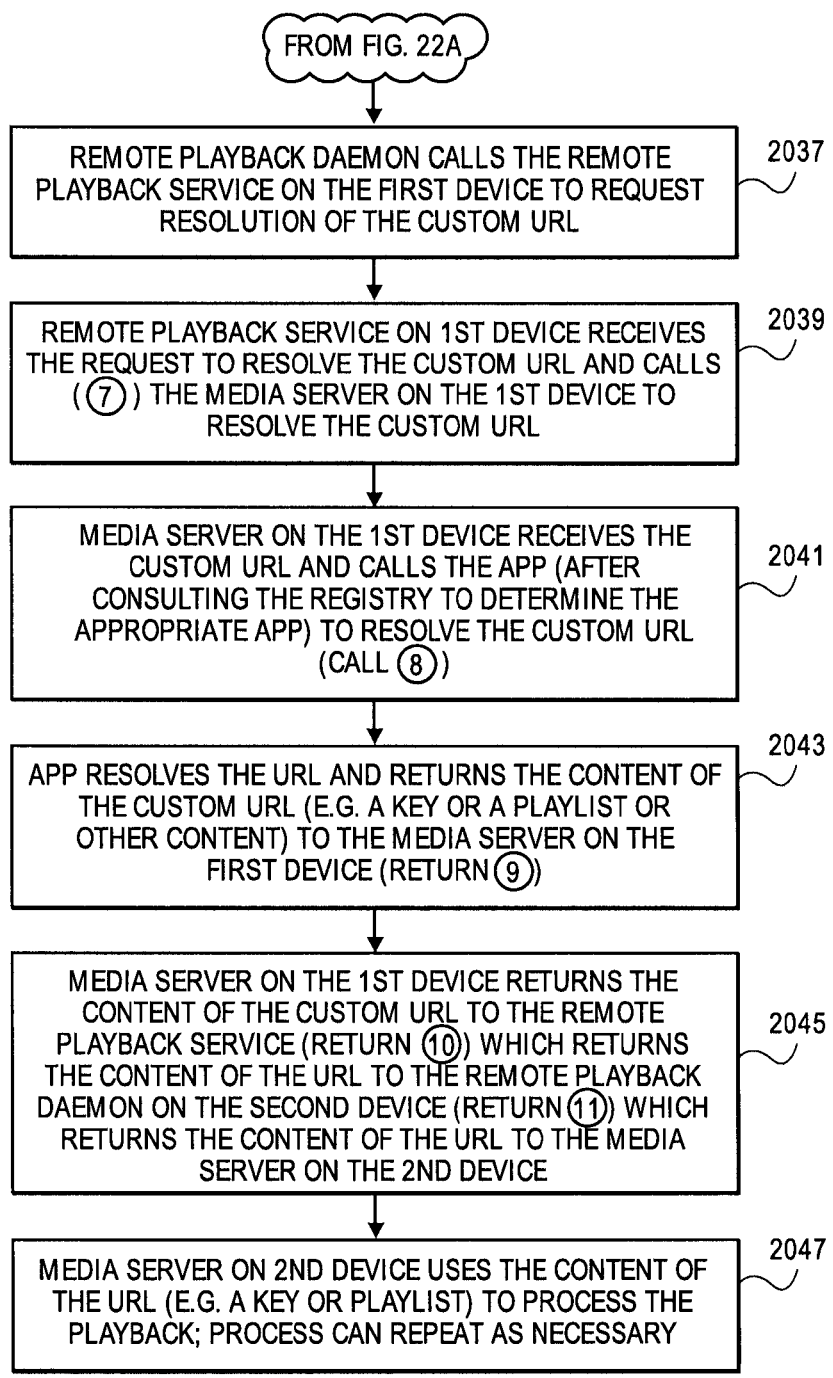

REAL-TIME OR NEAR REAL-TIME STREAMING

RELATED APPLICATIONS

This application claims the benefit of the filing dates of the following U.S. provisional applications: U.S. provisional application 61/321,767 filed on Apr. 7, 2010 and U.S. provisional application 61/351,824 filed on Jun. 4, 2010, and this application hereby incorporates by reference herein those provisional applications. This application is also related to the following patent applications:

(1) Application No. 61/142,110 filed on Dec. 31, 2008;
(2) Application No. 61/160,693 filed on Mar. 16, 2009;
(3) Application No. 61/161,036 filed on Mar. 17, 2009;
(4) Application No. 61/167,524 filed on Apr. 7, 2009;
(5) Application No. 61/240,648 filed on Sep. 8, 2009;
(6) Application No. 61/288,828 filed on Dec. 21, 2009; and
(7) Application No. 61/320,213 filed on Apr. 1, 2010. All of these U.S. provisional applications are incorporated herein by reference to the extent that they are consistent with this disclosure.

The present U.S. patent application is related to the following U.S. patent applications, each of which is incorporated herein by reference to the extent they are consistent with this disclosure:

(1) application Ser. No. 12/479,690, filed Jun. 5, 2009, entitled "REAL-TIME OR NEAR REAL-TIME STREAMING;"
(2) application Ser. No. 12/479,698, filed Jun. 5, 2009, entitled "VARIANT STREAMS FOR REAL-TIME OR NEAR REAL-TIME STREAMING;"
(3) application Ser. No. 12/479,732, filed Jun. 5, 2009, entitled "UPDATABLE REAL-TIME OR NEAR REAL-TIME STREAMING;"
(4) application Ser. No. 12/479,735, filed Jun. 5, 2009, entitled "PLAYLISTS FOR REAL-TIME OR NEAR REAL-TIME STREAMING;"
(5) application Ser. No. 12/878,002, filed Sep. 8, 2010, entitled "VARIANT STREAMS FOR REAL-TIME OR NEAR REAL-TIME STREAMING TO PROVIDE FAILOVER PROTECTION;" and
(6) application Ser. No. 12/968,202, filed Dec. 14, 2010 entitled "REAL-TIME OR NEAR REAL-TIME STREAMING WITH COMPRESSED PLAYLISTS."

TECHNICAL FIELD

Embodiments of the invention relate to data transmission techniques. More particularly, embodiments of the invention relate to techniques that allow streaming of data using non-streaming protocols such as, for example, HyperText Transfer Protocol (HTTP).

BACKGROUND

Streaming of content generally refers to multimedia content that is constantly transmitted from a server device and received by a client device. The content is usually presented to an end-user while it is being delivered by the streaming server. The name refers to the delivery method of the medium rather than to the medium itself.

Current streaming services generally require specialized servers to distribute "live" content to end users. In any large scale deployment, this can lead to great cost, and requires specialized skills to set up and run. This results in a less than desirable library of content available for streaming.

SUMMARY OF THE DESCRIPTION

In one embodiment, a system can search for content based upon a date and time. For example, in one implementation, timestamped tags are created, and each of the timestamped tags can be associated with a particular media file. The timestamp in a timestamped tag indicates a beginning date and time of the associated media file. Note that the media file may contain its own internal timestamps. A playlist file can be created with one or more timestamped tags. The playlist file can be distributed and made available for searching by date and time using the date and time in the timestamped tags. In one embodiment, the timestamped tags can use a format known as ID3.

In one embodiment, a method can execute a user application on a client device to present media files and to control presentation of the media files. The method can further run a media serving process on the client device to retrieve a playlist specifying the media files and a media source at which the media files are available, to retrieve the media files from the media source, and to decode the media files retrieved. The user application can be configured to communicate with one or more servers through a custom URL or custom protocol or both even though the media serving process is not configured to process the custom URL or custom protocol. The custom URL or custom protocol can specify or provide a decryption key for decrypting encrypted content in the media files.

Some embodiments include one or more application programming interfaces (APIs) in an environment with calling program code interacting with other program code being called through the one or more interfaces. Various function calls, messages or other types of invocations, which further may include various kinds of parameters, can be transferred via the APIs between the calling program and the code being called. In addition, an API may provide the calling program code the ability to use data types or classes defined in the API and implemented in the called program code.

At least certain embodiments include an environment with a calling software component interacting with a called software component through an API. A method for operating through an API in this environment includes transferring one or more function calls, messages, other types of invocations or parameters via the API.

Other methods are described herein and systems for performing these methods are described herein and machine readable, non-transitory storage media storing executable instructions which when executed can cause a data processing system to perform any one of these methods are also described herein.

BRIEF DESCRIPTION OF THE DRAWINGS

The invention is illustrated by way of example, and not by way of limitation, in the figures of the accompanying drawings in which like reference numerals refer to similar elements.

FIG. 9A is a flowchart showing an example of how a client device can switch between alternative content in a variant playlist.

FIG. 17B shows an example of a software architecture which can use a custom URL technique.

FIGS. 22A and 22B show an example of a method according to one embodiment of the present invention which may be employed to allow two devices, such as those shown in FIG. 20, to interact and provide remote playback on one device which is initiated by another device.

DETAILED DESCRIPTION

Figure 1:
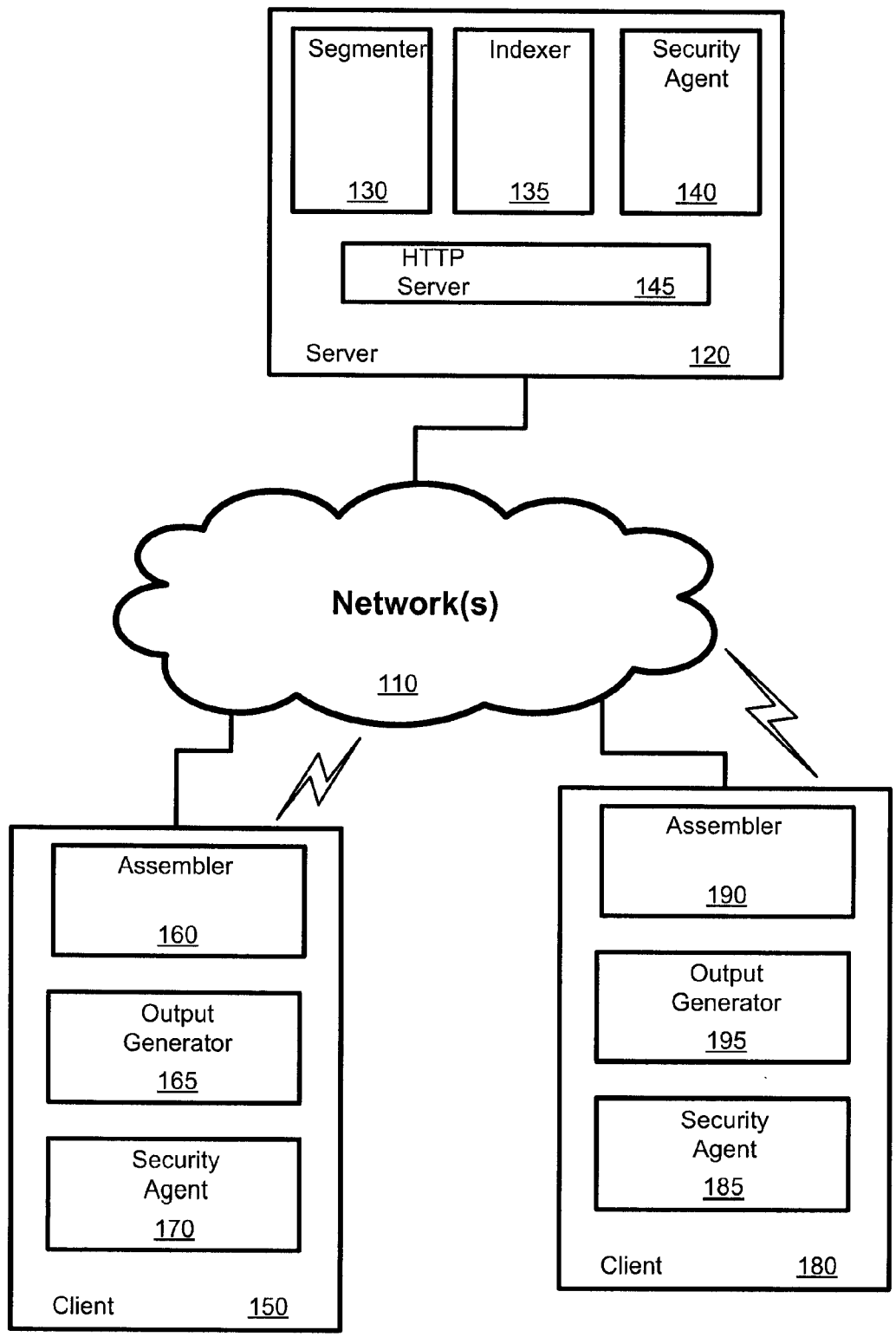
FIG. 1 is a block diagram of one embodiment of a server and clients that can send and receive real-time, or near real-time, content.

In the following description, numerous specific details are set forth. However, embodiments of the invention may be practiced without these specific details. In other instances, well-known circuits, structures and techniques have not been shown in detail in order not to obscure the understanding of this description.

The present description includes material protected by copyrights, such as illustrations of graphical user interface images. The owners of the copyrights, including the assignee of the present invention, hereby reserve their rights, including copyright, in these materials. The copyright owner has no objection to the facsimile reproduction by anyone of the patent document or the patent disclosure, as it appears in the Patent and Trademark Office file or records, but otherwise reserves all copyrights whatsoever. Copyright Apple Inc. 2009.

In one embodiment, techniques and components described herein can include mechanisms to deliver streaming experience using non-streaming protocols (e.g., HTTP) and other technologies (e.g., Motion Picture Expert Group (MPEG) streams). For example, near real-time streaming experience can be provided using HTTP to broadcast a "live" musical or sporting event, live news, a Web camera feed, etc. In one embodiment, a protocol can segment incoming media data into multiple media files and store those segmented media files on a server. The protocol can also build a playlist file that includes Uniform Resource Identifiers (URIs) that direct the client to the segmented media files stored on a server. When the segmented media files are played back in accordance with the playlist file(s), the client can provide the user with a near real-time broadcast of a "live" event. Pre-recorded content can be provided in a similar manner.

In one embodiment, the server can dynamically introduce supplementary or alternative media content (e.g., advertisements, statistics related to a sporting event, additional media content to the main presentation) into the broadcast event. For example, during client playback of a media event, the server can add additional URIs to the playlist file, the URIs may identify a location from which a client can download a supplementary media file. The client can be instructed to periodically retrieve from the server one or more updated playlist file(s) in order to access any supplementary or additional (or both) media content the server has introduced.

In one embodiment, the server can operate in either cumulative mode or in rolling mode. In cumulative mode, the server can create a playlist file and append media file identifiers to the end of the playlist file. The client then has access to all parts of the stream from a single playlist file (e.g., a user can start at the middle of a show) when downloaded. In rolling mode, the server may limit the availability of media files by removing media file identifiers from the beginning of the playlist file on a rolling basis, thereby providing a sliding window of media content accessible to a client device. The server can also add media file identifiers to the playlist and, in rolling mode, the server can limit the availability of media files to those that have been most recently added to the playlist. The client then repeatedly downloads updated copies of the playlist file to continue viewing. The rolling basis for playlist downloading can be useful when the content is potentially unbounded in time (e.g. content from a continuously operated web cam). The client can continue to repeatedly request the playlist in the rolling mode until it finds an end tag in the playlist.

In one embodiment, the mechanism supports bit rate switching by providing variant streams of the same presentation. For example, several versions of a presentation to be served can be stored on the server. Each version can have substantially the same content but be encoded at different bit rates. This can allow the client device to switch between bit rates depending on, for example, a detection of the available bandwidth, without compromising continuity of playback.

In one embodiment, protection features may be provided to protect content against unauthorized use. For example, non-sequential media file numbering may be used to prevent prediction. Encryption of media files may be used. Partial media file lists may be used. Additional and/or different protection features may also be provided.

FIG. 1 is a block diagram of one embodiment of a server and clients that can send and receive real-time, or near real-time, content. The example of FIG. 1 provides a simple server-client connection with two clients coupled with a server via a network. Any number of clients may be supported utilizing the techniques and mechanisms described herein. Further, multiple servers may provide content and/or may operate together to provide content according to the techniques and mechanisms described herein. For example, one server may create the content, create the playlists and create the multiple media (e.g. files) and other servers store and transmit the created content.

Network 110 may be any type of network whether wired, wireless (e.g., IEEE 802.11, 802.16) or any combination thereof. For example, Network 100 may be the Internet or an intranet. As another example, network 110 may be a cellular network (e.g., 3G, CDMA). In one embodiment, client devices 150 and 180 may be capable of communicating over multiple network types (e.g. each device can communicate over a WiFi wireless LAN and also over a wireless cellular telephone network). For example, client devices 150 and 180 may be smart phones or cellular-enabled personal digital assistants that can communicate over cellular radiotelephone networks as well as data networks. These devices may be able to utilize the streaming mechanisms described herein over either type of network or even switch between networks as necessary.

Server 120 may operate as a HTTP server in any manner known in the art. That is server 120 includes a HTTP server agent 145 that provides content using HTTP protocols. While the example of FIG. 1 is described in terms of HTTP, other protocols can be utilized in a similar manner. Segmenter 130 and indexer 135 are agents that reside on server 120 (or multiple servers) to provide content in media files with a playlist file as described herein. These media files and playlist files may be provided over network 110 via HTTP server agent 145 (or via other servers) using HTTP protocols. Agents as discussed herein can be implemented as hardware, software, firmware or a combination thereof.

Segmenter 130 may function to divide the stream of media data into multiple media files that may be transmitted via HTTP protocols. Indexer 135 may function to create a playlist file corresponding to the segmented media files so that client devices can reassemble the media files to provide real-time, or near real-time, transmission of the content provided by server 120. In response to one or more requests from a client device, HTTP server agent 145 (or other servers) may transmit one or more playlist files as generated by indexer 135 and media files of content as generated by segmenter 130. Server 120 may further include optional security agent 140 that provides one or more of the security functions (e.g. encryption) discussed herein. Server 120 may also include additional components not illustrated in FIG. 1.

Client devices 150 and 180 may receive the playlist files and media files from server 120 over network 110. Client devices may be any type of electronic device that is capable of receiving data transmitted over a network and generate output utilizing the data received via the network, for example, wireless mobile devices, PDAs, entertainment devices, consumer electronic devices, etc. The output may be any media type of combination of media types, including, for example, audio, video or any combination thereof.

Client device 150 can include assembler agent 160 and output generator agent 165. Similarly, client device 180 can include assembler agent 190 and output generator agent 195. Assembler agents 160 and 180 receive the playlist files from server 120 and use the playlist files to access and download media files from server 120. Output generator agents 165 and 195 use the downloaded media files to generate output from client devices 150 and 160, respectively. The output may be provided by one or more speakers, one or more display screens, a combination of speakers and display screens or any other input or output device. The client devices can also include memory (e.g. flash memory or DRAM, etc.) to act as a buffer to store the media files (e.g. compressed media files or decompressed media files) as they are received; the buffer can provide many seconds worth of presentable content beyond the time of content currently being presented so that the buffered content can later be displayed while new content is being downloaded. This buffer can provide presentable content while the client device is attempting to retrieve content through an intermittently slow network connection and hence the buffer can hide network latency or connection problems.

Client devices 150 and 180 may further include optional security agents 170 and 185, respectively that provide one or more of the security functions discussed herein. Client devices 150 and 180 may also include additional components not illustrated in FIG. 1.

In one embodiment, the techniques that are described in this application may be used to transmit an unbounded stream of multimedia data over a non-streaming protocol (e.g., HTTP). Embodiments can also include encryption of media data and/or provision of alternate versions of a stream (e.g., to provide alternate bit rates). Because media data can be transmitted soon after creation, the data can be received in near real-time. Example data formats for files as well as actions to be taken by a server (sender) and a client (receiver) of the stream of multimedia data are provided; however, other formats can also be supported.

A media presentation that can be transmitted as a simulated real-time stream (or near real-time stream) is specified by a Universal Resource Indicator (URI) that indicates a playlist file. In one embodiment, the playlist file is an ordered list of additional URIs. Each URI in the playlist file refers to a media file that is a segment of a stream, which may be a single contiguous stream of media data for a particular program.

In order to play the stream of media data, the client device obtains the playlist file from the server. The client also obtains and plays each media data file indicated by the playlist file. In one embodiment, the client can dynamically or repeatedly reload the playlist file to discover additional and/or different media segments.

The playlist files may be, for example, Extended M3U Playlist files. In one embodiment, additional tags that effectively extend the M3U format are used. M3U refers to Moving Picture Experts Group Audio Layer 3 Uniform Resource Locator (MP3 URL) and is a format used to store multimedia playlists. A M3U file is a text file that contains the locations of one or more media files for a media player to play.

The playlist file, in one embodiment, is an Extended M3U-formatted text file that consists of individual lines. The lines can be terminated by either a single LF character or a CR character followed by a LF character. Each line can be a URI, a blank line, or start with a comment character (e.g. '#'). URIs identify media files to be played. Blank lines can be ignored.

Lines that start with the comment character can be either comments or tags. Tags can begin with #EXT, while comment lines can begin with #. Comment lines are normally ignored by the server and client. In one embodiment, playlist files are encoded in UTF-8 format. UTF-8 (8-bit Unicode Transformation Format) is a variable-length character encoding format. In alternate embodiments, other character encoding formats can be used.

In the examples that follow, an Extended M3U format is utilized that includes two tags: EXTM3U and EXTINF. An Extended M3U file may be distinguished from a basic M3U file by a first line that includes "#EXTM3U".

EXTINF is a record marker that describes the media file identified by the URI that follows the tag. In one embodiment, each media file URI is preceded by an EXTINF tag, for example:
    #EXTINF: <duration>,<title>
where "duration" specifies the duration of the media file and "title" is the title of the target media file.

In one embodiment, the following tags may be used to manage the transfer and playback of media files:
    EXT-X-TARGETDURATION
    EXT-X-MEDIA-SEQUENCE
    EXT-X-KEY
    EXT-X-PROGRAM-DATE-TIME
    EXT-X-ALLOW-CACHE
    EXT-X-STREAM-INF
    EXT-X-ENDLIST
    EXT-X-DISCONTINUITY
    EXT-X-VERSION
These tags will each be described in greater detail below. While specific formats and attributes are described with respect to each new tag, alternative embodiments can also be supported with different attributes, names, formats, etc.

The EXT-X-TARGETDURATION tag can indicate, in one embodiment, the approximate duration of the next media file that will be added to the presentation. It can be included in the playback file and the format can be:
    #EXT-X-TARGETDURATION:<seconds>
where "seconds" indicates the duration of the media file. In one embodiment, the actual duration may differ slightly from the target duration indicated by the tag. In one embodiment, every URI indicating a segment will be associated with an approximate duration of the segment; for example, the URI for a segment may be prefixed with a tag indicating the approximate duration of that segment. In another embodiment, the EXT-X-TARGETDURATION tag can specify the maximum media file duration; the EXTINF duration of each media file in the playlist file should be less than or equal to the target duration, and this tag (which specifies the maximum media file duration) can be specified just once in the playlist file and it applies to all media files in the playlist file, and its format can be:
    #EXT-X-TARGETDURATION:<s>
where "s" is an integer indicating the target duration in seconds.

Each media file URI in a playlist file can have a unique sequence number. The sequence number, if present, of a URI is equal to the sequence number of the URI that preceded it, plus one in one embodiment. The EXT-X-MEDIA-SEQUENCE tag can indicate the sequence number of the first URI that appears in a playlist file and the format can be:
    #EXT-X-MEDIA-SEQUENCE:<number>
where "number" is the sequence number of the URI. If the playlist file does not include a #EXT-X-MEDIA-SEQUENCE tag, the sequence number of the first URI in the playlist can be considered 1. A media file's sequence number is not required to appear in its URI in one embodiment, and in one embodiment, a playlist can contain only one EXT-X-MEDIA-SEQUENCE tag. In one embodiment, the sequence numbering can be non-sequential; for example, non-sequential sequence numbering such as 1, 5, 7, 17, etc. can make it difficult to predict the next number in a sequence and this can help to protect the content from pirating. Another option to help protect the content is to reveal only parts of a playlist at any given time.

Some media files may be encrypted. The EXT-X-KEY tag provides information that can be used to decrypt media files that follow it and the format can be:
    #EXT-X-KEY:METHOD=<method>[,URI="<URI>"][,IV=<IV>]
The METHOD parameter specifies the encryption method and the URI parameter, if present, specifies how to obtain the key and the IV (Initialization Vector), if present, specifies an initialization vector used in the encryption method (e.g. with the key).

An encryption method of NONE indicates no encryption and if NONE is indicated then, in one embodiment, the URI and IV parameters should not be present. Various encryption methods may be used, for example AES-128, which indicates encryption using the Advance Encryption Standard encryption with a 128-bit key and PKCS7 padding [see RFC3852]. A new EXT-X-KEY tag supersedes any prior EXT-X-KEY tags.

An EXT-X-KEY tag with a URI parameter identifies the key file. A key file may contain the cipher key that is to be used to decrypt subsequent media files listed in the playlist file. For example, the AES-128 encryption method uses 16-octet keys. The format of the key file can be a packed array of 16 octets in binary format.

Use of AES-128 normally requires that the same 16-octet initialization vector (IV) be supplied when encrypting and decrypting. Varying the IV can be used to increase the strength of the cipher. When using AES-128 encryption, the sequence number of the media file can be used as the IV when encrypting or decrypting media files.

The EXT-X-PROGRAM-DATE-TIME tag can associate the beginning of the next media file with an absolute date and/or time and can include or indicate a time zone. In one embodiment, the date/time representation is ISO/IEC 8601:2004. The value of the date and time in this tag can provide an informative mapping of the timeline of the media to an appropriate wall-clock time, which may be used as a basis for seeking, for display or other purposes, content for playback based on a date and time. In one embodiment, if a server provides this mapping, it should place an EXT-X-PRO- GRAM-DATE-TIME tag after every EXT-X-DISCONTINUITY tag in the playlist file. The tag format can be:

EXT-X-PROGRAM-DATE-TIME:<YYYY-MM-DDThh:mm:ssZ>

The EXT-X-ALLOW-CACHE tag can be used to indicate whether the client may cache the downloaded media files for later playback. This tag can appear anywhere in the playlist file in one embodiment but, in one embodiment, should appear only once in the playlist file. The tag format can be:

EXT-X-ALLOW-CACHE:<YES|NO>

The EXT-X-ENDLIST tag indicates in one embodiment that no more media files will be added to the playlist file. The tag format can be:

EXT-X-ENDLIST

In one embodiment, if a playlist contains the final segment or media file then the playlist will have the EXT-X-ENDLIST tag. This tag can appear, in one embodiment, anywhere in a playlist file, and in one embodiment, it can occur only once in the playlist file.

The EXT-X-STREAM-INF tag can be used to indicate that the next URI in the playlist file identifies another playlist file. The tag format can be, in one embodiment:

EXT-X-STREAM-INF:[attribute=value][, attribute=value]*<URI> where the following attributes may be used. An attribute of the same type, in one embodiment of this tag, should not appear more than once in the same tag. The attribute BANDWIDTH=<n> is an approximate upper bound of the stream bit rate expressed as a number of bits per second. In one embodiment, the attribute BANDWIDTH can be an upper bound of the overall bitrate of each media file, calculated to include container overhead that appears or will appear in the playlist. The attribute PROGRAM-ID=<i> is a number that uniquely identifies a particular presentation within the scope of the playlist file. A playlist file may include multiple EXT-X-STREAM-INF URIs with the same PROGRAM-ID to describe variant streams of the same presentation and these variant playlists can contain additional EXT-X-STREAM-INF tags. Variant streams and variant playlists are described further in this disclosure (e.g. see FIGS. 9A-9D). The attribute CODECS="[format][,format]*" can be used to specify a media sample type that is present in a media file in the playlist file, where each format specifies a media sample type; in one embodiment, valid format identifiers can be those in the ISO File Format Name Space defined by RFC 4281. The attribute RESOLUTION=<N>x<M> can specify a resolution of video within the stream, where N is the approximate encoded horizontal resolution of video within the stream, which can be expressed as a number of pixels, and M is the approximate encoded vertical resolution.

The EXT-X-DISCONTINUITY tag indicates an encoding discontinuity between the media file that follows it and the one that preceded it. The set of characteristics that MAY change is:
file format
number and type of tracks
encoding parameters
encoding sequence
timestamp sequence Its format is:
EXT-X-DISCONTINUITY The EXT-X-VERSION tag indicates the compatibility version of the playlist file. The playlist file, its associated media, and its server should, in one embodiment, comply with all provisions of the most-recent version of this document describing the protocol version indicated by the tag value.

Its format is:
EXT-X-VERSION:<n>
where "n" is an integer indicating the protocol version.

A playlist file, in one embodiment, can contain no more than one EXT-X-VERSION tag. A playlist file that does not contain an EXT-X-VERSION tag should, in one embodiment, comply with version 1 of this protocol. If the playlist file has this tag then its value, in one embodiment, should be the lowest protocol version with which the server, playlist file and associated media files all comply.

The foregoing tags and attributes can be used by the server device to organize, transmit and process the media files that represent the original media content. The client devices use this information to reassemble and present the media files in a manner to provide a real-time, or near real-time, streaming experience (e.g. viewing of a live broadcast such as a music or sporting event) to a user of the client device.

Each media file URI in a playlist file identifies a media file that is a segment of the original presentation (i.e., original media content). In one embodiment, each media file is formatted as a MPEG-2 transport stream, a MPEG-2 program stream, or a MPEG-2 audio elementary stream. The format can be specified by specifying a CODEC, and the playlist can specify a format by specifying a CODEC. In one embodiment, all media files in a presentation have the same format; however, multiple formats may be supported in other embodiments. A transport stream file should, in one embodiment, contain a single MPEG-2 program, and there should be a Program Association Table and a Program Map Table at the start of each file. A file that contains video SHOULD have at least one key frame and enough information to completely initialize a video decoder. A media file in a playlist MUST be the continuation of the encoded stream at the end of the media file with the previous sequence number unless it was the first media file to appear in the playlist file or if it is preceded by an EXT-X-DISCONTINUITY tag. Clients SHOULD be prepared to handle multiple tracks of a particular type (e.g. audio or video) by choosing a reasonable subset. Clients should, in one embodiment, ignore private streams inside Transport Streams that they do not recognize. The encoding parameters for samples within a stream inside a media file and between corresponding streams across multiple media files SHOULD remain consistent. However clients SHOULD deal with encoding changes as they are encountered, for example by scaling video content to accommodate a resolution change.

Figure 2A:
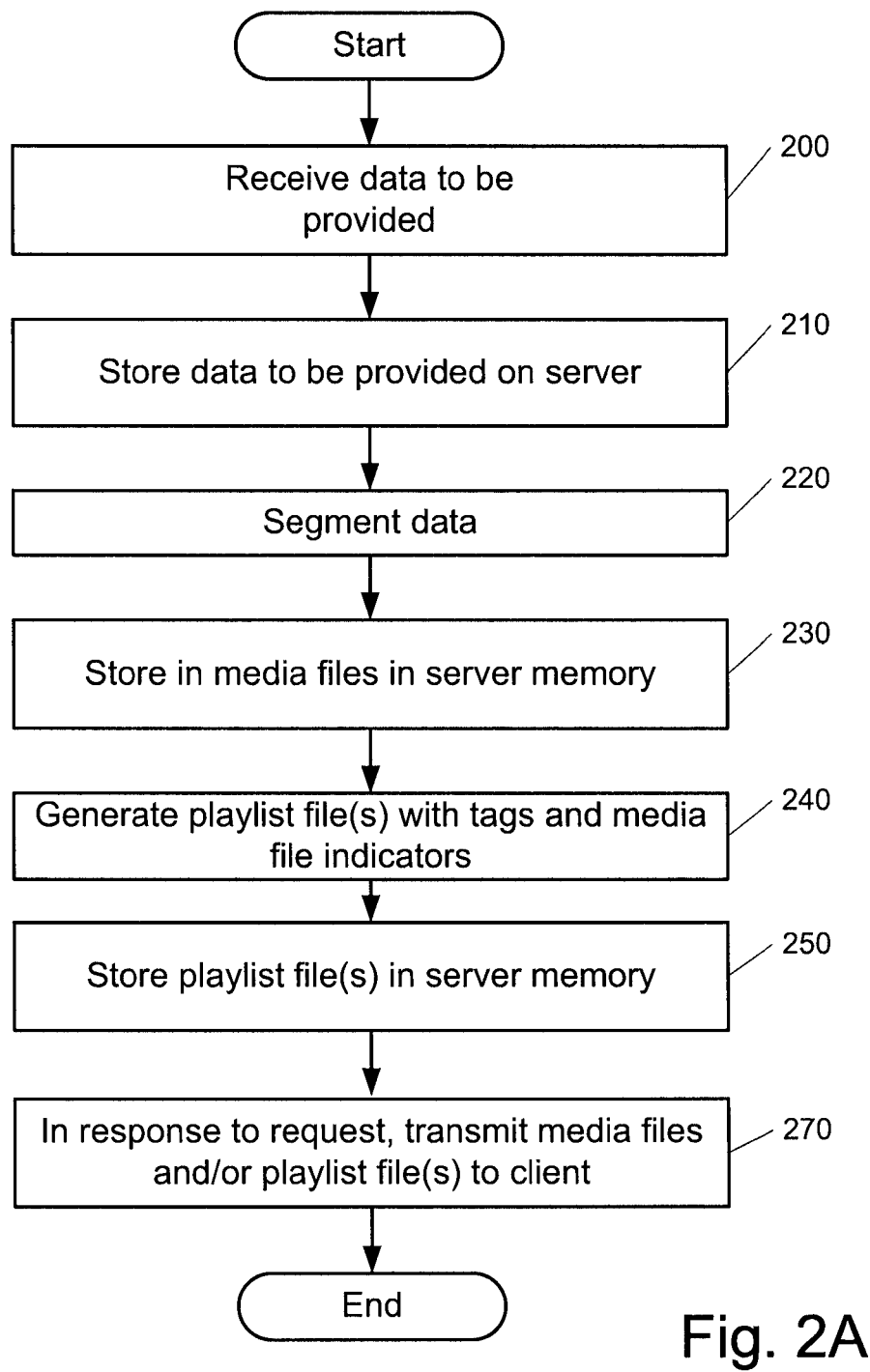
FIG. 2A is a flow diagram of one embodiment of a technique for one or more server devices to support media content using non-streaming protocols.

FIG. 2A is a flow diagram of one embodiment of a technique for one or more server devices to support media content using non-streaming protocols. The example of FIG. 2A is provided in terms of HTTP; however, other non-streaming protocols can be utilized in a similar manner. The example of FIG. 2A is provided in terms of a single server performing certain tasks. However, any number of servers may be utilized. For example, the server that provides media files to client devices may be a different device than a server that segments the content into multiple media files.

The server device receives content to be provided in operation 200. The content may represent live audio and/or video (e.g., a sporting event, live news, a Web camera feed). The content may also represent pre-recorded content (e.g., a concert that has been recorded, a training seminar, etc.). The content may be received by the server according to any format and protocol known in the art, whether streamed or not. In one embodiment, the content is received by the server in the form of a MPEG-2 stream; however, other formats can also be supported.

The server may then store temporarily at least portions of the content in operation 210. The content or at least portions of the content may be stored temporarily, for example, on a storage device (e.g., hard disk in a Storage Area Network, etc.) or in memory. Alternatively, the content may be received as via a storage medium (e.g., compact disc, flash drive) from which the content may be transferred to a storage device or memory. In one embodiment, the server has an encoder that converts, if necessary, the content to one or more streams (e.g., MPEG-2). This conversion can occur without storing permanently the received content, and in some embodiments, the storage operation 210 may be omitted or it may be a longer term storage (e.g. an archival storage) in other embodiments.

The content to be provided is segmented into multiple media files in operation 220. In one embodiment, the server converts a stream into separate and distinct media files (i.e., segments) that can be distributed using a standard web server. In one embodiment, the server segments the media stream at points that support effective decode of the individual media files (e.g., on packet and key frame boundaries such as PES packet boundaries and i-frame boundaries). The media files can be portions of the original stream with approximately equal duration. The server also creates a URI for each media file. These URIs allow client devices to access the media files.

Because the segments are served using HTTP servers, which inherently deliver whole files, the server should have a complete segmented media file available before it can be served to the clients. Thus, the client may lag (in time) the broadcast by at least one media file length. In one embodiment, media file size is based on a balance between lag time and having too many files.

In one embodiment, two session types (live session and event session) are supported. For a live session, only a fixed size portion of the stream is preserved. In one embodiment, content media files that are out of date are removed from the program playlist file, and can be removed from the server. The second type of session is an event session, where the client can tune into any point of the broadcast (e.g., start from the beginning, start from a mid-point). This type of session can be used for rebroadcast, for example.

The media files are stored in the server memory in operation 230. The media files can be protected by a security feature, such as encryption, before storing the files in operation 230. The media files are stored as files that are ready to transmit using the network protocol (e.g., HTTP or HTTPS) supported by the Web server application on the server device (or supported by another device which does the transmission).

One or more playlist files are generated to indicate the order in which the media files should be assembled to recreate the original content in operation 240. The playlist file(s) can utilize Extended M3U tags and the tags described herein to provide information for a client device to access and reassemble the media files to provide a streaming experience on the client device. A URI for each media file is included in the playlist file(s) in the order in which the media files are to be played. The server can also create one or more URIs for the playlist file(s) to allow the client devices to access the playlist file(s).

The playlist file(s) can be stored on the server in operation 250. While the creation and storing of media files and playlist file(s) are presented in a particular order in FIG. 2A, a different order may also be used. For example, the playlist file(s) may be created before the media files are created or stored. As another example, the playlist file(s) and media files may be created before either are stored.

If media files are to be encrypted the playlist file(s) can define a URI that allows authorized client devices to obtain a key file containing an encryption key to decrypt the media files. An encryption key can be transmitted using a secure connection (e.g., HTTPS). As another example, the playlist file(s) may be transmitted using HTTPS. As a further example, media files may be arranged in an unpredictable order so that the client cannot recreate the stream without the playlist file(s).

If the encryption method is AES-128, AES-128 CBC encryption, for example, may be applied to individual media files. In one embodiment, the entire file is encrypted. Cipher block chaining is normally not applied across media files in one embodiment. The sequence number of the media files can be used as the IV or the IV can be the value of the IV attribute of the EXT-X-KEY tag as described above. In one embodiment, the server adds an EXT-X-KEY tag with the key URI to the end of the playlist file. The server then encrypts all subsequent media files with that key until a change in encryption configuration is made.

To switch to a new encryption key, the server can make the new key available via a new URI that is distinct from all previous key URIs used in the presentation. The server also adds an EXT-X-KEY tag with the new key URI to the end of a playlist file and encrypts all subsequent media files with the new key.

To end encryption, the server can add an EXT-X-KEY tag with the encryption method NONE at the end of the playlist file. The tag (with "NONE" as the method) does not include a URI parameter in one embodiment. All subsequent media files are not encrypted until a change in encryption configuration is made as described above. The server does not remove an EXT-X-KEY tag from a playlist file if the playlist file contains a URI to a media file encrypted with that key. The server can transmit the playlist file(s) and the media files over the network in response to client requests in operation 270, as described in more detail with respect to FIG. 3A.

In one embodiment, a server transmits the playlist file to a client device in response to receiving a request from a client device for a playlist file. The client device may access/request the playlist file using a URI that has been provided to the client device. The URI indicates the location of the playlist file on the server. In response, the server may provide the playlist file to the client device. The client device may the utilize tags and URIs (or other identifiers) in the playlist file to access the multiple media files.

In one embodiment, the server may limit the availability of media files to those that have been most recently added to the playlist file(s). To do this, each playlist file can include only one EXT-X-MEDIA-SEQUENCE tag and the value can be incremented by one for every media file URI that is removed from the playlist file. Media file URIs can be removed from the playlist file(s) in the order in which they were added. In one embodiment, when the server removes a media file URI from the playlist file(s) the media file remains available to clients for a period of time equal to the duration of the media file plus the duration of the longest playlist file in which the media file has appeared.

The duration of a playlist file is the sum of the durations of the media files within that playlist file. Other durations can also be used. In one embodiment, the server can maintain at least three main presentation media files in the playlist at all times unless the EXT-X-ENDLIST tag is present.

Figure 2B:
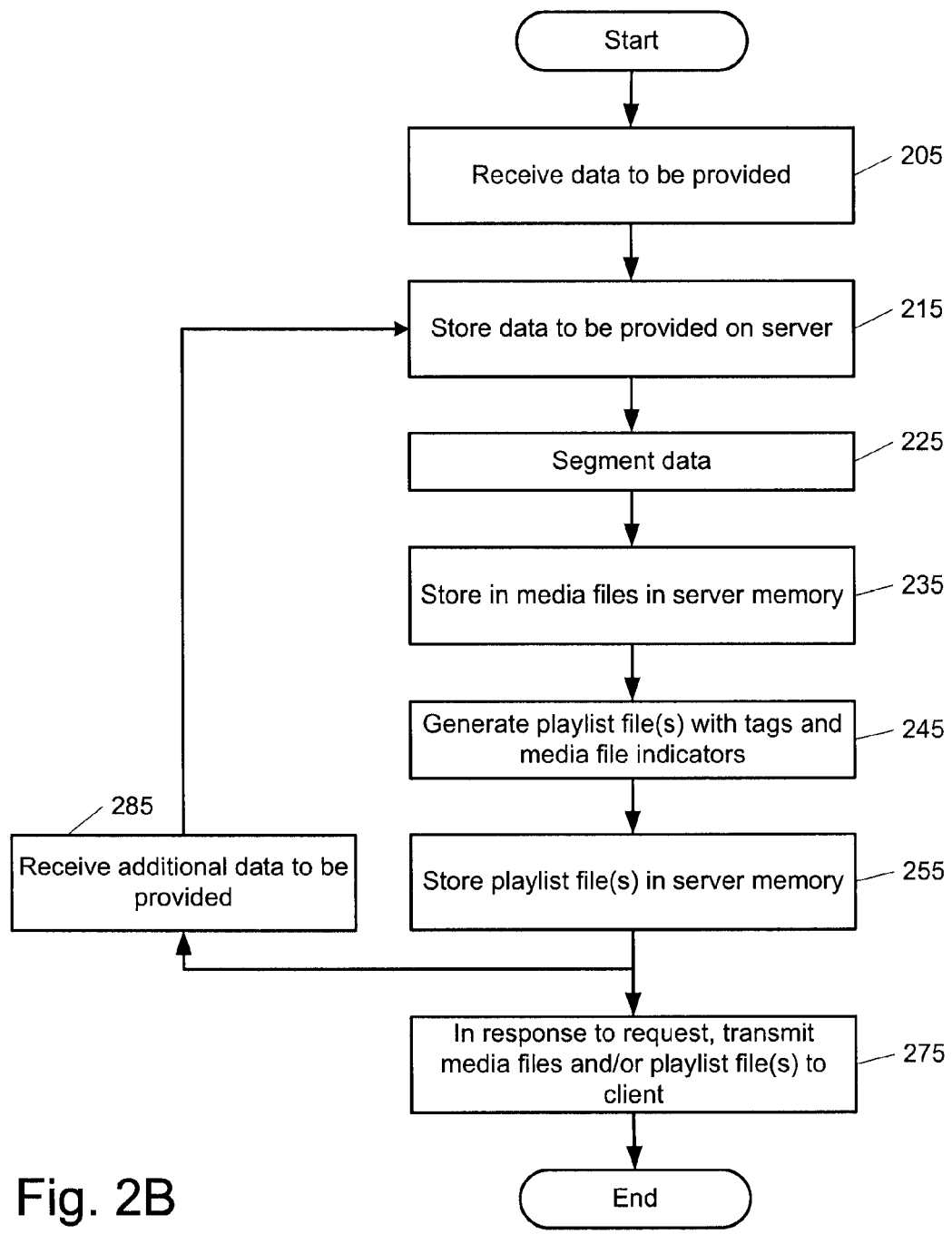
FIG. 2B is a flow diagram of one embodiment of a technique for one or more server devices to provide dynamically updated playlists to one or more client devices.

FIG. 2B is a flow diagram of one embodiment of a technique for one or more server devices to provide dynamically updated playlists to one or more client devices. The playlists can be updated using either of the cumulative mode or the rolling mode described herein. The example of FIG. 2B is provided in terms of HTTP; however, other non-streaming protocols (e.g. HTTPS, etc.) can be utilized in a similar manner. The example of FIG. 2B is provided in terms of a server performing certain tasks. However, any number of servers may be utilized. For example, the server that provides media files to client devices may be a different device than the server that segments the content into multiple media files.

The server device receives content to be provided in operation 205. The server may then temporarily store at least portions of the content in operation 215. Operation 215 can be similar to operation 210 in FIG. 2A. The content to be provided is segmented into multiple media files in operation 225. The media files can be stored in the server memory in operation 235. The media files can be protected by a security feature, such as encryption, before storing the files in operation 235.

One or more playlist files are generated to indicate the order in which the media files should be assembled to recreate the original content in operation 245. The playlist file(s) can be stored on the server in operation 255. While the creation and storing of media files and playlist file(s) are presented in a particular order in FIG. 2B, a different order may also be used.

Figure 3A:
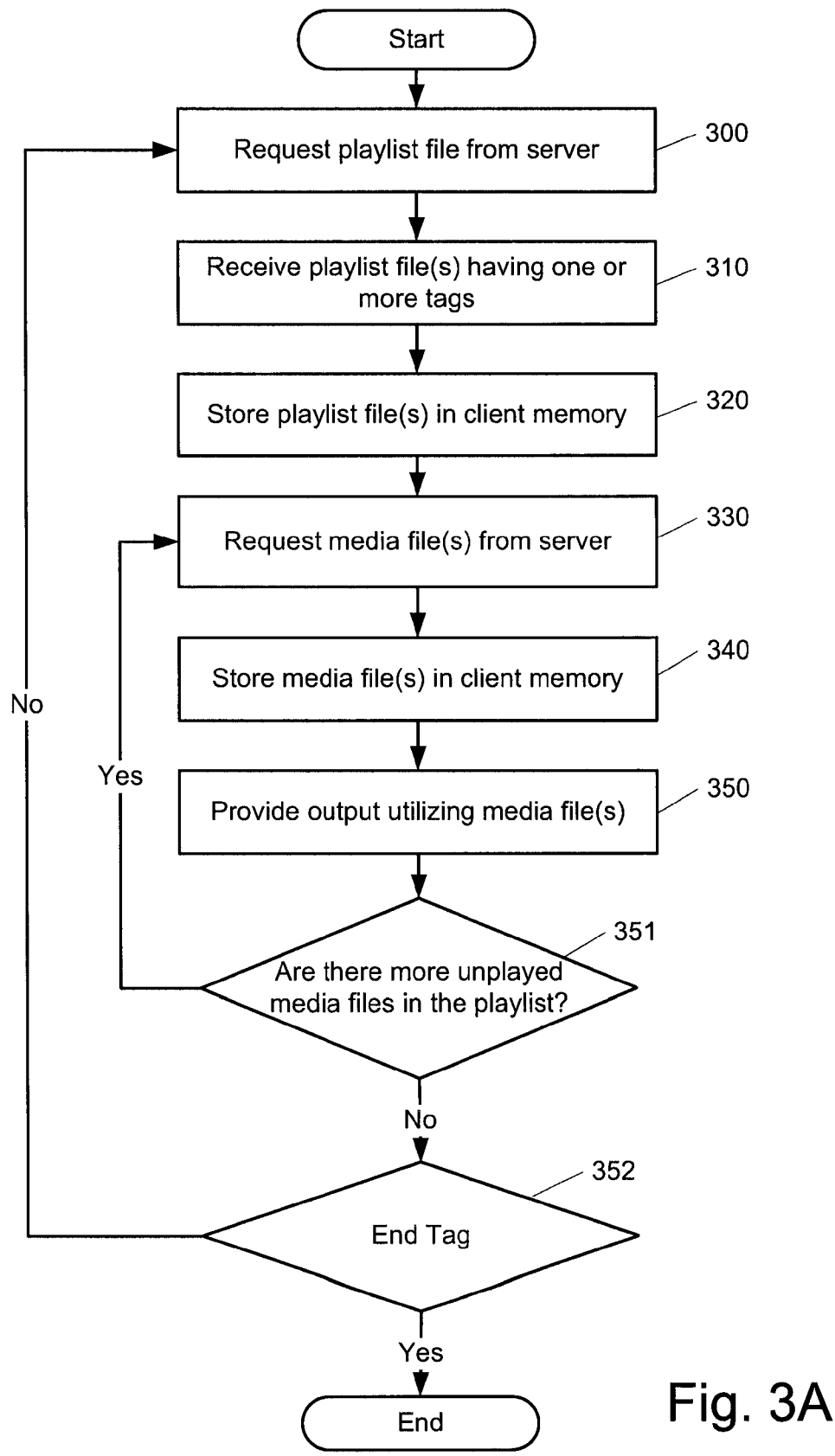
FIG. 3A is a flow diagram of one embodiment of a technique for a client device to support streaming of content using non-streaming protocols.
Figure 3B:
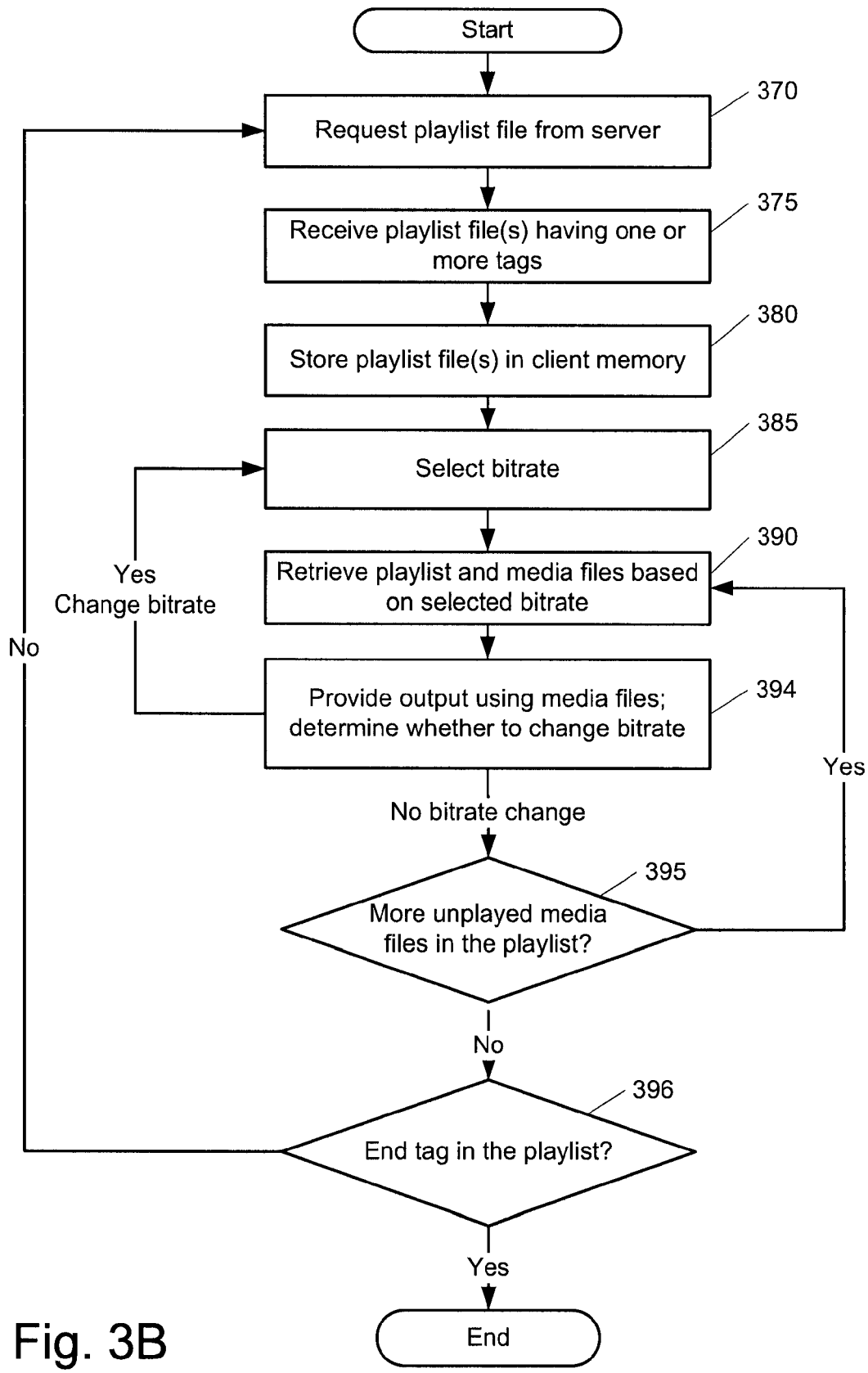
FIG. 3B is a flow diagram of one embodiment of a technique for a client device to support streaming of content using multiple bit rates.

The server (or another server) can transmit the playlist file(s) and the media files over the network in response to client requests in operation 275, as described in more detail with respect to FIGS. 3A-3B.

The playlist file(s) may be updated by a server for various reasons. The server may receive additional data to be provided to the client devices in operation 285. The additional data can be received after the playlist file(s) are stored in operation 255. The additional data may be, for example, additional portions of a live presentation, or additional information for an existing presentation. Additional data may include advertisements or statistics (e.g. scores or data relating to a sporting event). The additional data could be overlaid (through translucency) on the presentation or be presented in a sidebar user interface. The additional data can be segmented in the same manner as the originally received data. If the additional data constitutes advertisements, or other content to be inserted into the program represented by the playlist, the additional data can be stored (at least temporarily) in operation 215, segmented in operation 225 and stored in operation 235; prior to storage of the segmented additional data, the segments of the additional data can be encrypted. Then in operation 245 an updated playlist, containing the program and the additional data, would be generated. The playlist is updated based on the additional data and stored again in operation 255. Changes to the playlist file(s) should be made atomically from the perspective of the client device. The updated playlist replaces, in one embodiment, the previous playlist. As discussed below in greater detail, client devices can request the playlist multiple times. These requests enable the client devices to utilize the most recent playlist. In one embodiment, the additional data may be metadata; in this case, the playlist does not need to be updated, but the segments can be updated to include metadata. For example, the metadata may contain timestamps which can be matched with timestamps in the segments, and the metadata can be added to segments having matching timestamps.

The updated playlist may also result in the removal of media files. In one embodiment, a server should remove URIs, for the media files, from the playlist in the order in which they were added to the playlist. In one embodiment, if the server removes an entire presentation, it makes the playlist file(s) unavailable to client devices. In one embodiment, the server maintains the media files and the playlist file(s) for the duration of the longest playlist file(s) containing a media file to be removed to allow current client devices to finish accessing the presentation. Accordingly, every media file URI in the playlist file can be prefixed with an EXT-X-STREAM-INF tag to indicate the approximate cumulative duration of the media files indicated by the playlist file. In alternate embodiments, the media files and the playlist file(s) may be removed immediately.

Subsequent requests for the playlist from client devices result in the server providing the updated playlist in operation 275. In one embodiment, playlists are updated on a regular basis, for example, a period of time related to the target duration. Periodic updates of the playlist file allow the server to provide access to servers to a dynamically changing presentation.

Figure 2C:
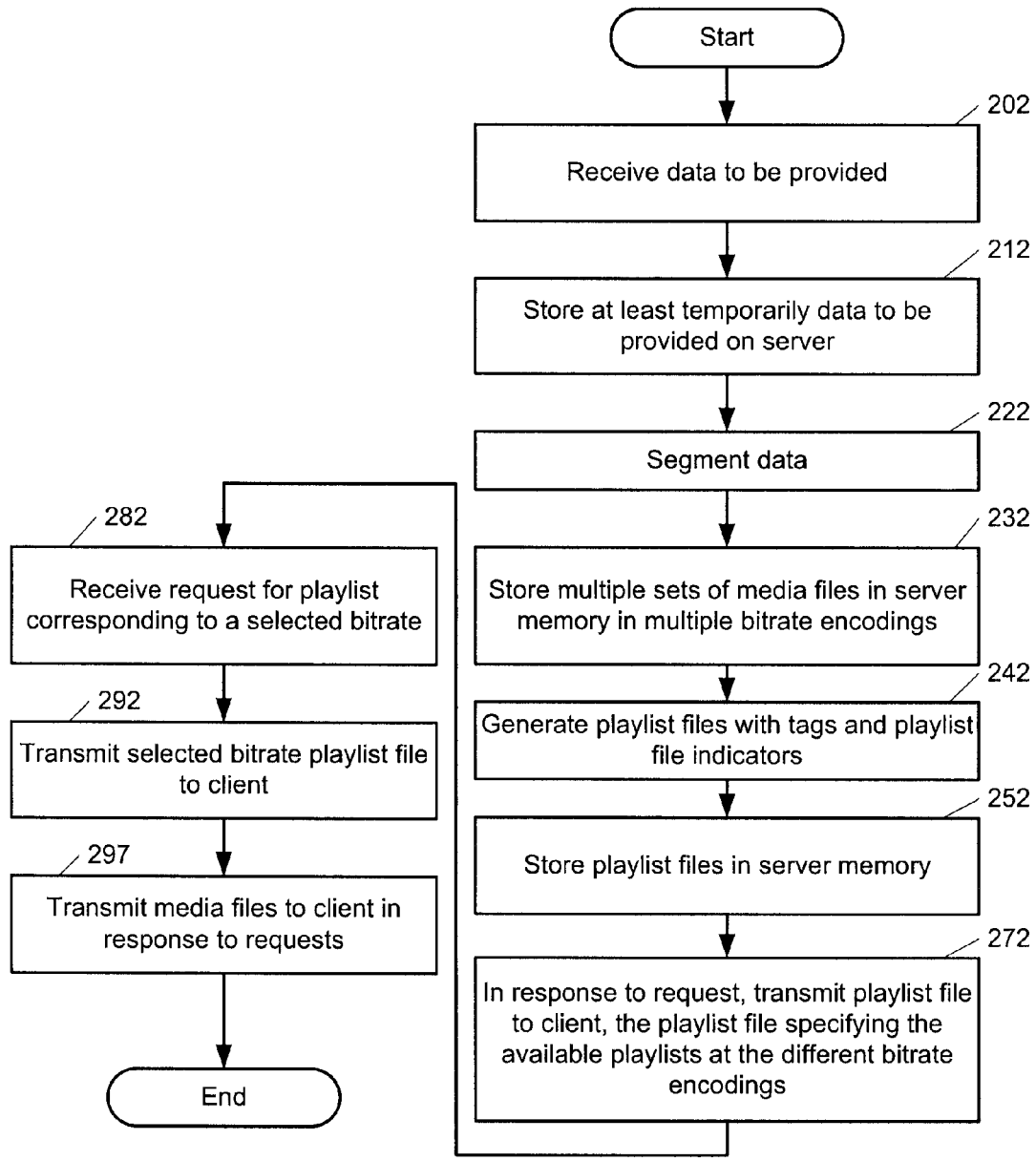
FIG. 2C is a flow diagram of one embodiment of a technique for one or more server devices to provide media content to client devices using multiple bit rates.

FIG. 2C is a flow diagram of one embodiment of a technique for one or more server devices to provide media content to client devices using multiple bit rates, which is one form of the use of alternative streams. The example of FIG. 2C is provided in terms of HTTP; however, other non-streaming protocols can be utilized in a similar manner. The example of FIG. 2C is provided in terms of a server performing certain tasks. However, any number of servers may be utilized. For example, the server that provides media files to client devices may be a different device than a server that segments the content into multiple media files.

In one embodiment, the server can offer multiple playlist files or a single playlist file with multiple media file lists in the single playlist file to provide different encodings of the same presentation. If different encodings are provided, playlist file(s) may include each variant stream providing different bit rates to allow client devices to switch between encodings dynamically (this is described further in connection with FIGS. 9A-9D). Playlist files having variant streams can include an EXT-X-STREAM-INF tag for each variant stream. Each EXT-X-STREAM-INF tag for the same presentation can have the same PROGRAM-ID attribute value. The PROGRAM-ID value for each presentation is unique within the variant streams.

In one embodiment, the server meets the following constraints when producing variant streams. Each variant stream can consist of the same content including optional content that is not part of the main presentation. The server can make the same period of content available for all variant streams within an accuracy of the smallest target duration of the streams. The media files of the variant streams are, in one embodiment, either MPEG-2 Transport Streams or MPEG-2 Program Streams with sample timestamps that match for corresponding content in all variant streams. Also, all variant streams should, in one embodiment, contain the same audio encoding. This allows client devices to switch between variant streams without losing content.

Referring to FIG. 2C, the server device receives content to be provided in operation 202. The server may then at least temporarily store the content in operation 212. The content to be provided is segmented into multiple media files in operation 222. Each media file is encoded for a selected bit rate (or a selected value of other encoding parameters) and stored on the server in operation 232. For example, the media files may be targeted for high-, medium- and low-bandwidth connections. The media files can be encrypted prior to storage. The encoding of the media files targeted for the various types of connections may be selected to provide a streaming experience at the target bandwidth level.

In one embodiment, a variant playlist is generated in operation 242 with tags as described herein that indicate various encoding levels. The tags may include, for example, an EXT-X-STREAM-INF tag for each encoding level with a URI to a corresponding media playlist file.

This variant playlist can include URIs to media playlist files for the various encoding levels. Thus, a client device can select a target bit rate from the alternatives provided in the variant playlist indicating the encoding levels and retrieve the corresponding playlist file. In one embodiment, a client device may change between bit rates during playback (e.g. as described with respect to FIGS. 9A-9D). The variant playlist indicating the various encoding levels is stored on the server in operation 252. In operation 242, each of the playlists referred to in the variant playlist can also be generated and then stored in operation 252.

In response to a request from a client device, the server may transmit the variant playlist that indicates the various encoding levels in operation 272. The server may receive a request for one of the media playlists specified in the variant playlist corresponding to a selected bit rate in operation 282. In response to the request, the server transmits the media playlist file corresponding to the request from the client device in operation 292. The client device may then use the media playlist to request media files from the server. The server provides the media files to the client device in response to requests in operation 297.

FIG. 3A is a flow diagram of one embodiment of a technique for a client device to support streaming of content using non-streaming protocols. The example of FIG. 3A is provided in terms of HTTP; however, other non-streaming protocols can be utilized in a similar manner. The methods shown in FIGS. 3A-3B can be performed by one client device or by several separate client devices. For example, in the case of any one of these methods, a single client device may perform all of the operations (e.g. request a playlist file, request media files using URIs in the playlist file, assemble the media files to generate and provide a presentation/output) or several distinct client devices can perform some but not all of the operations (e.g. a first client device can request a playlist file and request media files using URIs in the playlist file and can store those media files for use by a second client device which can process the media files to generate and provide a presentation/output).

The client device may request a playlist file from a server in operation 300. In one embodiment, the request is made according to an HTTP-compliant protocol. The request utilizes a URI to an initial playlist file stored on the server. In alternate embodiments, other non-streaming protocols can be supported. In response to the request, the server will transmit the corresponding playlist file to the client over a network. As discussed above, the network can be wired or wireless and can be any combination of wired or wireless networks. Further, the network may be a data network (e.g., IEEE 802.11, IEEE 802.16) or a cellular telephone network (e.g., 3G).

The client device can receive the playlist file in operation 310. The playlist file can be stored in a memory of the client device in operation 320. The memory can be, for example, a hard disk, a flash memory, a random-access memory. In one embodiment, each time a playlist file is loaded or reloaded from the playlist URI, the client checks to determine that the playlist file begins with a #EXTM3U tag and does not continue if the tag is absent. As discussed above, the playlist file includes one or more tags as well as one or more URIs to media files.

The client device can include an assembler agent that uses the playlist file to reassemble the original content by requesting media files indicated by the URIs in the playlist file in operation 330. In one embodiment, the assembler agent is a plug-in module that is part of a standard Web browser application. In another embodiment, the assembler agent may be a stand-alone application that interacts with a Web browser to receive and assemble the media files using the playlist file(s). As a further example, the assembler agent may be a special-purpose hardware or firmware component that is embedded in the client device.

The assembler causes media files from the playlist file to be downloaded from the server indicated by the URIs. If the playlist file contains the EXT-X-ENDLIST tag, any media file indicated by the playlist file may be played first. If the EXT-X-ENDLIST tag is not present, any media file except for the last and second-to-last media files may be played first. Once the first media file to play has been chosen, subsequent media files in the playlist file are loaded, in one embodiment, in the order that they appear in the playlist file (otherwise the content is presented out of order). In one embodiment, the client device attempts to load media files in advance of when they are required (and stores them in a buffer) to provide uninterrupted playback and to compensate for temporary variations in network latency and throughput.

The downloaded media file(s) can be stored in a memory on the client device in operation 340. The memory in which the content can be stored may be any type of memory on the client device, for example, random-access memory, a hard disk, or a video buffer. The storage may be temporary to allow playback or may be permanent. If the playlist file contains the EXT-X-ALLOW-CACHE tag and its value is NO, the client does not store the downloaded media files after they have been played. If the playlist contains the EXT-X-ALLOW-CACHE tag and its value is YES, the client device may store the media files indefinitely for later replay. The client device may use the value of the EXT-X-PROGRAM-DATE-TIME tag to display the program origination time to the user. In one embodiment, the client can buffer multiple media files so that it is less susceptible to network jitter, in order to provide a better user experience.

In one embodiment, if the decryption method is AES-128, then AES-128 CBC decryption is applied to the individual media files. The entire file is decrypted. In one embodiment, cipher block chaining is not applied across media files. The sequence number of the media file can be used as the initialization vector as described above.

From the memory, the content can be output from the client device in operation 350. The output or presentation may be, for example, audio output via built-in speakers or head phones. The output may include video that is output via a screen or projected from the client device. Any type of output known in the art may be utilized. In operation 351, the client device determines whether there are any more media files in the stored, current playlist which have not been played or otherwise presented. If such media files exist (and if they have not been requested) then processing returns to operation 330 in which one or more media files are requested and the process repeats. If there are no such media files (i.e., all media files in the current playlist have been played), then processing proceeds to operation 352, which determines whether the playlist file includes an end tag.

If the playlist includes an end tag (e.g., EXT-X-ENDLIST) in operation 352, playback ceases when the media files indicated by the playlist file have been played. If the end tag is not in the playlist, then the client device requests a playlist again from the server and reverts back to operation 300 to obtain a further or updated playlist for the program.

As discussed in greater detail with respect to FIG. 2B, a server may update a playlist file to introduce supplementary content (e.g., additional media file identifiers corresponding to additional media content in a live broadcast) or additional content (e.g. content further down the stream). To access the supplementary content or additional content, a client can reload the updated playlist from the server. This can provide a mechanism by which playlist files can be dynamically updated, even during playback of the media content associated with a playlist file. A client can request a reload of the playlist file based on a number of triggers. The lack of an end tag is one such trigger.

In one embodiment, the client device periodically reloads the playlist file(s) unless the playlist file contains the EXT-X-ENDLIST tag. When the client device loads a playlist file for the first time or reloads a playlist file and finds that the playlist file has changed since the last time it was loaded, the client can wait for a period of time before attempting to reload the playlist file again. This period is called the initial minimum reload delay. It is measured from the time that the client began loading the playlist file.

In one embodiment, the initial minimum reload delay is the duration of the last media file in the playlist file or three times the target duration, whichever is less. The media file duration is specified by the EXTINF tag. If the client reloads a playlist file and finds that it has not changed then the client can wait for a period of time before retrying. The minimum delay in one embodiment is three times the target duration or a multiple of the initial minimum reload delay, whichever is less. In one embodiment, this multiple is 0.5 for a first attempt, 1.5 for a second attempt and 3.0 for subsequent attempts; however, other multiples may be used.

Each time a playlist file is loaded or reloaded, the client device examines the playlist file to determine the next media file to load. The first file to load is the media file selected to play first as described above. If the first media file to be played has been loaded and the playlist file does not contain the EXT-X-MEDIA-SEQUENCE tag then the client can verify that the current playlist file contains the URI of the last loaded media file at the offset where it was originally found, halting playback if the file is not found. The next media file to load can be the first media file URI following the last-loaded URI in the playlist file.

If the first file to be played has been loaded and the playlist file contains the EXT-X-MEDIA-SEQUENCE tag, then the next media file to load can be the one with the lowest sequence number that is greater than the sequence number of the last media file loaded. If the playlist file contains an EXT-X-KEY tag that specifies a key file URI, the client device obtains the key file and uses the key inside the key file to decrypt the media files following the EXT-X-KEY tag until another EXT-X-KEY tag is encountered.

In one embodiment, the client device utilizes the same URI as previously used to download the playlist file. Thus, if changes have been made to the playlist file, the client device may use the updated playlist file to retrieve media files and provide output based on the media files.

Changes to the playlist file may include, for example, deletion of a URI to a media file, addition of a URI to a new media file, replacement of a URI to a replacement media file. When changes are made to the playlist file, one or more tags may be updated to reflect the change(s). For example, the duration tag may be updated if changes to the media files result in a change to the duration of the playback of the media files indicated by the playlist file.

FIG. 3B is a flow diagram of one embodiment of a technique for a client device to support streaming of content using multiple bit rates which is one form of alternative streams. The example of FIG. 3B is provided in terms of HTTP; however, other non-streaming protocols can be utilized in a similar manner.

The client device can request a playlist file in operation 370. As discussed above, the playlist file may be retrieved utilizing a URI provided to the client device. In one embodiment, the playlist file includes listings of variant streams of media files to provide the same content at different bit rates; in other words, a single playlist file includes URIs for the media files of each of the variant streams. The example shown in FIG. 3B uses this embodiment. In another embodiment, the variant streams may be represented by multiple distinct playlist files separately provided to the client that each provides the same content at different bit rates, and a variant playlist can provide a URI for each of the distinct playlist files. This allows the client device to select the bit rate based on client conditions.

The playlist file(s) can be retrieved by the client device in operation 375. The playlist file(s) can be stored in the client device memory in operation 380. The client device may select the bit rate to be used in operation 385 based upon current network connection speeds. Media files are requested from the server utilizing URIs included in the playlist file corresponding to the selected bit rate in operation 390. The retrieved media files can be stored in the client device memory. Output is provided by the client device utilizing the media files in operation 394 and the client device determines whether to change the bit rate.

In one embodiment, a client device selects the lowest available bit rate initially. While playing the media, the client device can monitor available bandwidth (e.g. current network connection bit rates) to determine whether the available bandwidth can support use of a higher bit rate for playback. If so, the client device can select a higher bit rate and access the media files indicated by the higher bit rate media playlist file. The reverse can also be supported. If the playback consumes too much bandwidth, the client device can select a lower bit rate and access the media files indicated by the lower bit rate media playlist file.

If the client device changes the bit rate in operation 394, for example, in response to a change in available bandwidth or in response to user input, the client device may select a different bit rate in operation 385. In one embodiment, to select a different bit rate the client device may utilize a different list of URIs included in the playlist file that corresponds to the new selected bit rate. In one embodiment, the client device may change bit rates during access of media files within a playlist.

If the bit rate does not change in operation 394, then the client device determines whether there are any more unplayed media files in the current playlist which have not been retrieved and presented. If such media files exist, then processing returns to operation 390 and one or more media files are retrieved using the URIs for those files in the playlist. If there are no such media files (i.e. all media files in the current playlist haven been played), then processing proceeds to operation 396 in which it is determined whether the playlist includes an end tag. If it does, the playback of the program has ended and the process has completed; if it does not, then processing reverts to operation 370, and the client device requests to reload the playlist for the program, and the process repeats through the method shown in FIG. 3B.

Figure 4:
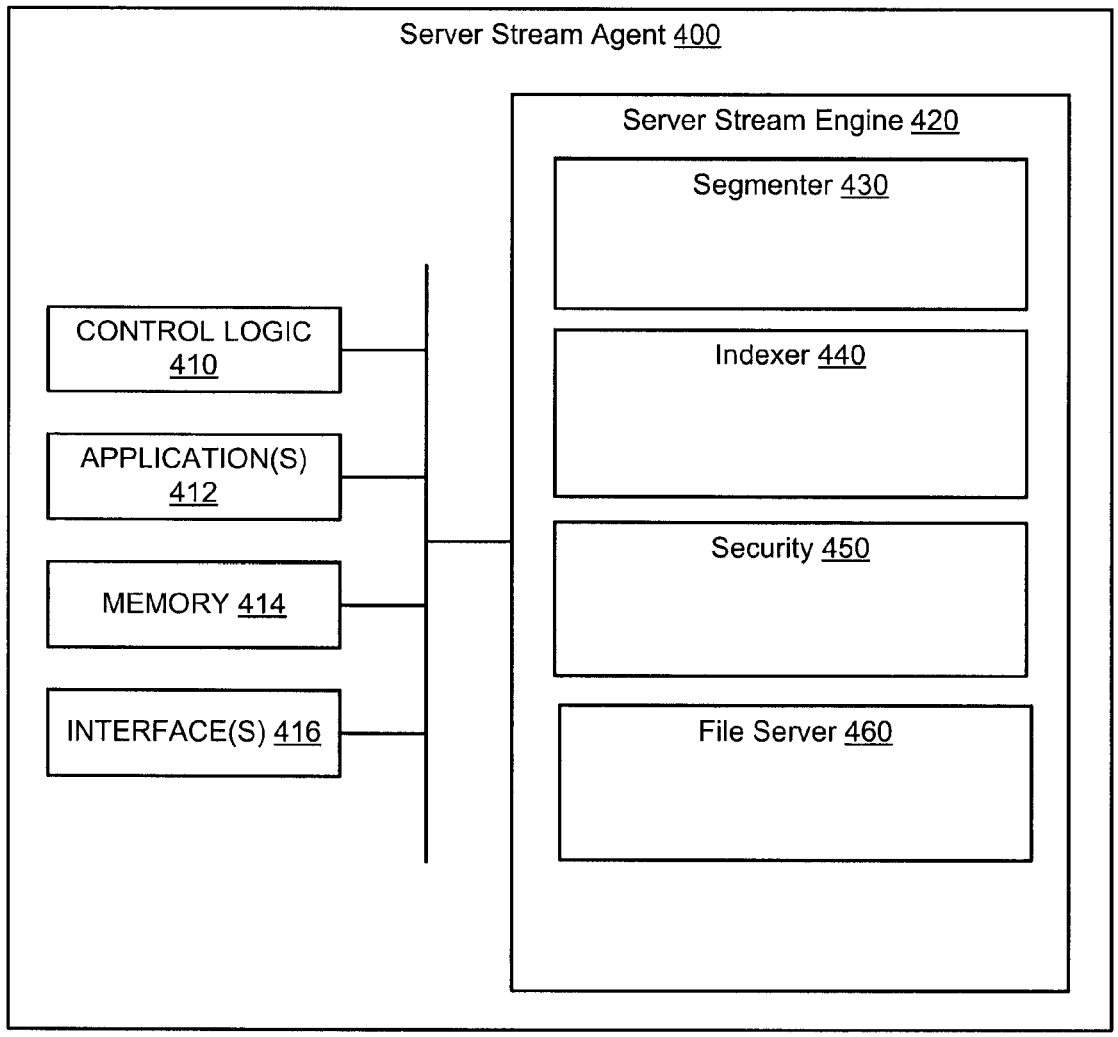
FIG. 4 is a block diagram of one embodiment of a server stream agent.

FIG. 4 is a block diagram of one embodiment of a server stream agent. It will be understood that the elements of server stream agent 400 can be distributed across several server devices. For example, a first server device can include the segmenter 430, the indexer 440 and security 450 but not the file server 460 and a second server device can include the file server 450 but not the segmenter 430, the indexer 440 and security 450. In this example, the first server device would prepare the playlists and media files but would not transmit them to client devices while one or more second server devices would receive and optionally store the playlists and media files and would transmit the playlists and media files to the client devices. Server stream agent 400 includes control logic 410, which implements logical functional control to direct operation of server stream agent 400, and hardware associated with directing operation of server stream agent 400. Logic may be hardware logic circuits or software routines or firmware. In one embodiment, server stream agent 400 includes one or more applications 412, which represent code sequence and/or programs that provide instructions to control logic 410.

Server stream agent 400 includes memory 414, which represents a memory device or access to a memory resource for storing data or instructions. Memory 414 may include memory local to server stream agent 400, as well as, or alternatively, including memory of the host system on which server stream agent 400 resides. Server stream agent 400 also includes one or more interfaces 416, which represent access interfaces to/from (an input/output interface) server stream agent 400 with regard to entities (electronic or human) external to server stream agent 400.

Server stream agent 400 also can include server stream engine 420, which represents one or more functions that enable server stream agent 400 to provide the real-time, or near real-time, streaming as described herein. The example of FIG. 4 provides several components that may be included in server stream engine 420; however, different or additional components may also be included. Example components that may be involved in providing the streaming environment include segmenter 430, indexer 440, security 450 and file server 460. Each of these components may further include other components to provide other functions. As used herein, a component refers to routine, a subsystem, etc., whether implemented in hardware, software, firmware or some combination thereof.

Segmenter 430 divides the content to be provided into media files that can be transmitted as files using a Web server protocol (e.g., HTTP). For example, segmenter 430 may divide the content into predetermined, fixed-size blocks of data in a pre-determined file format.

Indexer 440 may provide one or more playlist files that provide an address or URI to the media files created by segmenter 430. Indexer 440 may, for example, create one or more files with a listing of an order for identifiers corresponding to each file created by segmenter 430. The identifiers may be created or assigned by either segmenter 430 or indexer 440. Indexer 440 can also include one or more tags in the playlist files to support access and/or utilization of the media files.

Security 450 may provide security features (e.g. encryption) such as those discussed above. Web server 460 may provide Web server functionality related to providing files stored on a host system to a remote client device. Web server 460 may support, for example, HTTP-compliant protocols.

Figure 5:
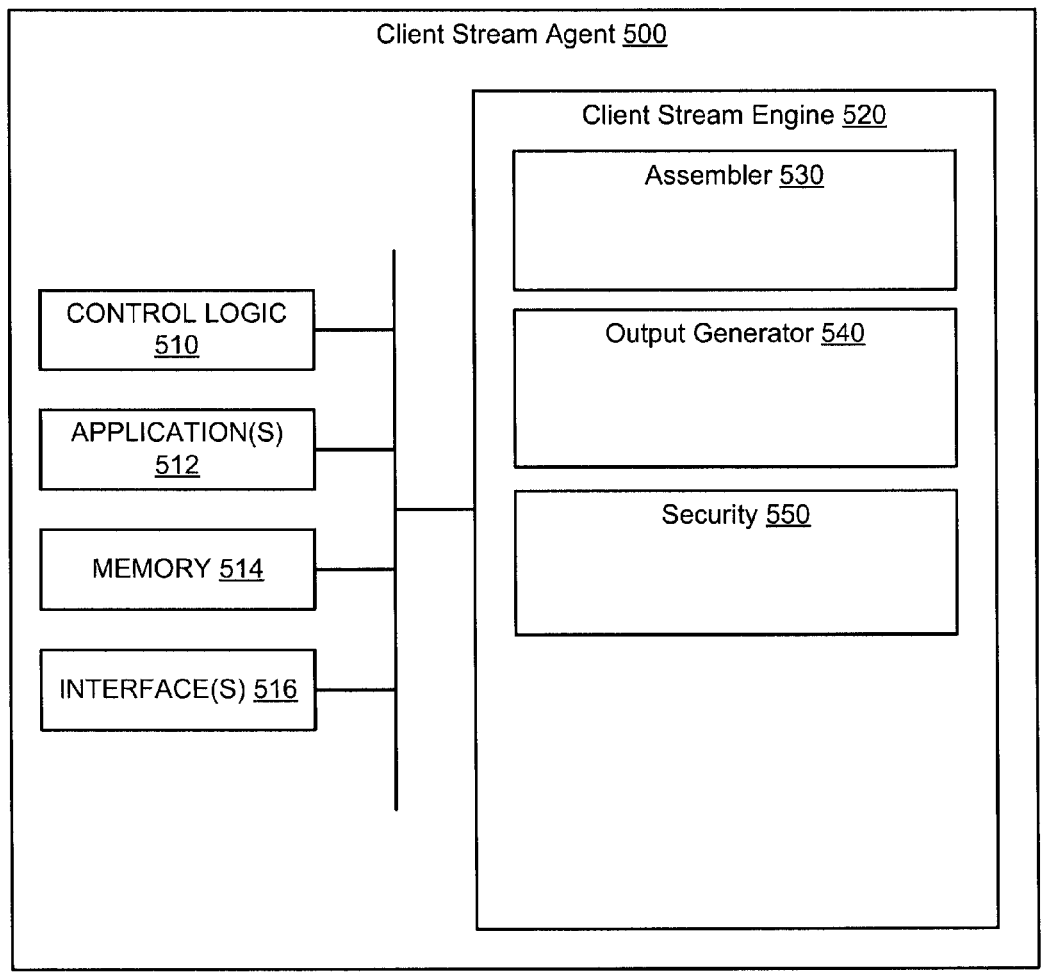
FIG. 5 is a block diagram of one embodiment of a client stream agent.

FIG. 5 is a block diagram of one embodiment of a client stream agent. It will be understood that the elements of a client stream agent can be distributed across several client devices. For example, a first client device can include an assembler 530 and security 550 and can provide a decrypted stream of media files to a second client device that includes an output generator 540 (but does not include an assembler 530 and security 550). In another example, a primary client device can retrieve playlists and provide them to a secondary client device which retrieves media files specified in the playlist and generates an output to present these media files. Client stream agent 500 includes control logic 510, which implements logical functional control to direct operation of client stream agent 500, and hardware associated with directing operation of client stream agent 500. Logic may be hardware logic circuits or software routines or firmware. In one embodiment, client stream agent 500 includes one or more applications 512, which represent code sequence or programs that provide instructions to control logic 510.

Client stream agent 500 includes memory 514, which represents a memory device or access to a memory resource for storing data and/or instructions. Memory 514 may include memory local to client stream agent 500, as well as, or alternatively, including memory of the host system on which client stream agent 500 resides. Client stream agent 500 also includes one or more interfaces 516, which represent access interfaces to/from (an input/output interface) client stream agent 500 with regard to entities (electronic or human) external to client stream agent 500.

Client stream agent 500 also can include client stream engine 520, which represents one or more functions that enable client stream agent 500 to provide the real-time, or near real-time, streaming as described herein. The example of FIG. 5 provides several components that may be included in client stream engine 520; however, different or additional components may also be included. Example components that may be involved in providing the streaming environment include assembler 530, output generator 540 and security 550. Each of these components may further include other components to provide other functions. As used herein, a component refers to routine, a subsystem, etc., whether implemented in hardware, software, firmware or some combination thereof.

Assembler 530 can utilize a playlist file received from a server to access the media files via Web server protocol (e.g., HTTP) from the server. In one embodiment, assembler 530 may cause to be downloaded media files as indicated by URIs in the playlist file. Assembler 530 may respond to tags included in the playlist file.

Output generator 540 may provide the received media files as audio or visual output (or both audio and visual) on the host system. Output generator 540 may, for example, cause audio to be output to one or more speakers and video to be output to a display device. Security 550 may provide security features such as those discussed above.

Figure 6:
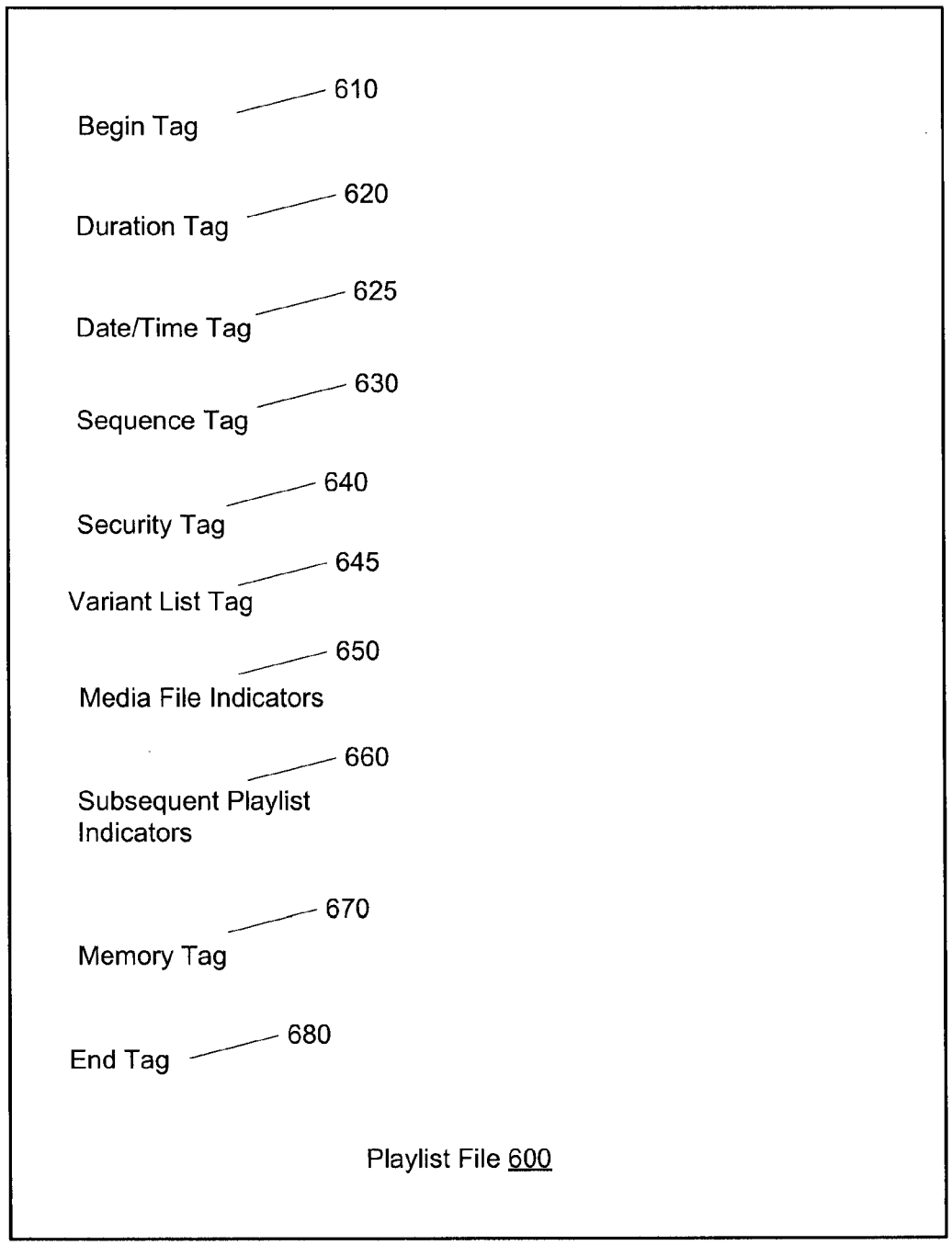
FIG. 6 illustrates on embodiment, of a playlist file with multiple tags.

FIG. 6 illustrates one embodiment of a playlist file with multiple tags. The example playlist of FIG. 6 includes a specific number and ordering of tags. This is provided for description purposes only. Some playlist files may include more, fewer or different combinations of tags and the tags can be arranged in a different order than shown in FIG. 6.

Begin tag 610 can indicate the beginning of a playlist file. In one embodiment, begin tag 610 is a #EXTM3U tag. Duration tag 620 can indicate the duration of the playback list. That is, the duration of the playback of the media files indicated by playback list 600. In one embodiment, duration tag 620 is an EXT-X-TARGETDURATION tag; however, other tags can also be used.

Date/Time tag 625 can provide information related to the date and time of the content provided by the media files indicated by playback list 600. In one embodiment, Date/Time tag 625 is an EXT-X-PROGRAM-DATE-TIME tag; however, other tags can also be used. Sequence tag 630 can indicate the sequence of playlist file 600 in a sequence of playlists. In one embodiment, sequence tag 630 is an EXT-X-MEDIA-SEQUENCE tag; however, other tags can also be used.

Security tag 640 can provide information related to security and/or encryption applied to media files indicated by playlist file 600. For example, the security tag 640 can specify a decryption key to decrypt files specified by the media file indicators. In one embodiment, security tag 640 is an EXT-X-KEY tag; however, other tags can also be used. Variant list tag 645 can indicate whether variant streams are provided by playlist 600 as well as information related to the variant streams (e.g., how many, bit rate). In one embodiment, variant list tag 645 is an EXT-X-STREAM-INF tag.

Media file indicators 650 can provide information related to media files to be played. In one embodiment, media file indicators 650 include URIs to multiple media files to be played. In one embodiment, the order of the URIs in playlist 600 corresponds to the order in which the media files should be accessed and/or played. Subsequent playlist indictors 660 can provide information related to one or more playback files to be used after playback file 600. In one embodiment, subsequent playlist indicators 660 can include URIs to one or more playlist files to be used after the media files of playlist 600 have been played.

Memory tag 670 can indicate whether and/or how long a client device may store media files after playback of the media file content. In one embodiment, memory tag 670 is an EXT-X-ALLOW-CACHE tag. End tag 680 indicates whether playlist file 600 is the last playlist file for a presentation. In one embodiment, end tag 680 is an EXT-X-ENDLIST tag.

The following section contains several example playlist files according to one embodiment.

Simple Playlist file

```
#EXTM3U
#EXT-X-TARGETDURATION:10
#EXTINF:5220,
http://media.example.com/entire.ts
EXT-X-ENDLIST
```

Sliding Window Playlist, using HTTPS

```
#EXTM3U
EXT-X-TARGETDURATION:8
EXT-X-MEDIA-SEQUENCE:2680
EXTINF:8,
https://priv.example.com/fileSequence2680.ts
EXTINF:8,
https://priv.example.com/fileSequence2681.ts
EXTINF:8,
https://priv.example.com/fileSequence2682.ts
```

Playlist file with encrypted media files

```
#EXTM3U
EXT-X-MEDIA-SEQUENCE:7794
EXT-X-TARGETDURATION:15
#EXT-X-KEY:METHOD=AES-128,URI="
https://priv.example.com/key.php?r=52"
#EXTINF:15,
http://media.example.com/fileSequence7794.ts
#EXTINF:15,
http://media.example.com/fileSequence7795.ts
#EXTINF:15,
http://media.example.com/fileSequence7796.ts
#EXT-X-KEY:METHOD=AES-128,URI="
https://priv.example.com/key.php?r=53"
#EXTINF:15,
http://media.example.com/fileSequence7797.ts
```

Variant Playlist file

```
#EXTM3U
EXT-X-STREAM-INF:PROGRAM-ID=1,BANDWIDTH=1280000
http://example.com/low.m3u8
EXT-X-STREAM-INF:PROGRAM-ID=1,BANDWIDTH=2560000
http://example.com/mid.m3u8
EXT-X-STREAM-INF:PROGRAM-ID=1,BANDWIDTH=7680000
http://example.com/hi.m3u8
#EXT-X-STREAM-INF:PROGRAM-
ID=1,BANDWIDTH=65000,CODECS="mp4a.40.5"
http://example.com/audio-only.m3u8
```

Figure 7:
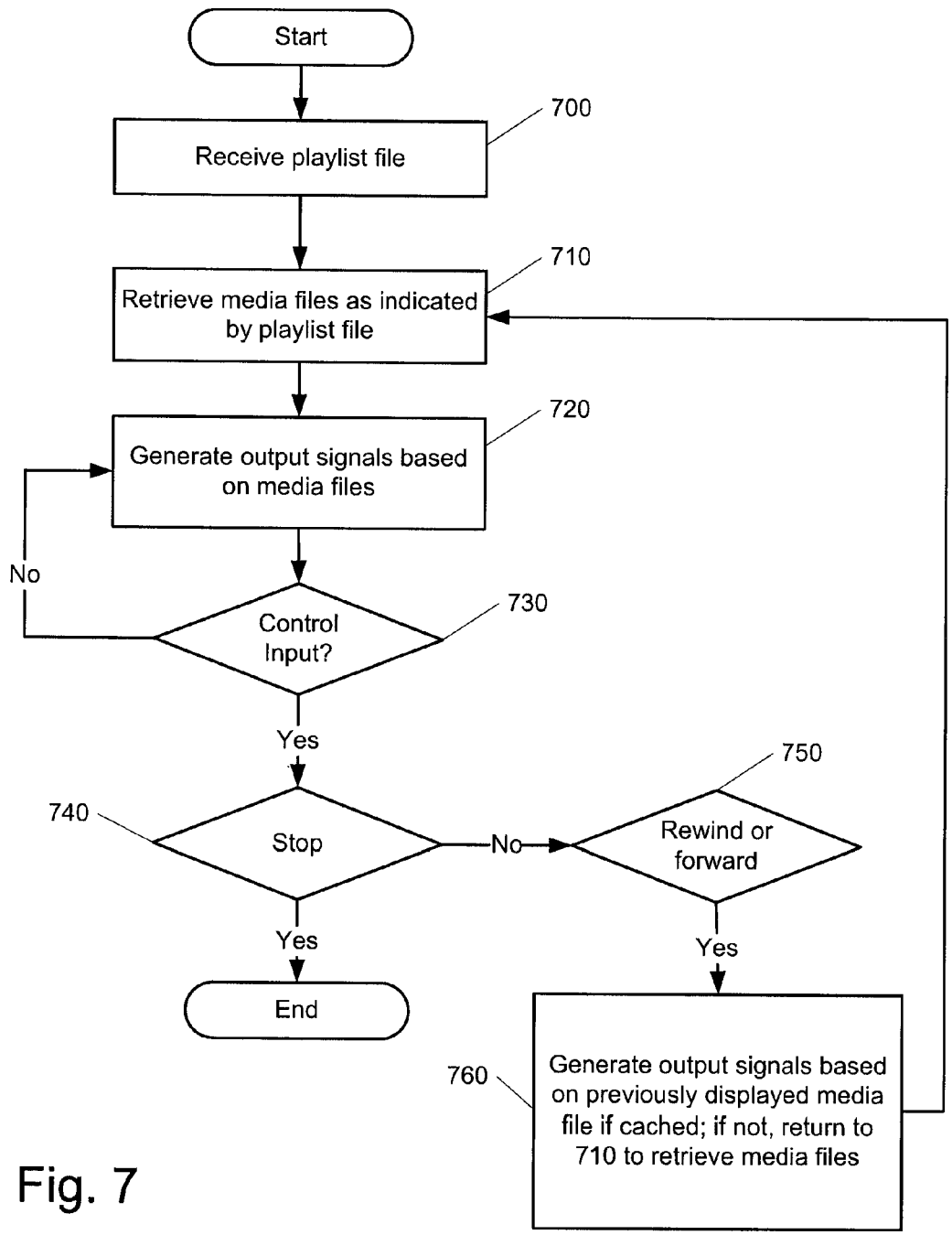
FIG. 7 is a flow diagram of one embodiment of a playback technique for assembled streams as described herein.

FIG. 7 is a flow diagram of one embodiment of a playback technique for assembled streams as described herein. In one embodiment, playback of the received media files can be controlled by the user to start, stop, rewind, etc. The playlist file is received by the client device in operation 700. The media files indicated by the playlist file are retrieved in operation 710. Output is generated based on the received media files in operation 720. Receiving and generating output based on media files can be accomplished as described above.

If control input is detected in operation 730, the client device can determine if the input indicates a stop in operation 740. If the input is a stop, the process concludes and playback stops. If the input indicates a rewind or forward request in operation 750, the client device can generate output based on previously played media files still stored in memory in operation 760. If these files are no longer in a cache, then processing reverts to operation 710 to retrieve the media files and repeats the process. In an alternate embodiment, playback can support a pause feature that halts playback without concluding playback as with a stop input.

Figure 9B:
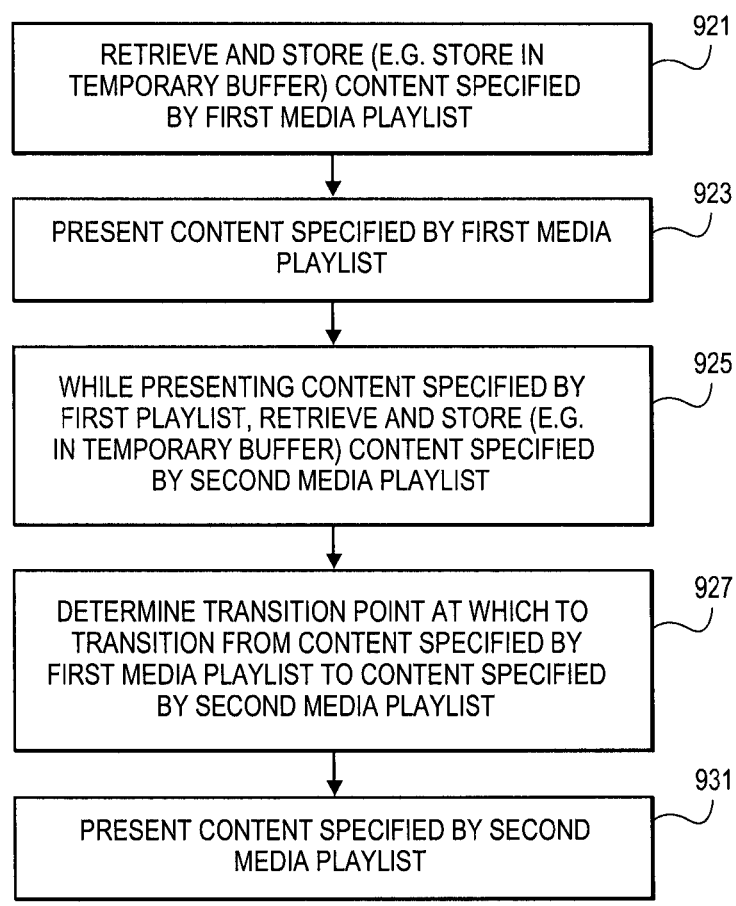
FIG. 9B is a further flowchart showing how a client device can switch between content in two playlists.

Methods for transitioning from one stream to another stream are further described with reference to FIGS. 9A-9D. One client device can perform each of these methods or the operations of each of these methods can be distributed across multiple client devices as described herein; for example, in the distributed case, one client device can retrieve the variant playlist and the two media playlists and provide those to another client device which retrieves media files specified by the two media playlists and switches between the two streams provided by the retrieved media files. It will also be understood that, in alternative embodiments, the order of the operations shown may be modified or there can be more or fewer operations than shown in these figures. The methods can use a variant playlist to select different streams. A variant playlist can be retrieved and processed in operation 901 to determine available streams for a program (e.g. a sporting event). Operation 901 can be done by a client device. A first stream can be selected from the variant playlist in operation 903, and a client device can then retrieve a media playlist for the first stream. The client device can process the media playlist for the first stream in operation 905 and also measure or otherwise determine a bit rate of the network connection for the first stream in operation 907. It will be appreciated that the sequence of operations may be performed in an order which is different than what is shown in FIG. 9A; for example, operation 907 may be performed during operation 903, etc. In operation 911 the client device selects an alternative media playlist from the variant playlist based on the measured bit rate from operation 907; this alternative media playlist may be at a second bit rate that is higher than the existing bit rate of the first stream. This typically means that alternative stream will have a higher resolution than the first stream. The alternative media playlist can be selected if it is a better match than the current playlist for the first stream based on current conditions (e.g. the bit rate measured in operation 907). In operation 913, the alternative media playlist for an alternate stream is retrieved and processed. This typically means that the client device can be receiving and processing both the first stream and the alternative stream so both are available for presentation; one is presented while the other is ready to be presented. The client device then selects a transition point to switch between the versions of the streams in operation 915 and stops presenting the first stream and begins presenting the alternative stream. Examples of how this switch is accomplished are provided in conjunction with FIGS. 9B-9D. In some embodiments, the client device can stop receiving the first stream before making the switch.

FIG. 9B shows that the client device retrieves, stores and presents content specified by the first media playlist (e.g. the first stream) in operations 921 and 923, and while the content specified by the first playlist is being presented the client device in operation 925 also retrieves and stores content specified by the second media playlist (e.g. the second stream). The retrieval and storage (e.g. in a temporary buffer) of the content specified by the second media playlist while presenting the content obtained from the first media playlist creates an overlap 955 in time of the program's content (shown in FIG. 9D) that allows the client device to switch between the versions of the program without a substantial interruption of the program. In this way, the switch between the versions of the program can be achieved in many cases without the user noticing that a switch has occurred (although the user may notice a higher resolution image after the switch in some cases) or without a substantial interruption in the presentation of the program. In operation 927, the client device determines a transition point at which to switch from content specified by the first media playlist to content specified by the second media playlist; an example of a transition point (transition point 959) is shown in FIG. 9D. The content specified by the second media playlist is then presented in operation 931 after the switch.

Figure 9C:
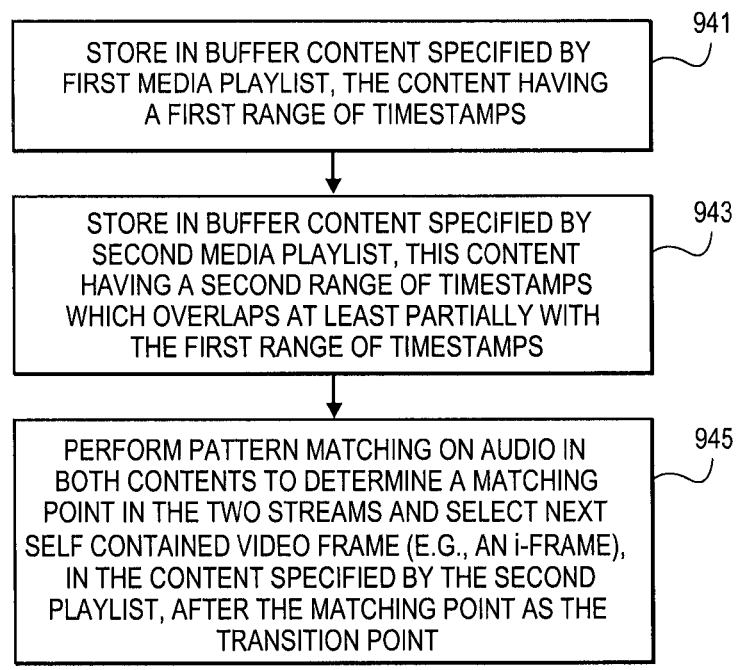
FIG. 9C is a further flowchart showing an example of how a client device can switch between content using audio pattern matching.
Figure 9D:
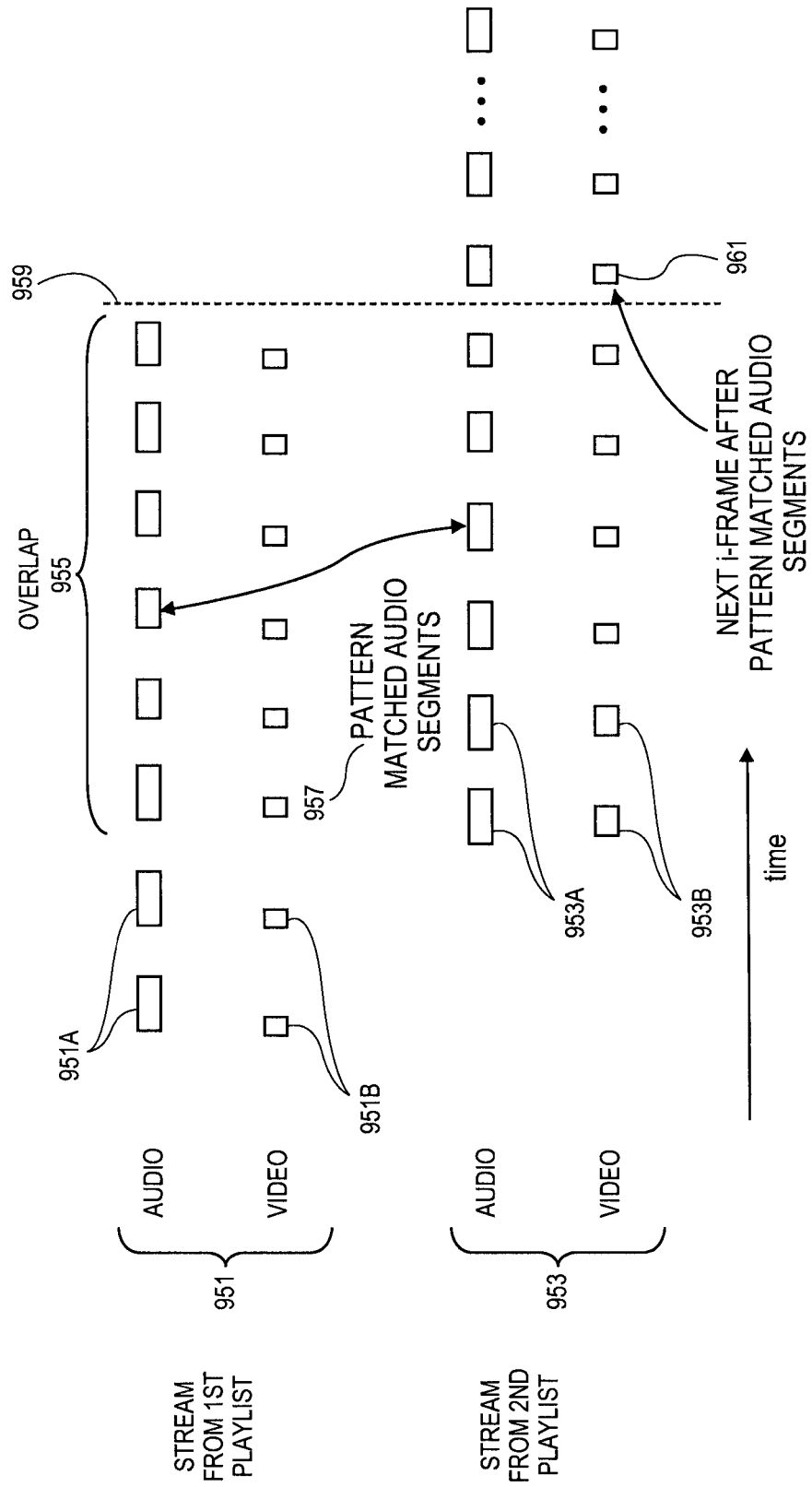
FIG. 9D shows diagrammatically how the method of FIG. 9C is implemented with audio pattern matching.

The method shown in FIGS. 9C and 9D represents one embodiment for determining the transition point; this embodiment relies upon a pattern matching on audio samples from the two streams 951 and 953 to determine the transition point. It will be appreciated that alternative embodiments can use pattern matching on video samples or can use the timestamps in the two streams, etc. to determine the transition point. The method can include, in operation 941, storing content (e.g. stream 951) specified by the first media playlist in a buffer; the buffer can be used for the presentation of the content and also for the pattern matching operation. The stream 951 includes both audio samples 951A and video samples 951B. The video samples can use a compression technique which relies on i-frames or key frames which have all necessary content to display a single video frame. The content in stream 951 can include timestamps specifying a time (e.g. time elapsed since the beginning of the program), and these timestamps can mark the beginning of each of the samples (e.g. the beginning of each of the audio samples 951A and the beginning of each of the video samples 951B). In some cases, a comparison of the timestamps between the two streams may not be useful in determining a transition point because they may not be precise enough or because of the difference in the boundaries of the samples in the two streams; however, a comparison of the timestamps ranges can be used to verify there is an overlap 955 in time between the two streams. In operation 943, the client device stores in a buffer content specified by the second media playlist; this content is for the same program as the content obtained from the first media playlist and it can include timestamps also. In one embodiment, timestamps, if not present in a stream, can be added to a playlist for a stream; for example, in one embodiment an ID3 tag which includes one or more timestamps can be added to an entry in a playlist, such as a variant playlist or a media playlist. The entry may, for example, be in a URI for a first sample of an audio stream. FIG. 9D shows an example of content 953 obtained from the second media playlist, and this includes audio samples 953A and video samples 953B. In operation 945, the client device can perform a pattern matching on the audio samples in the two streams 951 and 953 to select from the overlap 955 the transition point 959 which can be, in one embodiment, the next self contained video frame (e.g. i-frame 961) after the matched audio segments (e.g. segments 957). Beginning with i-frame 961 (and its associated audio sample), presentation of the program uses the second stream obtained from the second media playlist. The foregoing method can be used in one embodiment for both a change from a slower to a faster bit rate and for a change from a faster to a slower bit rate, but in another embodiment the method can be used only for a change from a slower to a faster bit rate and another method (e.g. do not attempt to locate a transition point but attempt to store and present content from the slower bit rate stream as soon as possible) can be used for a change from a faster to a slower bit.

Figure 10:
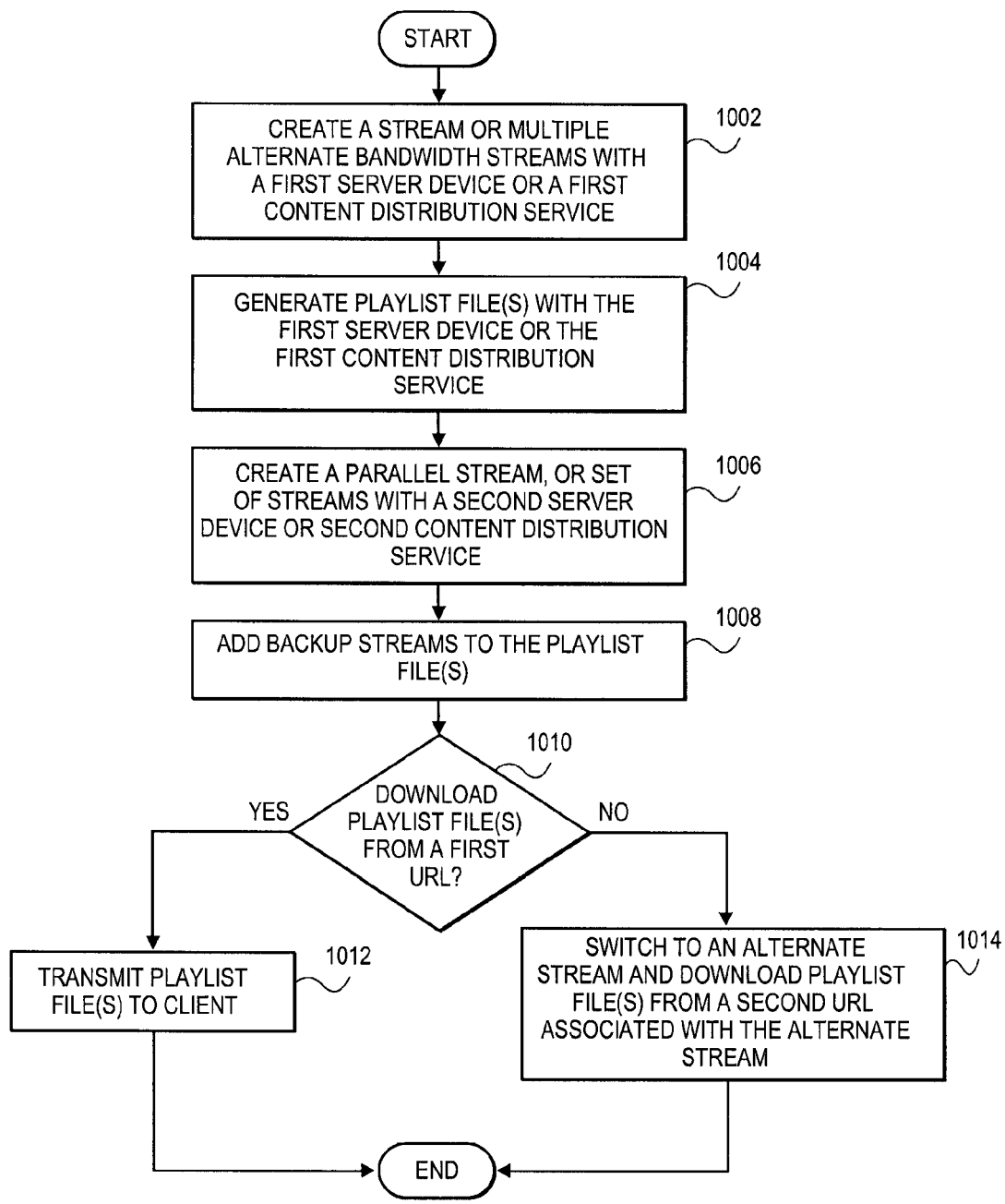
FIG. 10 is a flow diagram of one embodiment of a technique for providing multiple redundant locations that provide media content to client devices using alternative streams.

FIG. 10 is a flow diagram of one embodiment of a technique for providing multiple redundant locations that provide playlists or media content or both to client devices using alternative streams. If a playlist contains alternate streams as discussed above, then alternate streams can not only operate as bandwidth or device alternates, but also as failure fallbacks. For example, if the client is unable to reload the playlist file for a stream (due to a 404 error or a network connection error, for example), the client can attempt to switch to an alternate stream. Referring to FIG. 10, to implement failover protection, a first server device or first content distribution service is configured to create a stream, or multiple alternate bandwidth streams in operation 1002 as discussed in conjunction with the description of FIG. 2C. In operation 1004, the first server device or first content distribution service generates playlist file(s) from the stream(s) generated in operation 1002. A second server device or second content distribution service can create a parallel stream, or set of streams, in operation 1006 and also create a playlist. These parallel stream(s) can be considered backup streams. Next, the list of backup streams is added to the playlist file(s) in operation 1008 so that the backup stream(s) at each bandwidth is listed after the primary stream. For example, if the primary stream comes from server ALPHA, and the backup stream is on server BETA, then a playlist file might be as follows:

```
#EXTM3U
#EXT-X-STREAM-INF:PROGRAM-ID=1, BANDWIDTH=200000
http://ALPHA.mycompany.com/low/prog_index.m3u8
#EXT-X-STREAM-INF:PROGRAM-ID=1, BANDWIDTH=200000
http://BETA.mycompany.com/low/prog_index.m3u8
#EXT-X-STREAM-INF:PROGRAM-ID=1, BANDWIDTH=500000
http://ALPHA.mycompany.com/mid/prog_index.m3u8
#EXT-X-STREAM-INF:PROGRAM-ID=1, BANDWIDTH=500000
http://BETA.mycompany.com/mid/prog_index.m3u8
```

Note that the backup streams are intermixed with the primary streams in the playlist with the backup at each bandwidth is listed after the primary for that bandwidth. A client is not limited to a single backup stream set. In the example above, ALPHA and BETA could be followed by GAMMA, for instance. Similarly, it is not necessary to provide a complete parallel set of streams. A single low-bandwidth stream may be provided on a backup server, for example.

Figure 11:
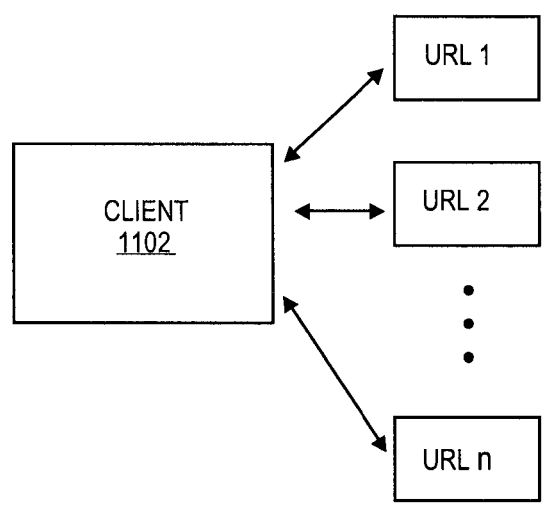
FIG. 11 illustrates a network in which a client 1102 communicates bi-directionally with one or more URLs in accordance with one embodiment.

In operation 1010, the client attempts to download playlist file(s) from a first URL using a first stream associated with the first server device or the first content distribution service. FIG. 11 illustrates a network in which a client 1102 communicates bi-directionally with one or more URLs, server devices or content distribution services, in accordance with one embodiment. The playlist file(s) may be transmitted from the first URL, server device or content distribution service in operation 1012 to the client 1102. If a client is unable to download the playlist file(s) from the first URL, server device, or content distribution service (e.g., due to an error in reloading the index file for a stream), the client attempts to switch to an alternate stream. In the event of a failure (e.g., index load failure) on one stream (e.g., operation 1010), the client chooses the highest bandwidth alternate stream that the network connection supports in operation 1014. If there are multiple alternates at the same bandwidth, the client chooses among them in the order listed in the playlist. For example, if the client 1102 is not able to successfully download from URL 1, it may download from URL 2 or another URL in which case the playlist file(s) are transmitted from the alternative URL to the client. This feature provides redundant streams that will allow media to reach clients even in the event of severe local failures, such as a server crashing or a content distributor node going down.

The failover protection provides the ability to provide multiple redundant locations from which clients can retrieve playlists and media files. Thus, if the client cannot retrieve a stream from a first location, it can attempt to access the stream from a secondary, tertiary, etc. location.

In one embodiment, to indicate the additional locations from which the client can retrieve a playlist, the same variant playlist tag would be provided with the same bandwidth, but a new URI of the redundant location. The client initially can attempt to access the first URL associated with the desired bandwidth. If it cannot download the playlist from the first URL, it then can attempt to access the next URL presented for the bandwidth, and so on until it has exhausted all the possibilities.

An example below includes 1 redundant location for the 2560000 bandwidth and 2 redundant locations for the 7680000 bandwidth.

```
#EXTM3U
EXT-X-STREAM-INF:PROGRAM-ID=1,BANDWIDTH=1280000
http://example.com/low.m3u8
EXT-X-STREAM-INF:PROGRAM-ID=1,BANDWIDTH=2560000
http://example.com/mid.m3u8
#EXT-X-STREAM-INF:PROGRAM-ID=1,BANDWIDTH=2560000
http://example1.com/mid-redundant2.m3u8
#EXT-X-STREAM-INF:PROGRAM-ID=1,BANDWIDTH=7680000
http://example.com/hi.m3u8
#EXT-X-STREAM-INF:PROGRAM-ID=1,BANDWIDTH=7680000
http://example2.com/hi-redudant2.m3u8
#EXT-X-STREAM-INF:PROGRAM-ID=1,BANDWIDTH=7680000
http://example3.com/hi-redudant3.m3u8
#EXT-X-STREAM-INF:PROGRAM-
ID=1,BANDWIDTH=65000,CODECS="mp4a.40.5"
http://example.com/audio-only.m3u8
```

Note that in this example both the filenames (e.g., mid-redundant2.m3u8) and the actual URL (e.g., http://example2.com <http://example2.com/>, http://example3.com <http://example3.com/>) change. However, in one embodiment, a redundant location can be a change only to the filename or only to the website.

In one embodiment, a playlist can be compressed by a server device and sent to a client device in a compressed form. The compressed playlist normally requires fewer bits to represent the playlist than an uncompressed playlist, and hence a compressed playlist uses less available bandwidth of a network, such as a wireless cellular telephone network, when being transmitted or received. In one embodiment, the playlist can be compressed by a web server according to a built-in compression technique or facility that is used by a web server that is compliant with or compatible with a transfer protocol such as the HTTP 1.1 standard protocol; an example of such a compression technique or facility is the deflate or the gzip compression facility of HTTP 1.1. Other standards based compression facilities which are part of a standards based transfer protocol can be used in other embodiments. The use of compressed playlists can be, in one embodiment, an optional feature of server devices and client devices. In one embodiment, the playlist can be textual content (e.g. a text file) and be compressed efficiently with deflate or gzip by a standards based web server and then decompressed automatically by a client device. A description of a version of the gzip compression facility can be found at www.ietf.org/rfc/rfc1952.txt; a version of the deflate compression facility can be found at www.ietf.org/rfc/rfc1951.txt. Many web servers and many web browsers on a client device can automatically support the deflate or the gzip facilities.

In one embodiment, a client device can periodically request an updated playlist; for example, the client device can request, from a server, an updated playlist every few seconds (e.g. every 10, 20, or 30 seconds or some other period of time). A growing playlist, such as a playlist for a live on-going baseball game that allows a client to start viewing from the beginning of the live game at any time during the live game, can become large enough that use of compression can limit the consumption of a network's bandwidth as the growing playlist is repeatedly sent through the network.

In one embodiment, a client device can optionally specify, when it requests a playlist (such as an updated playlist), what compression techniques it can support (such as deflate or gzip); support for these techniques means that the client device can decompress or decode the compressed or encoded content. The client device's request for a playlist, with the optional specification of a compression technique, is received by a web server which, in one embodiment, is not required to support a compression technique for a playlist but can send an uncompressed playlist. The web server can respond to the client device's request by sending, to the client device, an uncompressed playlist or a playlist compressed using one of the compression techniques specified in the client device's request for the playlist. The client device receives the playlist and uses it as described herein; if the playlist is compressed, it is decoded using a decoder on the client device such as a decoder in a web browser on the client device.

Figure 12A:
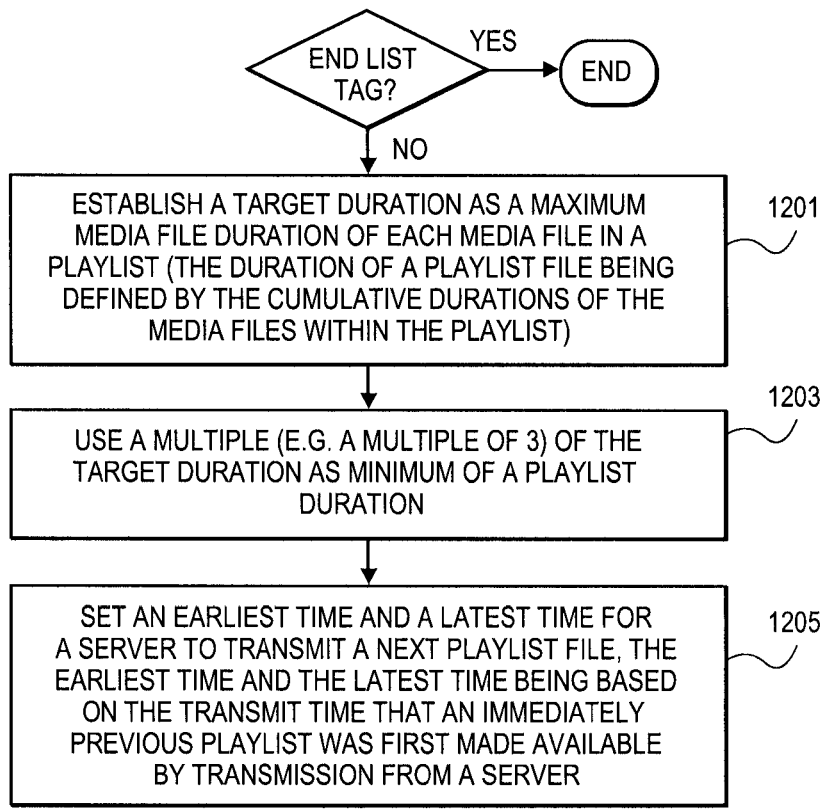
FIG. 12A is a flowchart depicting a method according to one embodiment of the present invention for controlling the creation and distribution of playlists.
Figure 12B:
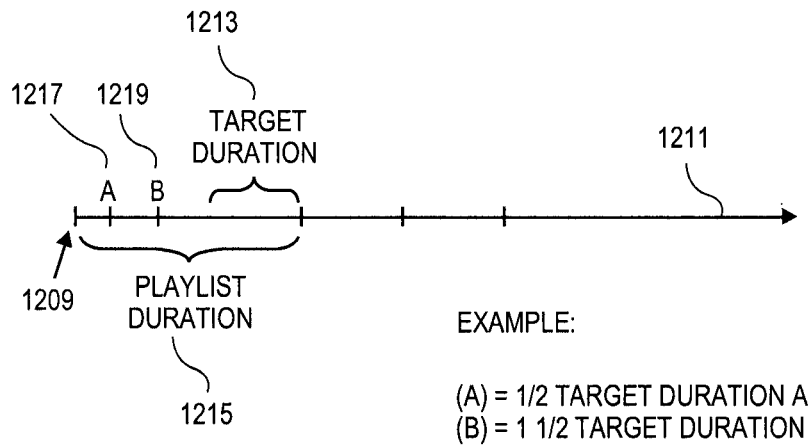
FIG. 12B shows a timeline of how, in one embodiment, playlists can be transmitted or otherwise distributed using, for example, a method as in FIG. 12A.

FIGS. 12A and 12B show one embodiment of a server timing model for the transmission of succeeding playlists when additional media files will be added (e.g., when the current playlist being transmitted does not contain an EXT-X-ENDLIST tag). If a current playlist does not contain the final media file of a presentation, then a data processing system or server can make a new version of the playlist that contains at least one new media file URI. FIGS. 12A and 12B show one embodiment of a server timing model for ensuring that the new playlist with the new media file URI will be available for transmission to client devices in a manner continuous with the previous version of the playlist. This model may, for example, be used when media files, specified in the playlist, are allowed to be short in duration (e.g. only a few seconds long). In one embodiment, by setting a maximum media file duration for each media file and by setting a minimum amount of a playlist duration based upon the maximum media file duration, a server or other data processing system can ensure a continuous distribution or transmission of the content to client devices even when each media file is only a few seconds in duration.

Referring now to FIG. 12A, operation 1201 can be used to establish a target duration as a maximum media file duration of each media file in a playlist if an endlist tag is not present in a next playlist file as determined in operation 1200. Operation 1201 can be performed by a data processing system which is dividing a stream of data into multiple media files and storing those multiple media files as individual files. The process of dividing the stream can utilize the target duration (e.g. the target duration of the current playlist file) to ensure that each media file specified in the playlist file is less than the target duration (or is less than the target duration plus or minus a small period of time). The data processing system which generates a playlist can also ensure that the duration of the playlist file can be at least a multiple of the target duration as shown in operation 1203. In one embodiment, the multiple can be three target durations (or some other multiple of the target duration) which is used as a minimum of a playlist duration, wherein the duration of a playlist is defined by the cumulative durations of the media files specified within the playlist. A system (e.g. a server) that generates a playlist can comply with the minimum duration of the playlist by ensuring that each playlist specify at least a sufficient number of media files to satisfy the minimum duration; for example, if the minimum duration is 3 target durations, then each playlist should include at least 3 target durations.

Operation 1205 can also be used as a further mechanism to ensure that a consistent and continuous stream is made available from a data processing system such as a server which is transmitting the media files. This further mechanism can reduce the amount of polling or pulling, by a client device, to determine whether there are changes to the playlist. In operation 1205, a server can be set up such that there is an earliest time and a latest time for the server to transmit the next playlist file. The earliest time and the latest time can be used as a time window that is based on or relative to the time that the previous playlist file (which immediately precedes the new playlist file) was made available. The earliest time can, for example, be based upon a time when an immediately previous playlist was first made available for transmission (but not necessarily have been transmitted) from the server. The latest time can, for example, also be based upon a time when that immediately previous playlist was first made available for transmission from the server (but not necessarily have been transmitted). For example, in one embodiment the earliest time may be specified as a time that is no earlier than a first predetermined percentage (e.g. one-half) of the target duration (e.g. the target duration set in operation 1201) from when the previous playlist file was first made available for transmission, and the latest time can be set to be no later than a second predetermined percentage (e.g. one and a half times) of the target duration from when the immediately previous playlist file was first made available for transmission from the server. The time of when the playlist file was first made available for transmission could be, in one embodiment, the time of creation of the playlist file (that time being recorded by a file system on the server). This example is shown in FIG. 12B which includes a timeline 1211. Target duration 1213 is a portion of the playlist duration 1215 which represents the duration of an immediately previous playlist that was first made available by one or more servers at time 1209 which is the time at which the previous playlist file was first made available for transmission. The media files specified in that playlist can begin their transmission at nearly time 1209. According to the server timing model shown in FIG. 12B, a server should not transmit the next playlist file until the earliest time 1217 which is one-half of a target duration after time 1209, and the server should not make available the next playlist file any later than time 1219 which has been specified to be one and a half target durations after time 1209 in the example shown in FIG. 12B. This server timing model can be used to ensure that playlist files are made available to client devices to provide the client device with enough time to retrieve media files specified in the playlist and to then present those media files consistently and continuously without stalls in the presentation of the content during playback. In one embodiment, these server timing models can be used when the content is a transmission of a live event and a stream of data from the live event is being divided into multiple media files and then those multiple media files are transmitted in near real time relative to the live event to client devices that receive the multiple media files shortly after they were divided out of the stream of data of the live event, such as a baseball game, etc.

Figure 13:
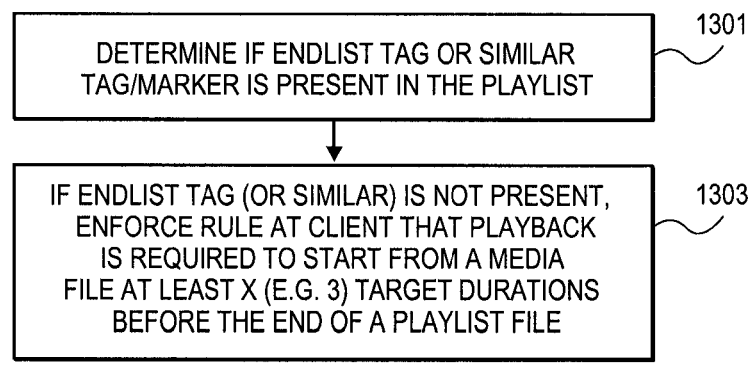
FIG. 13 is a method, according to one embodiment of the invention, for controlling playback at a client device.

FIG. 13 shows an embodiment of a method which may be used to avoid stalls in playback at a client device, particularly when a client device is presenting, in near real-time, a live event and when the client device is presenting content which is near the current end (being the most recent in time) of a live event. For example, if the live event is a baseball game, a user of a client device may prefer to watch only the most recent events in the game rather than beginning to watch the game from the very beginning of the game. If a user desires to watch only the most recent events of a game that is in progress, the user may seek to set playback to start from a point beginning in the last 10 or 15 seconds from the end of the available media stream. Problems or delays in a network can suddenly cause the data to become unavailable and can prevent new data from becoming available, and hence in a very short period of time, the client device can run out of content to present when a user has set a client device to operate in this mode. The method of FIG. 13 can be employed in order to mitigate the chances of this happening by enforcing a rule at a client device that playback is required to start at a start point which is at least a period of time (for example, 30 seconds) before an end of the current playlist file. For example, if a playlist file has 5 media files specified within it (each media file being 10 seconds long), then one implementation of this rule may be to enforce a start point to be no later than the third media file in the sequence of five media files specified in the playlist. Referring now to FIG. 13, operation 1301 can be used to determine whether or not an endlist tag or marker is present in the playlist. If such an endlist tag is present, then the method of FIG. 13 can stop as no new content will be added to the playlist, so there is no need to enforce the rule in operation 1303 in one embodiment. On the other hand, if there is no endlist tag present in the playlist, then a rule can be enforced at a client device which requires a start point to be at least a period of time before an end of the playlist file. The period of time can be specified based upon target durations of the media files. For example, in one embodiment, the client device can be required to start from a media file that is more than three target durations from the end of the playlist file.

Figure 14A:
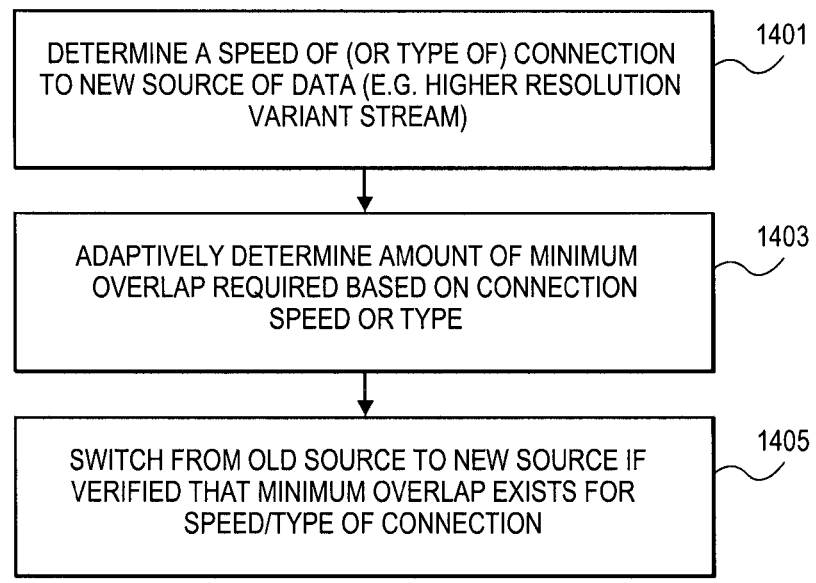
FIG. 14A shows a flowchart depicting a method, in one embodiment, for adaptively determining an amount of minimum overlap based upon connection speed or connection type.

Another aspect of the present invention relates to methods which can be used when switching between streams from two playlists (e.g. two variant streams) or other switching between two sets of media files. An example of a method for switching between streams from two different playlists has been provided in conjunction with FIGS. 9A, 9B, 9C, and 9D. In that method, an overlap in time between the two streams can be used to ensure a consistent and continuous playback such that a switch or transition between the streams can be seamless. As shown in FIG. 9D, the overlap 955 represents a period in time in which media content from both streams is stored at a client device and capable of being played back at the client device, thereby allowing a seamless switch between the two streams. In one embodiment, the overlap may be a minimum number which never varies and is set within the client device. While this embodiment can work well, there can be times when the overlap can be unnecessarily too long. In other words, the overlap can prevent a switch or transition from occurring even though a device is ready to make the transition. For example, when switching from a lower resolution to a higher resolution, an unnecessarily long overlap can force the user to watch the lower resolution presentation for a period of time when the higher resolution presentation is already available and ready to be presented. Higher speed connections can, for example, provide the ability to quickly develop an overlap which can be shorter than an overlap required for a lower speed connection or type of connection. In an embodiment according to FIG. 14A, a client device can adapt to the connection speed or connection type and modify the minimum overlap required based upon the connection speed or connection type. For example, if the connection speed or type is fast then the minimum overlap can be reduced relative to a minimum overlap required for a lower connection speed or connection type. As conditions change (e.g. the client device loses a 3G connection and must rely upon a 2G or slower connection), then the minimum overlap can be changed. Hence, the client device can adapt the minimum overlap based upon the connection speed or type. Referring now to FIG. 14A, in operation 1401, a client device can determine a speed of or type of connection. Referring back to FIG. 9D, it can be seen that a second stream of data from a second playlist is a new source of data which is being received while the client device also receives the stream from a first playlist. At this time, the client device can determine a speed of connection or a type of connection in order to determine, in operation 1403, a minimum amount of overlap required based upon the current connection speed or connection type. As conditions change, this minimum overlap can be adapted based upon the changing conditions, such as wireless connections to cellular telephone towers, WiFi basestations, etc. This may be particularly advantageous when the client device is moving through a wireless cellular telephone network or other data network. After establishing that the minimum overlap for the current condition exists, then the client device can, in operation 1405, switch or transition from the stream from the first playlist or the old source to the new source which may be the stream from the second playlist. An example of this transition has been provided in connection with the description associated with FIGS. 9A-9D.

Figure 14B:
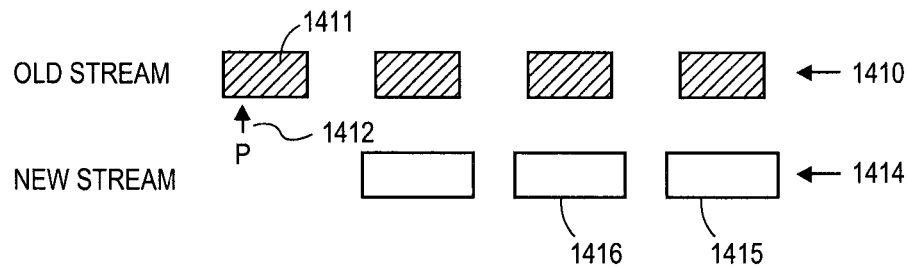
FIGS. 14B, 14C, and 14D show another aspect of an embodiment which uses an overlap for switching between streams.
Figure 14C:
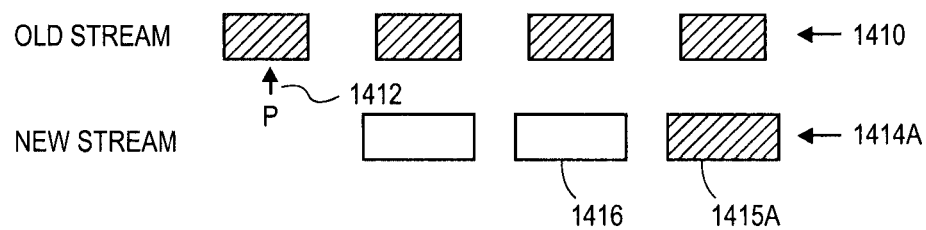
Figure 14D:
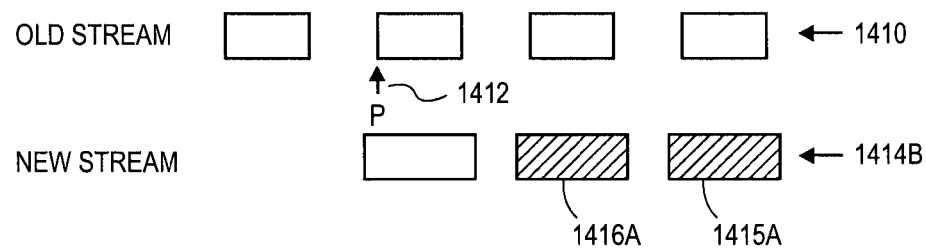

FIGS. 14B, 14C, and 14D show another aspect of how an overlap between two streams (such as the overlap described and shown in conjunction with FIGS. 9A-9D or the overlap described in conjunction with FIG. 14A). The method shown in FIGS. 14B, 14C and 14D may be implemented with an adaptively derived overlap (which was described in conjunction with FIG. 14A) or this method may be used with a fixed overlap which does not change. The method depicted in FIGS. 14B-14D can begin with the downloading of media files from the "old stream" 1410 (e.g. which can be a lower resolution video downloaded at a first speed which is slower in bit rate than a second speed of future downloads for the new stream 1414). The old stream 1410 has been downloaded as indicated by the hash marker 1411 and it is currently being presented, on a client device, to a user at playback point (e.g. playback head position at) 1412; the already downloaded content in old stream 1410 beyond the current playback point 1412 is buffered content that is available should the connection become faulty. The client device can then read a playlist file for the new stream 1414 and determine from the playlist file the content "blocks," such as blocks 1416 and 1415, before even downloading the content of those blocks; for example, the playlist file for the new stream can indicate, at least approximately, the locations in time of the content blocks 1416 and 1415 relative to old stream 1410. This determination can allow the client device to conservatively decide to download first block 1415 for the new stream 1414 by requesting and retrieving one or more media files for block 1415, and FIG. 14C shows the result of that download (block 1415A has hash marks to show that this block has been downloaded). The playback position has progressed in time to a new location (still within the leftmost block of old stream 1410). In this instance the downloading of block 1415 was fast enough that the playback position did not leave that leftmost block of old stream 1410. Block 1415 was selected conservatively in case the download took longer so that playback could at least be switched around block 1415A. At the point depicted in FIG. 14C, the client device can check how much time is left between the overlap provided by block 1415A and the current point of playback (shown by 1412 in FIG. 14C). If there is enough time given the connection speed, the client device can download the block or segment 1416 which is the block previous to the current overlap, and then the client device can repeat the check to determine how much time is left between the overlap provided by just downloaded block 1416A (shown in FIG. 14D after it has been downloaded as indicated by the hash marks) and the current point of playback (shown by 1412 in FIG. 14D). If, as in the case of the example shown in FIG. 14D, the download of 1416A happens quickly, then the client device can move the point of overlap backward in time, reducing the time it will take to switch between the streams (and hence allowing a switch within block 1416A); on the other hand, if there are delays in downloading 1416A such that the switch cannot occur within block 1416A, then the client device can use block 1415A as an overlap that could be used to cause the switch to occur within block 1415A.

Another aspect of the present invention can utilize an attribute defining a resolution of images. This attribute can allow a client device to decide that it should not switch resolutions or otherwise switch streams based upon the attribute. For example, a client device can decide that it is already playing the maximum resolution which it can display and that there is no point in downloading a higher resolution which may be available to the device through a data network.

Figure 15:
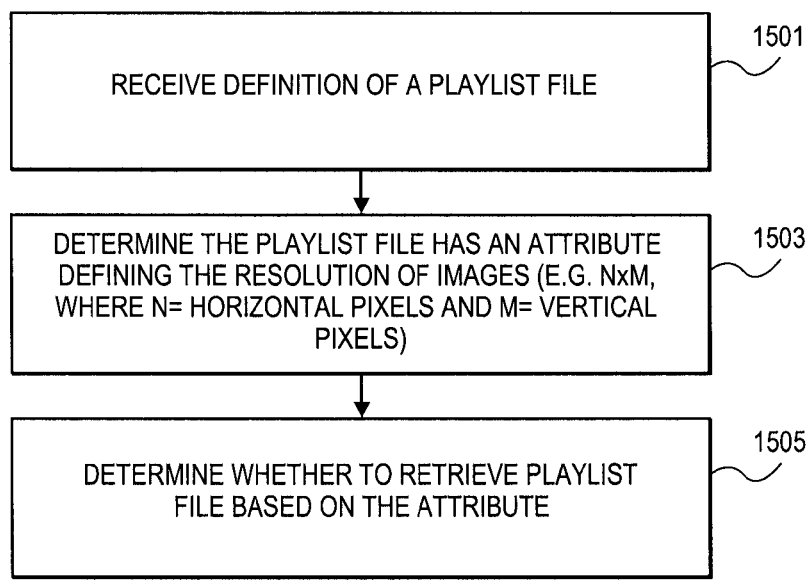
FIG. 15 is a flowchart depicting another method according to one embodiment of the present invention.

FIG. 15 shows an example of a method in one embodiment for utilizing such an attribute. In operation 1501, a playlist file can be received by a client device, and the client device, in operation 1503, can determine from the playlist file that an attribute exists within the playlist file which defines the resolution of images available to the client device. Based upon that attribute, the client device can, in operation 1505, determine whether to retrieve another playlist file or to retrieve a media file associated with that attribute. By providing the resolution attribute, a client device can intelligently decide how to process the data in the playlist. Moreover, the client device can make decisions about the retrieval of data which can prevent unnecessary downloads, and this can, in turn, minimize the amount of data traffic on the network.

An embodiment of the invention can allow a system to search for content based upon a date and time. For example, a user may want to see a home run hit on Apr. 9, 2009 at about 5 PM or may want to see another event on a date and approximate time. An embodiment of the invention can provide this capability by timestamping, through the use of an EXT-X-PROGRAM-DATE-TIME tag that is associated with the beginning of a corresponding media file; the tag can be associated with its corresponding media file by having the tag appear before that media file in a playlist file. A system, such as a server, can store one or more playlists which can be retrieved (e.g., downloaded) by a client device and used to search for a date and time to find a desired media file; alternatively, a client device can request (e.g., through a date and time search request) the server to search through the one or more playlists to identify one or more media files that match the date and time search request, and the server can respond by identifying the one or more media files. In one embodiment, the tag indicates a substantially precise beginning of the media files, and timestamps within the media file can be used to find a playback point with finer granularity in time. For example, a tag's timestamp can indicate the media file began on Apr. 9, 2009 at 5:03 PM, and the timestamps (or other indicators of time) within a media file can specify time in increments of minutes or seconds, etc. after 5:03 PM to allow a device to begin playback (through a selection of a playback start point) at, for example, 5:06 PM or 5:05:30 PM.

Figure 16A:
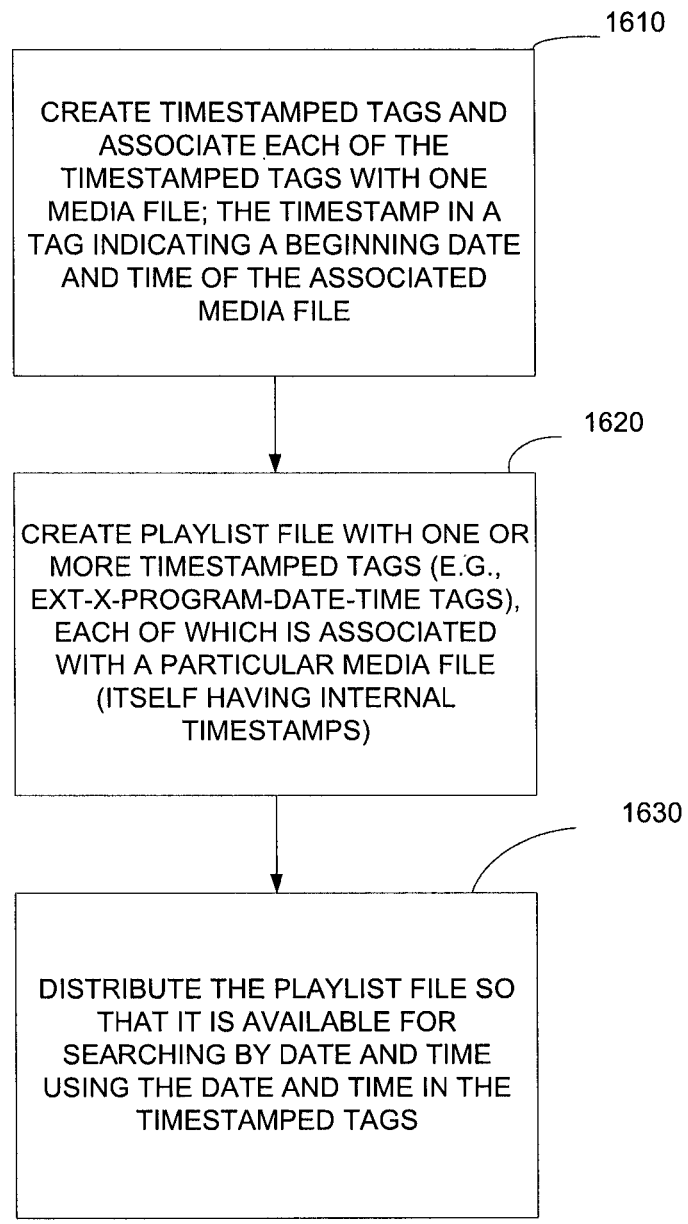
FIG. 16A shows a flowchart that depicts a method according to one embodiment for using the timestamped tags to create a playlist file.

FIG. 16A shows a flowchart that depicts a method according to one embodiment for using the timestamped tags to create a playlist file. The method can be performed by a server implemented with processing logic including software, hardware, firmware, or a combination of any of the above. In some examples, the server is provided by a media provider, such as MLB.

At box 1610, processing logic creates timestamped tags and associates each of the timestamped tags with one media file. The timestamp in a timestamped tag indicates a beginning date and time of the associated media file. Details of some embodiments of timestamped tags have been discussed above.

At box 1620, processing logic creates a playlist file with one or more timestamped tags (e.g., EXT-X-PROGRAM-DATE-TIME tag), each of which is associated with a particular media file. Note that the media file itself has internal timestamps as well. At box 1630, processing logic may distribute the playlist so that the playlist file is available for searching by date and time using the date and time in the timestamped tags. In some embodiments, the playlist is stored in a repository, from which client devices may download the playlist.

Figure 16B:
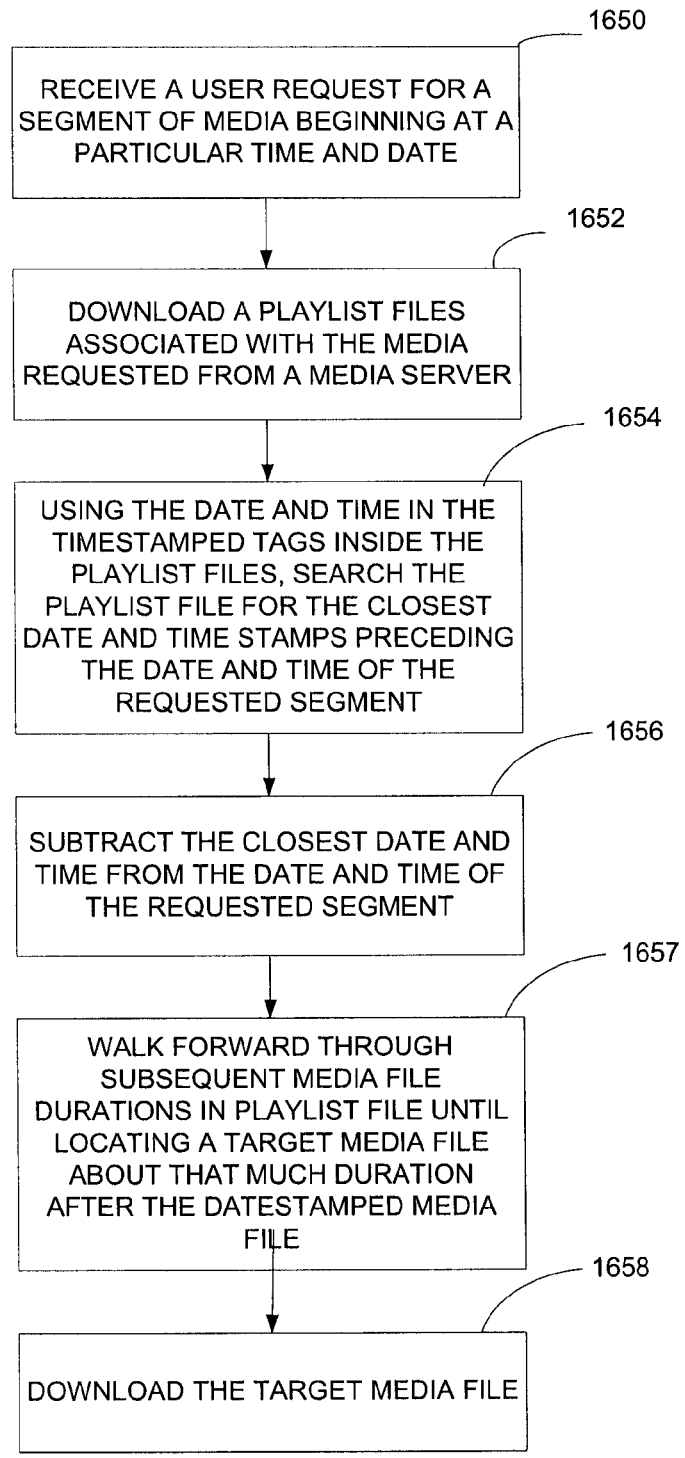
FIG. 16B shows a flowchart that depicts a method according to one embodiment for using the timestamped tags in a playlist file to search for media files.

FIG. 16B shows a flowchart that depicts a method according to one embodiment for using a playlist file created with the timestamped tags. The method can be performed by a client device implemented with processing logic including software, hardware, firmware, or a combination of any of the above. The client device may be used by individual consumers, subscribers, or viewers of the media associated with the playlist file to access and play the media.

At box 1650, processing logic receives a user request for a segment of a program beginning at a particular date and time. For example, the user may request a fourth inning of a baseball game that begins at 8:15 pm on Apr. 6, 2010, instead of the entire baseball game. In response to the user request, processing logic downloads one or more playlist files associated with the program from a media server at block 1652. At block 1654, processing logic searches the playlist files downloaded using the date and time in the timestamp tags inside the playlist files for the date and time stamps closest to the date and time of the segment requested. Then processing logic subtracts its date and time from the date and time of the segment requested at block 1656. This produces a duration. Processing logic then walks forward through the subsequent media file durations in the playlist file until processing logic locates a target media file about that much duration after the datestamped media file at block 1657. Processing logic then downloads this target media file at block 1658, as it is the best guess about which file contains the requested segment.

In some embodiments, all media files between the datestamped one and the target one are part of a single encoding, that is, no discontinuity tag in between them. If they are, processing logic can subtract media file timestamps in the datestamped file from those in the target file to get precise durations, which allows the location of the requested date and time precisely.

Using the dates and times in the timestamped tags in the playlist files, processing logic does not have to download all media files of the entire program in order to search through the media files to find the requested segment. Because the client device does not have to download all media files of the entire program when the user does not request the entire program, significant savings in bandwidth can be achieved. Furthermore, many typical media files contain only arbitrary timestamps, which often start at zero. Thus, the dates and times of the timestamped tags discussed above may associate the arbitrary timestamps in the media files with a real date and/or time. Using the timestamped tags, the client device can locate the playlist element containing a particular date and/or time more efficiently than scanning through each media file.

One embodiment of the invention allows insertion of timed metadata into a media stream in an ID3 format. The media stream may include video and/or audio data encoded in a predetermined format. For example, the media stream may include video and audio data encoded in MPEG-2 developed by the Moving Pictures Expert Group (MPEG), which is international standard ISO/IEC 13818. Broadly speaking, metadata includes information on data in the media stream, and timed metadata referred to metadata associated with a particular time (e.g., the time at which a goal was scored). Note that timed metadata may change over time. The timed metadata may be inserted into the media stream in a predetermined format for storing metadata, such as ID3 format. In some embodiments, the video data may be divided into a sequence of frames. Timed metadata of the video data may also be divided into containers associated with the sequence of frames. Each container may store both timed metadata of a corresponding frame and the time associated with the corresponding frame. Alternatively, each container may store both timed metadata of a corresponding frame and frame number of the corresponding frame. In some embodiments, the timed metadata of a frame may include a set of predetermined information of the frame. For example, the timed metadata may include location information (e.g., global positioning system (GPS) data) of the location at which the corresponding frame of video data was recorded.

In one embodiment, the following describes how ID3 metadata can be carried as timed metadata in MPEG-2 Transport Streams (see ISO/IEC 13818-1:2007 Information Technology—Generic Coding of Moving Pictures and associated audio information: systems which is hereinafter referred to as "the MPEG-2 standard") as used by the HTTP live streaming protocol described herein. Metadata can be carried in transport streams according to section 2.12 of the MPEG-2 standard. The metadata can be carried in an elementary stream (PES), rather than, for example, in a carousel. ID3 metadata is self-describing and needs no configuration information, so the provisions for metadata decoder configuration data do not need to be used. The metadata stream can be in the same program as the main program material (i.e. the audio/video content).

Tables S1, S2, S3 and S4 provide one embodiment of syntax that can be used. In the syntax tables below, the syntax structure (left column) is shown with only the outline that is in effect, and the names of fields. This means that 'if' blocks for which the condition is false are omitted, for clarity. The MPEG-2 standard can be consulted for the complete syntax, the field sizes, and the acceptable values. The right column indicates, in a line with each field name, the value needed in this context, or contains an explanation of that line.

Summary of the Code-Points Used

ID3 defines both a format and a semantic, and so the same registered format_identifier can be used for both metadata_format_identifier and metadata_application_format_identifier. The registered value for these, at the registration authority SMPTE Registration Authority (see http://www.smpte-ra.org), is "ID3" (I D 3 space, or 0x49 0x44 0x33 0x20) (assignment pending). To indicate a registered value is used, the fields metadata_format and metadata_application_format can take the values 0xff and 0xffff respectively. In one embodiment, this metadata can be carried in a private stream, not a stream formatted as metadata Access Units (MAUs) as defined in 12.4 of the MPEG-2 standard. The stream_id value used for the stream is therefore private_stream_id__0, 0xbd, as specified in 2.12.3 of the MPEG-2 standard. The stream_type is set to 0x15, indicating carriage of metadata in a PES stream, as specified in 2.12.9.1 of the MPEG-2 standard. Since only one metadata stream is normally carried, the metadata_service_id is normally set to 0; however, any suitable value can be used to distinguish this metadata stream from others, if needed.

Descriptors Used

The format and content of the metadata descriptors is documented in sections 2.6.58 to 2.6.61 of the MPEG-2 standard.

Descriptor Loop of the PMT for the Program

To declare the presence of the metadata stream, a metadata_pointer_descriptor (2.6.58 of the MPEG-2 standard) can be placed in the PMT, in the program_info loop for the program. The metadata can be in the same program as the main program (audio/video) content. In one embodiment, the use of this descriptor to refer to another program is not supported.

TABLE S1

| Syntax | Value |
| --- | --- |
| Metadata_pointer_descriptor ( ) { | |
|   descriptor_tag | 0x37 - Metadata_pointer_descriptor tag |
|   descriptor_length | - the length of the descriptor |
|   metadata_application_format | 0xFFFF |
|   if (metadata_application_format==0xFFFF) { | |
|     metadata_application_format_identifier | 'ID3 ' (0x49 0x44 0x33 0x20) |
|   } | |
|   metadata_format | 0xFF |
|   if (metadata_format==0xFF) { | |
|     metadata_format_identifier | 'ID3 ' (0x49 0x44 0x33 0x20) |
|   } | |
|   metadata_service_id | - any ID, typically 0 |
|   metadata_locator_record_flag | 0 |
|   MPEG_carriage_flags | 0 |
|   reserved | 0x1f |
|   if (MPEG_carriage_flags ==0\|1\|2){ | |
|     program_number | - program number of the program whose es descriptor loop contains the metadata_descriptor |
|   } | |
| } | |

The elementary stream also can be declared in the loop of elementary streams, in the program map (section 2.4.4.8 of the MPEG-2 standard.

TABLE S2

| Syntax | Value |
| --- | --- |
| stream_type | 0x15 |
| reserved | 0x7 |
| elementary_PID | - pid of the elementary stream carrying the metadata |
| reserved | 0xf |
| ES_info_length | - length of the elementary stream info descriptor loop, including the metadata_descriptor |

Descriptor Loop of the PMT for the Elementary Stream

To declare the format of the metadata stream, a metadata descriptor (2.6.60 of the MPEG-2 standard) can be placed in the PMT, in the es_info loop for the elementary stream.

TABLE S3

| Syntax | Value |
| --- | --- |
| Metadata_descriptor ( ) { | |
|   descriptor_tag | 0x38 - Metadata_descriptor tag |

TABLE S3-continued

| Syntax | Value |
|---|---|
| descriptor_length | - the length of the descriptor |
| metadata_application_format | 0xFFFF |
| if (metadata_application_format==0xFFFF) { | |
|    metadata_application_format_identifier | 'ID3 ' (0x49 0x44 0x33 0x20) |
| } | |
| metadata_format | 0xFF |
| if (metadata_format==0xFF) { | |
|    metadata_format_identifier | 'ID3 ' (0x49 0x44 0x33 0x20) |
| } | |
| metadata_service_id | - any ID, typically 0 |
| decoder_config_flags | 0 |
| DSM-CC_flag | 0 |
| reserved | 0xf |

PES Stream Format

ID3 metadata can be stored as a complete ID3v4 frame in a PES packet, including a complete ID3 header stream. The ID3 tag can start immediately after the PES header; this PES header can contain a PTS (PTS_DTS_flags to '10'). The PTS can be on the same timeline as the audio and video frames. The data_alignment bit can be set to 1. The PES header can contain a PES_packet_length that is non-zero. If an ID3 tag is longer than 65535 bytes, it can have more than 1 PES header. The second and following PES headers can have data_alignment set to 0, and the PTS_DTS_flags set to '00' (and hence no PTS). The PES header can be formatted as documented in 2.4.3.7 of the MPEG-2 standard.

TABLE S4

| Syntax | Value |
|---|---|
| PES_Packet ( ) { | |
|   packet_start_code_prefix | 0x00 0x00 0x01 |
|   stream_id | 0xbd - private_stream_id_1 |
|   PES_packet_length | - the length of the packet, which must not be 0 |
|   if (...) { | - a large test which is true in this case |
|     '10' | '10' |
|     PES_scrambling_control | 0 |
|     PES_priority | 0 |
|     data_alignment_indicator | 1 for the packet containing start of the ID3 header, else 0 |
|     copyright | 0 |
|     original_or_copy | 0 |
|     PTS_DTS_flags | if (data_alignment==1) '10' else '00' |
|     ESCR_flag | 0 |
|     ES_rate_flag | 0 |
|     DSM_trick_mode_flag | 0 |
|     additional_copy_info_flag | 0 |
|     PES_CRC_flag | 0 |
|     PES_extension_flag | 0 |
|     PES_header_data_length | - the length of the data; padding may be used |
|   } | |
| } | |

The metadata stream can be incorporated into a transport stream in the same way as audio or video is. For example, that means that in a transport_packet( ) (see 2.4.3.2 of the MPEG-2 standard) the payload_unit_start_indicator can be set to 1 only when a PES header follows. (The PES header, in turn, can indicate whether the start of the ID3 data follows, or whether that has been divided into multiple PES packets, as noted in the previous paragraph).

In one embodiment of the invention, processing of media files (e.g., retrieved of playlists and retrieved of media files specified in the playlist and decoding of the content in the media files) can be done separately, from a user interface that presents and controls the media being presented. For example, a user application, such as an application for watching live events (e.g., as Major League Baseball (MLB) application for watching baseball games) or other streams can provide the user interface for presenting and controlling (e.g., receiving a selection of a media file) the presentation while another software process (e.g., a software process that serves media such as a daemon for serving media, which can be referred to as "mediaserverd") can retrieve playlists and retrieve and decode media files. In some cases, the media files can be encrypted, and the encryption can be controlled by the user application (e.g., the MLB application); for example, a user application can install a client certificate (for example, an X.509 certificate to provide authentication and chain of trust, and revocability) into their keychain (either persistently or in memory only) that can be used to answer a server challenge when an HTTP Secured Sockets Layer (SSL) connection is made to download a key that can be used to decrypt the media's content. In other cases, a playlist can contain URLs for one or more keys that use a custom URL scheme that is used by the user application or a server that interacts with the user application; in this case, a user application can register URL protocol handlers for these custom URL schemes that can be invoked to obtain a key (such as a new key), and this can allow a user application to transport keys out of band (e.g., hidden in their application binary), or obtain a key from a server using a private protocol that is understood by both the user application and the server that interacts with the user application, but is not understood by other systems.

Figure 17A:
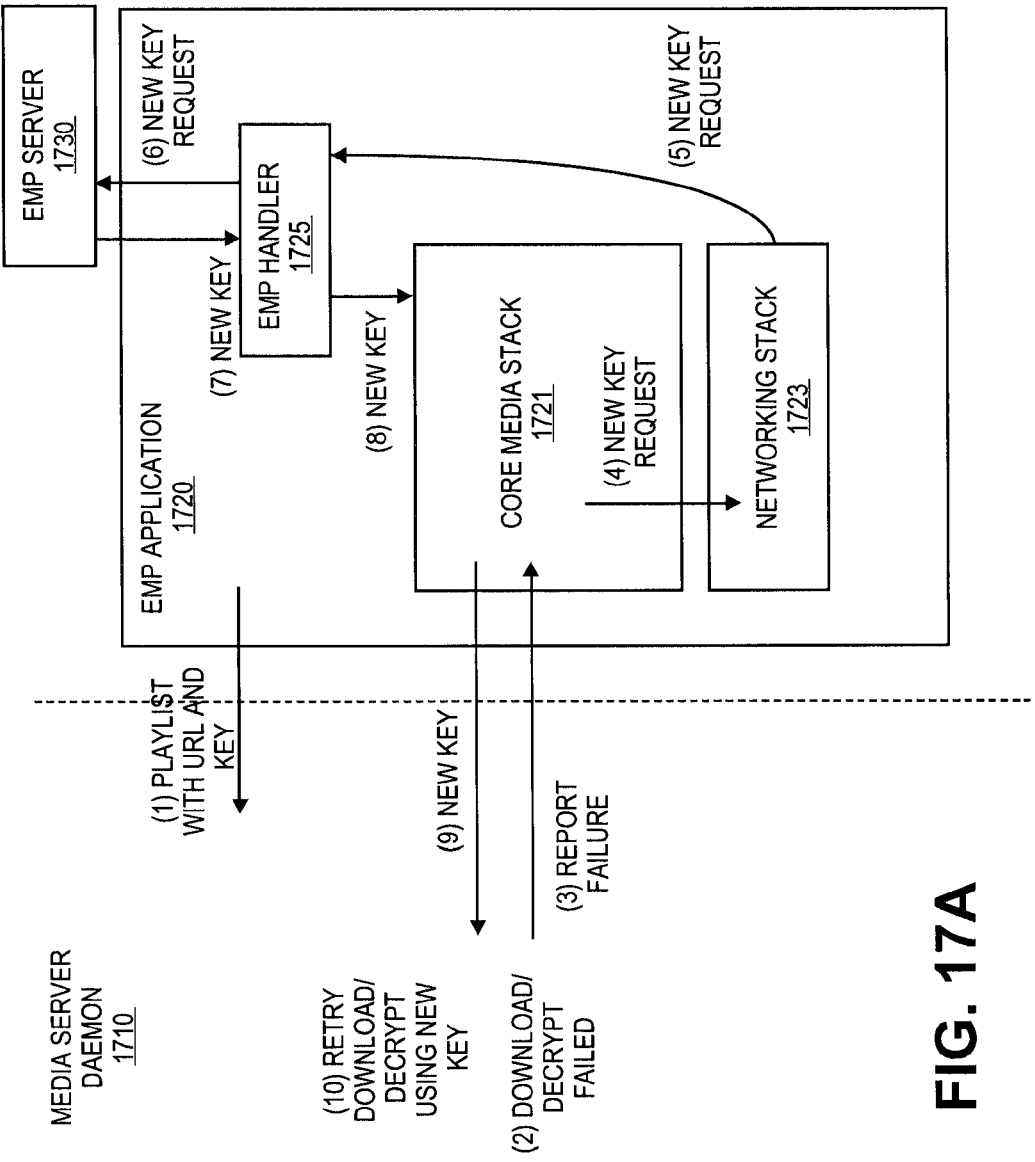
FIG. 17A shows an example of software architecture to allow a media serving daemon to interact with a user application.

FIG. 17A shows one embodiment of software architecture to allow a media serving daemon to interact with a user application. The architecture includes a media serving daemon ("mediaserverd") 1710 and an exemplary user application, Event Media Provider (EMP) application 1720, both executable in processes running on a client device, such as, for example, a smart phone, a personal digital assistant, a desktop computer, a laptop computer, a tablet device, etc. One embodiment of the client device may be implemented using electronic system 800 shown in FIG. 8. In some embodiments, both mediaserverd 1710 and EMP application 1720 share the same privileges with respect to memory control, memory space, memory allocation, file system control, and network control. As such, mediaserverd 1710 may access data that EMP application 1720 can access. Likewise, mediaserverd 1710 is prohibited from accessing data that EMP application 1720 cannot access.

In some embodiments, EMP application 1720 further includes a core media stack 1721, which is a customized software stack for accessing a networking stack 1723, which in turns accesses an URL protocol handler, EMP handler 1725. EMP application 1720 can register EMP handler 1725 for a custom URL scheme that can be invoked to obtain one or more keys. Thus, EMP application 1720 can transport keys out of band (e.g., hidden in the application binary).

In general, mediaserverd 1710 and EMP application 1720 can interact with each other to download and playback media files for live streaming content from a content provider's application, which is EMP in the current example. Playback can be done in mediaserverd 1710 on the client device. In some embodiments, mediaserverd 1710 can download keys for decryption of media files, and if this fails, mediaserverd 1710 may ask EMP application 1720 to download the key from a content provider server, which is EMP server 1730 in the current example. EMP application 1720 running on the client device can sign up to get one or more keys. In one embodiment, EMP application 1720 may have signed up and obtained the keys prior to downloading the media files. Details of some embodiments of the interactions between mediaserverd 1710 and EMP application 1720 are discussed below to further illustrate the concept.

Referring to FIG. 17A, EMP application 1720 in one embodiment sends a playlist with at least an URL and a key to mediaserverd 1710 (1). Using the key, mediaserverd 1710 attempts to access a media source provided by EMP at the URL and to download media files specified in the playlist from the media source. The media files may be encoded or encrypted to prevent unauthorized viewing of the content of the media files. If mediaserverd 1710 fails to download the media files, or it fails to decode or decrypt the media files downloaded (2), mediaserverd 1710 reports the failure to EMP application 1720 (3).

In response to the failure report from mediaserverd 1710, EMP application 1720 uses its core media stack 1721 to access networking stack 1723 in order to request a new key (4), which in turns accesses EMP handler 1725 for the new key (5). EMP handler 1725 connects to EMP server 1730 over a network (e.g., Internet) to request the new key from EMP server 1730 (6). In response to the request, EMP server 1730 sends the new key to EMP handler (7). Then EMP handler 1725 passes the new key to core media stack 1721 (8), which then passes the new key to mediaserverd 1710 (9).

When mediaserverd 1710 receives the new key from core media stack 1721, mediaserverd 1710 may try to download the media files again using the new key and then decode the media files downloaded using the new key (10). Alternatively, if the media files were successfully downloaded previously, but mediaserverd 1710 failed to decrypt the media files, then mediaserverd 1710 may try to decrypt the media files previously downloaded using the new key. If mediaserverd 1710 successfully downloads and decodes the media files using the new key, then EMP application 1720 may present the decoded media files on the client device.

Figure 17C:
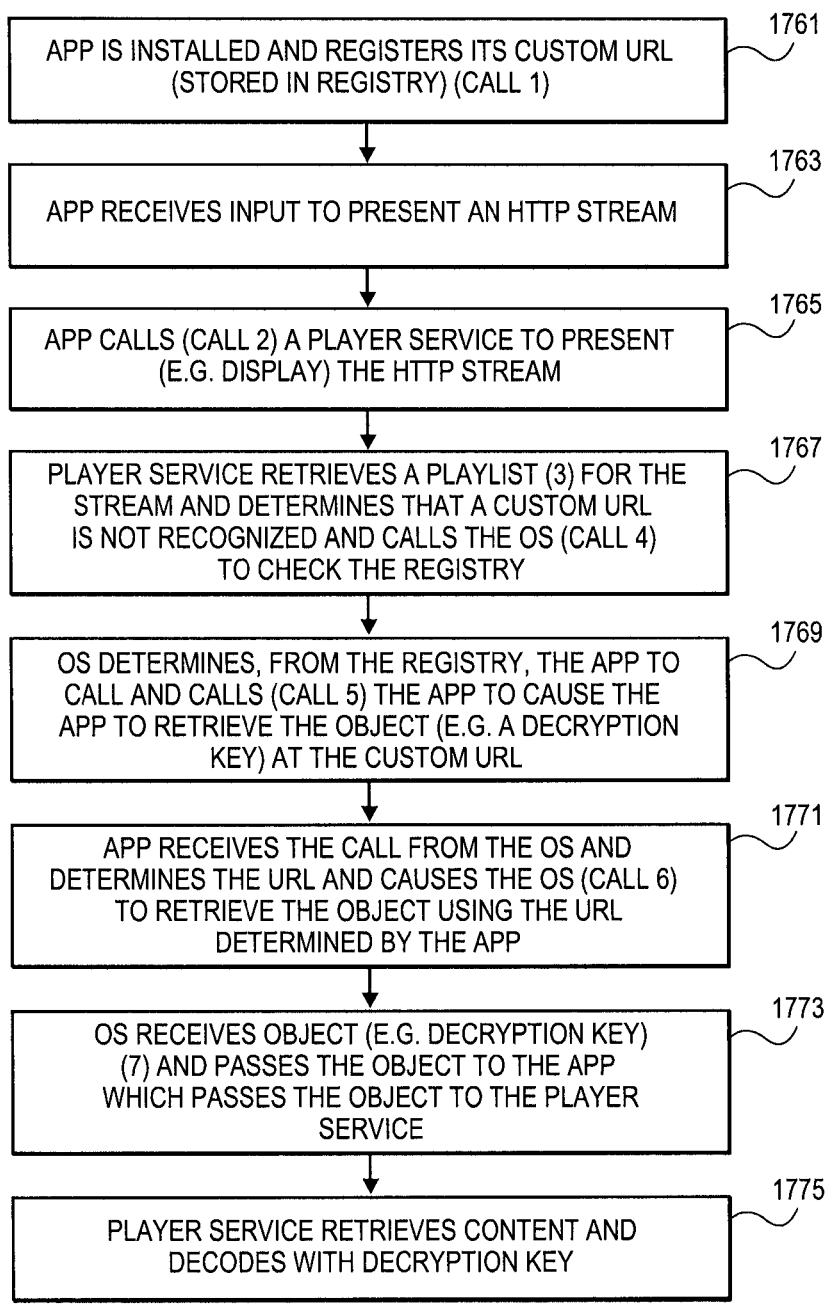
FIG. 17C is a flowchart showing an example of a method to use a custom URL technique.

FIGS. 17B and 17C show another embodiment in which processing of media files (e.g. the retrieval of playlists and the retrieval of media files identified in the playlist and the decoding of encrypted media files) can be done by a player service separately from a user application (e.g. "AppX") that presents and controls a user interface that presents content from the processed media files. The separation between the processing of media files and the control of the user interface allows a content provider to create a unique user interface and present that user interface through an application created by or for the content provider, and it also allows the content provider to use custom URLs or custom protocols, that can be hidden or difficult to reverse engineer, in order to protect the content. The custom URLs or custom protocols can be controlled by the content provider's application (e.g. "AppX") and by the systems (e.g. a server controlled by the content provider or agents of the content provider) that interact with the content provider's application. FIG. 17B shows an example of a software architecture on a client device 1750 such as, for example, a smart phone, a personal digital assistant, a desktop computer, a laptop computer, a tablet device, an entertainment system, or a consumer electronic device, etc. The client device can be, for example, the system shown in FIG. 8. The client device 1750 can interact and communicate through a network 1752 (e.g. the Internet or a telephone network, etc.) with one or more servers 1753. The one or more servers can store and transmit the playlists (e.g. playlist 1754) and the media files referred to in the playlists, and these servers can be controlled by the content provider that provides the application (e.g. AppX) so that the application and the servers are designed to work together using custom protocols to ensure that the content is protected or to provide greater flexibility in controlling the distribution of the content, etc.

Client device 1750 includes an operating system (OS) 1756 that can include a player service 1757 although, in another embodiment the player service can be provided separately from the OS. The OS 1756 can maintain a registry 1755 which can be used to store information that is registered by applications, such as AppX; this information, stored in the registry, can include information that shows a relationship between a custom URL and the application that uses that custom URL so that the player service or the OS can call the application that uses that custom URL in order to obtain an object (e.g. a decryption key) from that custom URL. In other words, the registry allows the OS or the player service to identify an application to call by using a custom URL found in a playlist to look up the associated application (which can be identified by an identifier associated with the application) in the registry. The custom URL can be specified, in one embodiment, by the EXT-X-KEY tag, and the player service can be configured to accept, as parameters of that tag, URLs that are specified as one of: http; https; and registered identifiers (such as identifiers that have been registered in a registry such as registry 1755). Client device 1750 can include one or more user applications, such as AppX 1751 (or, for example, a Major League Baseball (MLB) application or other applications that provide a user interface for streaming content obtained from one or more playlists, such as the playlists described herein). These applications can be provided by the entities that provide the content (e.g. MLB provides the content, the baseball games, that are streamed to a client and presented in the user interface of MLB's application that is executing on the client device), or these applications can be provided by application developers that create user interfaces for players for general use with content created by others.

The client device 1750 and the one or more servers 1753 can operate according to the method shown in FIG. 17C to resolve a custom URL that is not recognized by a player service, such as player service 1757. An application, such as AppX 1751 can, when installed or later, cause a custom URL to be registered in a registry, such as registry 1755, in operation 1761 in FIG. 17C. In one embodiment, the application can, as part of its installation, make a call to OS 1756 to cause its one or more custom URLs to be stored in registry 1755 along with an identifier that associates these one or more custom URLs with the application. After installation, the application can be launched and used by a user, which can occur in operation 1763 when the user makes a selection in the application to cause the application to present a selected HTTP stream. In response to this input, the application in operation 1765 calls (in call 2 of FIG. 17B) player server 1757 to present (e.g. display) the HTTP stream. The player service, in operation 1767, retrieves (call 3) the playlist specified by the user's input and determines that the playlist includes a custom URL that is not recognized or supported by the player service; in the case of FIG. 17B, the custom URL is for a decryption key that is used by the player service to decrypt media files referred to in the playlist; upon determining that the playlist includes a custom URL, the player service calls OS 1756 (call 4) to cause registry 1755 to be examined to determine the application that should be requested to resolve or use the custom URL. In operation 1769, OS 1756 determines that the custom URL in the playlist is to be resolved by AppX 1751 and OS 1756 in turn calls (call 5) AppX 1751 to cause AppX to retrieve the object (in this case a decryption key to be used to decrypt content for presentation by AppX) using the custom URL. In operation 1771, AppX 1751 can receive the call from OS 1756 and in response can determine the URL to use and can call the OS (call 6) to retrieve the object (in this case a decryption key) using the URL determined by AppX 1751. Then in operation 1773, OS 1756 receives the object and passes it to AppX 1751 which in turn passes the object to player service 1757 to allow the player service to use the object to process the playlist or the media files or both (as in operation 1775). In an alternative embodiment of operation 1773, the OS 1756 can pass the object, once received, directly to player service 1757.

Figure 17D:
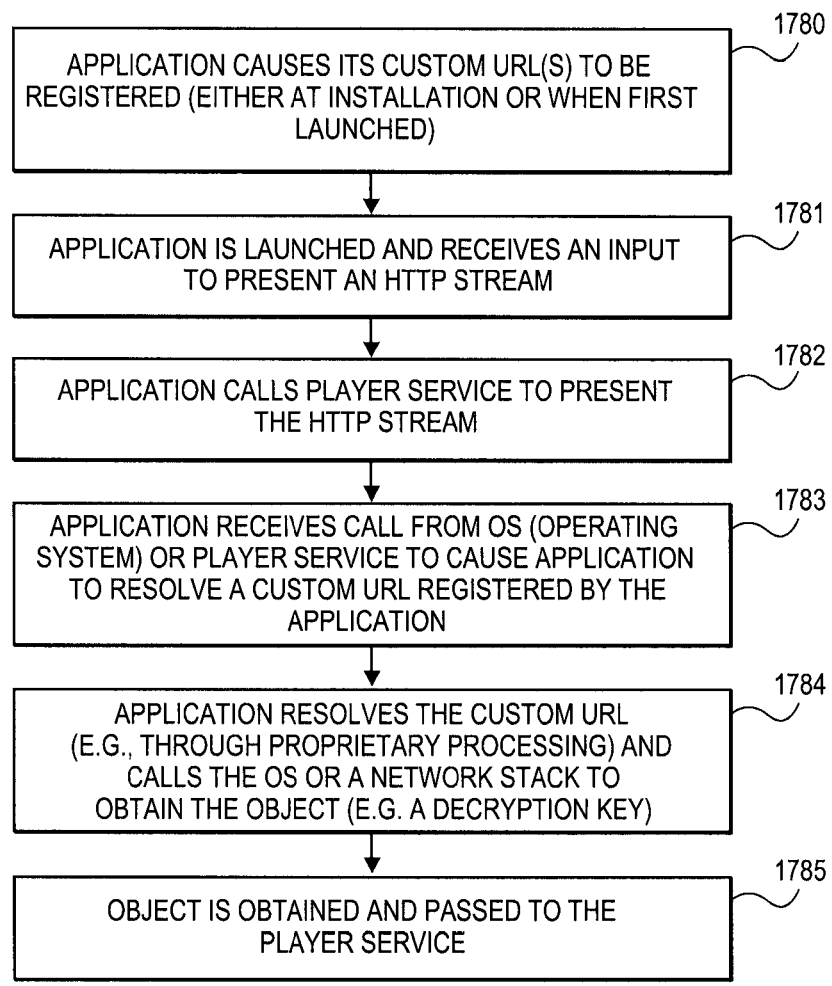
FIG. 17D shows a flowchart that provides an example of a method performed by an application that uses a custom URL technique.

FIG. 17D shows an example of a method that can be performed by an application, such as AppX, in order to use a custom URL. This method can be used with the software architecture shown in FIG. 17A. In operation 1780, an application, such as AppX, can cause its one or more custom URL(s) to be registered; this registration can be either at installation of the application or when the application is first launched. After the application has been launched, it can receive a user input such as a selection of an HTTP stream (in operation 1781), and in response, the application can call (e.g. through an API) a player service to cause the presentation of the HTTP stream. If the playlist for that HTTP stream includes a custom URL that is not recognized or cannot be processed by a player service, then the application can receive a call (in operation 1783), from either the player service or the operating system, to cause the application to resolve the custom URL (e.g. appx://appx.com/key) registered by the application. In operation 1784, the application can then resolve the custom URL in response to the call in operation 1783; the resolution can involve a predetermined, proprietary (to the application) scheme that can involve determining a legitimate URL based on, for example, the application's privileges (e.g. level of protections or cost of the application), the content sought, date and time of request to view the content, etc. The application can, after resolving the custom URL, call the OS or a network stack to request the object (e.g. decryption key) represented by the custom URL from a remote server that is coupled to a network (e.g. the Internet). The OS or network stack can obtain the object (by, for example, sending the resolved URL to the server which responds with the object), and cause the object to be passed to the player service (either directly or through the application); if the object is passed directly to the player service, then operation 1785 can be performed by components other than the application.

Figure 17E:
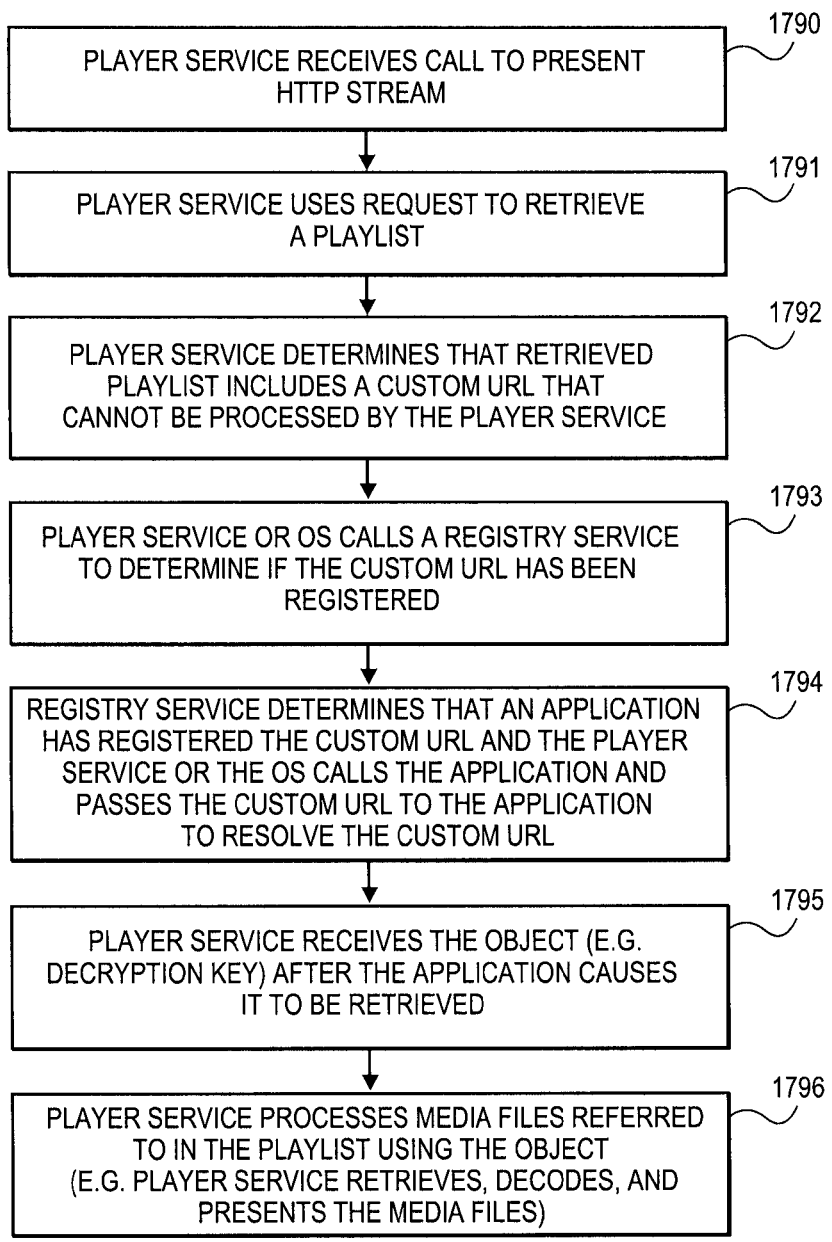
FIG. 17E is a flowchart that shows an example of a method performed by a player service or Operating System or both.

FIG. 17E shows an example of a method that can be performed by one or both of a player service and an OS on a device in order to use a custom URL. This method can be used with the software architecture shown in FIG. 17A. In operation 1790, a player service can receive a call from an application (e.g. AppX) to present an HTTP stream, and in response in operation 1791, the player service can, using data specified in the request, retrieve a playlist as described in this application. Then, in operation 1792, the player service can determine that the playlist includes a custom URL and can then, in operation 1793, call the OS to cause the OS to examine a registry, such as registry 1755, to determine if the custom URL has been registered; alternatively, the player service could itself call a service to examine the registry. The result of examining the registry can determine the application that registered the custom URL (or can determine that there is no such registration, in which case the player service can present an error message that the HTTP stream is not available). If the application is identified in the registry for the custom URL, then, in operation 1794, the player service or the OS calls the application and passes the custom URL to the application to cause the application to resolve the custom URL. After the application resolves the custom URL, it causes the object (e.g. a decryption key) to be obtained, and, in operation 1795, the player service receives the object (either through the application or through a network stack or OS component). After receiving the object, the player service can, in operation 1796, process the media file referred to in the playlist by, for example, retrieving each of the media files and decoding them using the object and presenting them.

Figure 20:
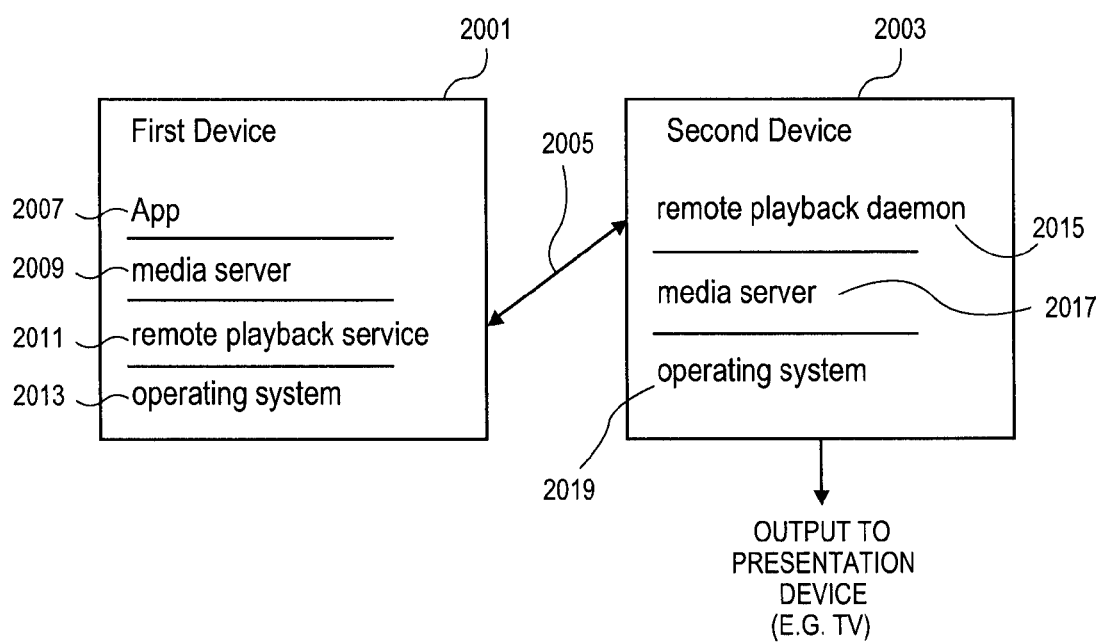
FIG. 20 shows an example of a software architecture for allowing one device to control or to initiate playback of media on another device.

Another embodiment of the present invention can employ a distributed system which employs at least two devices to provide playback using the playlists and streaming techniques described herein. FIGS. 20, 21, 22A, and 22B provide an example of such a distributed system in which one device can initiate a remote playback on another device which can drive or provide an output to a TV or other presentation device such as a stereo system, etc. Referring to FIG. 20, a first device 2001 can be configured to communicate with a second device 2003 through, for example, a wired network or wireless network or a direct connection, such as a wired connection. In one embodiment, the first device can be a tablet computer or a laptop computer or a smart phone, and the second device can be a set top box or audio/visual controller, such as the Apple TV from Apple Inc. of Cupertino, Calif. The first device, in one embodiment, can be an iPad from Apple Inc. of Cupertino, Calif. Each of the devices 2001 and 2003 can be an electronic system, such as the electronic system described in conjunction with FIG. 8 and can include one or more processors and memory and peripheral devices, such as input or output or input/output interfaces. In one embodiment, each of the devices 2001 and 2003 can include a wireless network interface which allows the devices to participate in a WiFi wireless network. In one embodiment, the connection 2005 can be a connection to a WiFi network, and in other embodiments, other wireless connections or wired connections may be utilized to couple together the two devices 2001 and 2003. The device 2003 includes an output to a presentation device, such as a TV or stereo system, and this output provides the remote presentation of the media which can be initiated by selecting the media through an app or application, such as app 2007 on the device 2001. The presentation device can be separate from the device 2003 when the device 2003 is a set top box, and in an alternative embodiment, the presentation device (e.g. a TV) can include device 2003.

Device 2001 can include a plurality of software components including, for example, application or app 2007 which may be, for example, an application such as the Major League Baseball app used to present baseball games on the device 2001 or a Netflix application or app used to present movies or other content through the streaming techniques described herein. Device 2001 also includes a media server 2009 which can be similar to the player service 1757 shown in FIG. 17B or the media server daemon 1710 shown in FIG. 17A. The device 2001 can also include a remote playback service 2011 which is a software component that provides an interface between the first and the second device for allowing remote playback of content selected or initiated at the first device through the second device which then outputs the content to a presentation device, such as a TV, which can be coupled to the output of the second device 2003. The remote playback service can be activated or selected by a user of the first device to cause it to communicate with the second device to cause remote playback through the second device onto the presentation device, such as a TV, which is coupled to the output of the second device. In one embodiment, the remote playback service can be part of the AirPlay facility provided on iPads or iPhones from Apple Inc. The device 2001 can also include an operating system 2013 which provides the standard and known services of an operating system to allow the device to function with one or more applications as is known in the art.

The second device can also include a media server 2017 which can be similar to media server or player service 1757 or be similar to the media server daemon 1710 in FIG. 17A. When a remote playback mode is selected, in one embodiment, the media server 2017 on the second device retrieves and processes playlists, specified by the first device, for display to an output of the second device. In this case, the first device acts to control (e.g. start, stop, pause, fast forward, select different media, etc.) the playback of the second device which is retrieving and processing the media in the playlist and is also processing the playlist as described herein. In effect, the first device can act, in this remote playback mode, as a remote control for the second device and can present (e.g. display) a user interface, on a display coupled to the first device, for controlling the playback on the second device; an example of such a user interface is described in U.S. Provisional Application No. 61/378,893, filed on Aug. 31, 2010, which provisional application is incorporated herein by reference. In one embodiment, even in this remote playback mode, the first device can execute multiple applications concurrently (e.g. a web browser application, an email application, a book reader application, and other applications) while also executing an application or other software to act as a remote control for the second device. Further, the second device 2003 also includes an operating system 2019 and a remote playback daemon 2015. In one embodiment, the remote playback daemon 2015 is a daemon which is a background process which is launched at startup of the second device and which is configured to watch for certain commands such as a "play" URL command or a "play" URL call and then which is configured to provide that call to a media server, such as the media server 2017. The daemon can operate as a background process and launch itself at startup without requiring any interaction from the user of the second device 2003. It will also be understood that the app 2007 can be similar to the app 1751 of FIG. 17B.

In an alternative embodiment, the media server and the remote playback portions of each device may be combined together so that there is no need for an exposed API call between the combined objects.

Figure 21:
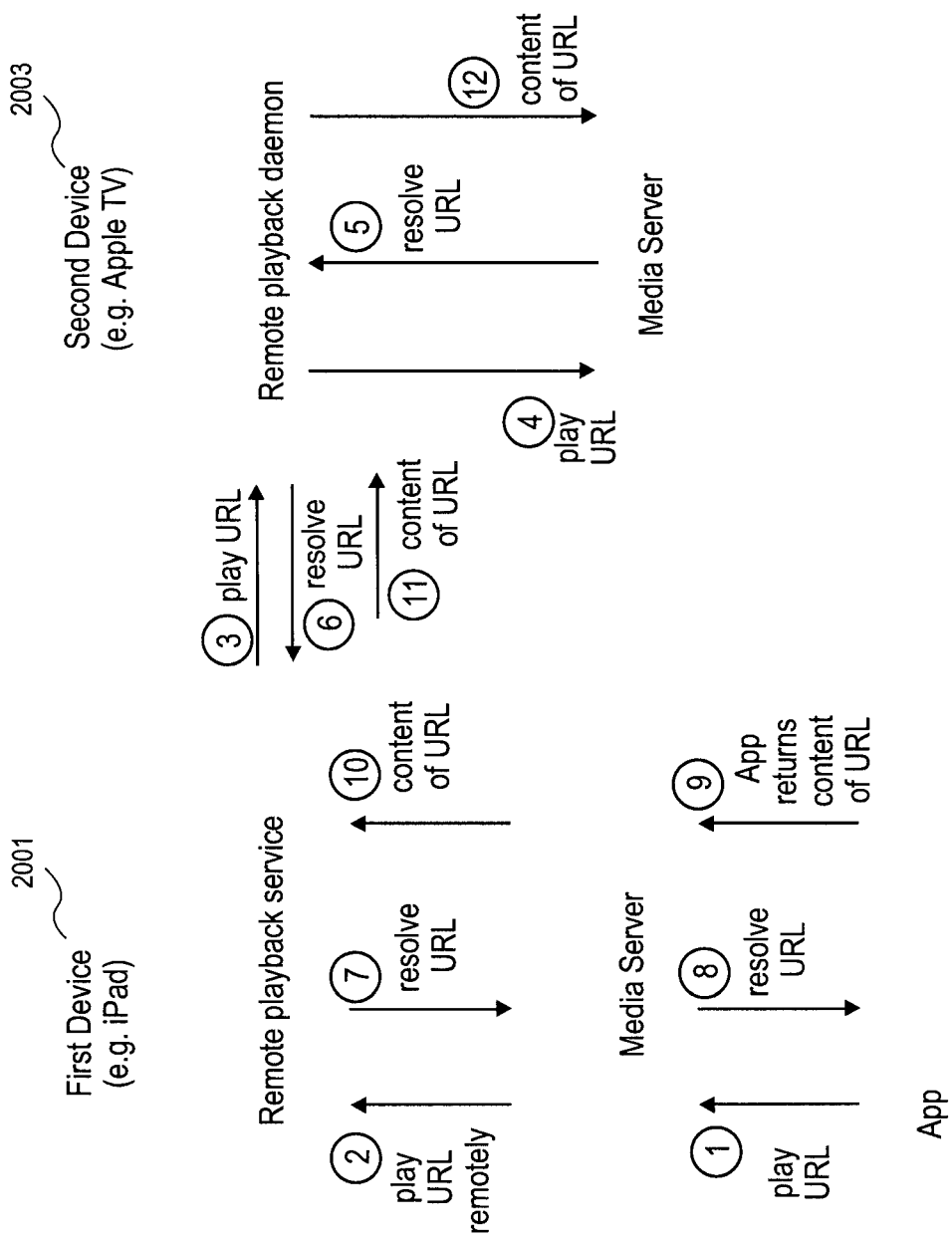
FIG. 21 shows an example of a software architecture employing calls between different components of the software architecture on the two different devices shown in FIG. 20 and FIG. 21.

FIG. 21 shows an example of how the software architecture shown in FIG. 20 can be used with a series of calls and returns to provide for the use of custom URLs in the context of the distributed system shown in FIG. 20 in which playback can be initiated from a first device and can be provided remotely by the second device to an output of the second device to a presentation device, such as a TV or stereo system or a combination of a TV and a stereo system. The calls and the returns of the calls are shown as numbered circles. For example, the app in first device 2001 makes a call to play a URL to a media server, and this call is labeled as "1" within the circle shown in FIG. 21. A further discussion of the interaction of the software components and the calls between those components will now be provided in conjunction with the method shown in FIGS. 22A and 22B.

Figure 22A:
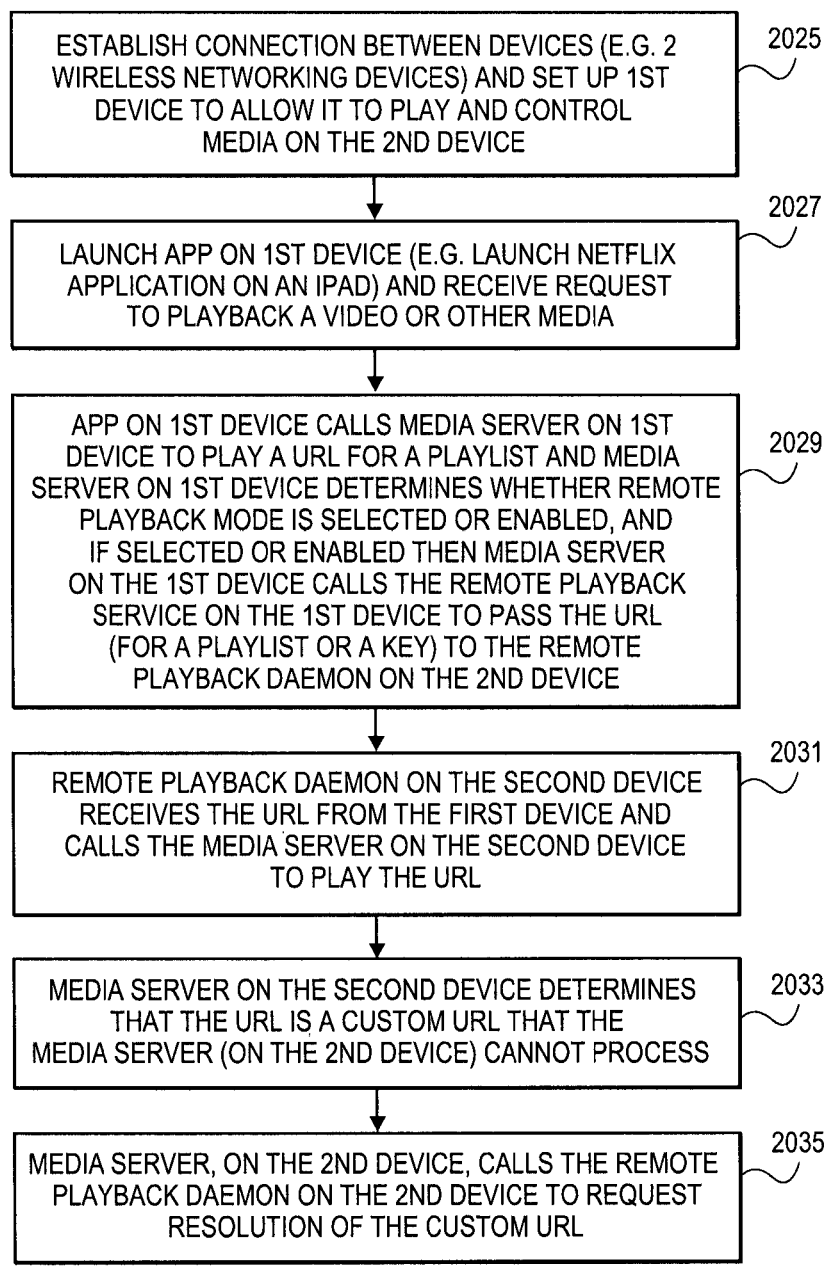

Referring now to FIGS. 22A and 22B, a method can begin in operation 2025 in which a connection is established between two devices, such as two wireless networking devices, and one of the devices can be set up to allow it to play and control media on or through the second device. In one embodiment, the first device can be a tablet computer or laptop computer or other data processing system which includes an application, such as app 2007, which a user can use to select content to be presented remotely through the second device or on the second device. In one embodiment, the first device may include an output such as a display to also display the same media while it is being presented through the second device on a presentation device such as a TV or another display of the second device. In one embodiment, a user of the first device can select a remote playback mode, such as an AirPlay mode on an iPad and, in doing so, set up the first device to allow it to control and play media on the second device; similarly, this setup can also establish the connection between the devices. It will be appreciated that the sequence of operations 2025 and 2027 can be reversed and that the connection can be established after selecting the media for playback after the application has been launched. In operation 2027, the system launches an application either at user request or automatically by the first device and receives a request to play back a video or other media. For example, a user could launch a Netflix application on an iPad and then select, within the Netflix application, a particular video or other content to play back. In response to the selection of a particular video or other media to play back, the app on the first device, in operation 2029, calls the media server on the first device to play a URL for a playlist. This is shown as call 1 in FIG. 21. In response, the media server on the first device determines whether the remote playback mode has been selected or enabled. If it has not, then playback occurs through the first device in the manner described in FIGS. 17A-17E if a custom URL needs to be resolved. On the other hand, if remote playback mode has been selected or enabled, then the media server on the first device calls the remote playback service, through call 2 on FIG. 21. This call, in effect, passes the URL, which may be a URL for the playlist or a URL for a key in the playlist, to a remote playback daemon 2015 on the second device. This call is shown as call 3 in FIG. 21. In operation 2031, the remote playback daemon, such as remote playback daemon 2015, receives the URL from the first device and calls the media server on the second device to play the URL; this call is shown as call 4 in FIG. 21. In response, media server 2017 on the second device determines that the URL is a custom URL that the media server 2017 cannot process. In one embodiment, a custom URL is any URL that is not a standard URL scheme such as an I-ITTP scheme or an HTTPS scheme or a file scheme, or a DAV scheme. The custom URL scheme will be understood by the application in terms of how to decode or process the custom URL to retrieve the data or content pointed to by the URL.

Then in operation 2035, the media server on the second device, such as media server 2017, calls the remote playback daemon, such as remote playback daemon 2015, on the second device to request resolution of the custom URL. In response, the remote playback daemon calls the remote playback service, through call 6 shown in FIG. 21. Then in operation 2039, the remote playback service, such as remote playback service 2011 on the first device, receives the request to resolve the custom URL and calls, in call 7, the media server, such as media server 2009 on the first device to resolve the custom URL. In turn, in operation 2041, the media server 2009 receives the custom URL and calls the app, such as app 2007 (after, in one embodiment, consulting the registry to determine the appropriate app to call), in order to resolve the custom URL. The call to the app is shown as call 8 in FIG. 21. Next, in operation 2043, the app resolves the URL and returns the content of the custom URL, such as a key or a playlist or other content pointed to by the custom URL, and this content is returned to the media server on the first device and is shown as return 9 in FIG. 21. Then in operation 2045, the media server on the first device returns the content of the custom URL to the remote playback service, such as remote playback service 2011, which in turn returns the content of the URL to the remote playback daemon on the second device which then returns the content of the URL to the media server on the second device. At this point, in operation 2049, the media server on the second device can use the content of the URL, which can be a key or a playlist, to process the playback process, and this process can repeat as necessary whenever the media server 2017 encounters a custom URL. In which case, when encountering a custom URL, it will repeat the process by beginning with the call 5 shown in FIG. 21 and begin with operation 2035 in FIG. 22A which will continue through the resolution of the custom URL call, ending again with operation 2047.

It will be appreciated that in operation 2047, if the content of the URL is a key, then the key will be used by the media server on the second device to decrypt the media file and to present the media file through the output of the second device, and if the content is the playlist, the media server on the second device will use the playlist as described in the rest of this disclosure to retrieve and then decode media files specified by the playlist and to present the media file through the output of the second device. If keys within that playlist are also specified by custom URLs, then the process will again be repeated, beginning in operation 2035 and ending in operation 2047 as described above. When the first device is in the remote playback mode, the media server 2017 on the second device retrieves and processes the playlist that can be specified by the first device, and the media server 2017 retrieves and processes and decodes and presents the media files in the playlist, resulting in a presentation of media on an output of the second device.

Figure 8:
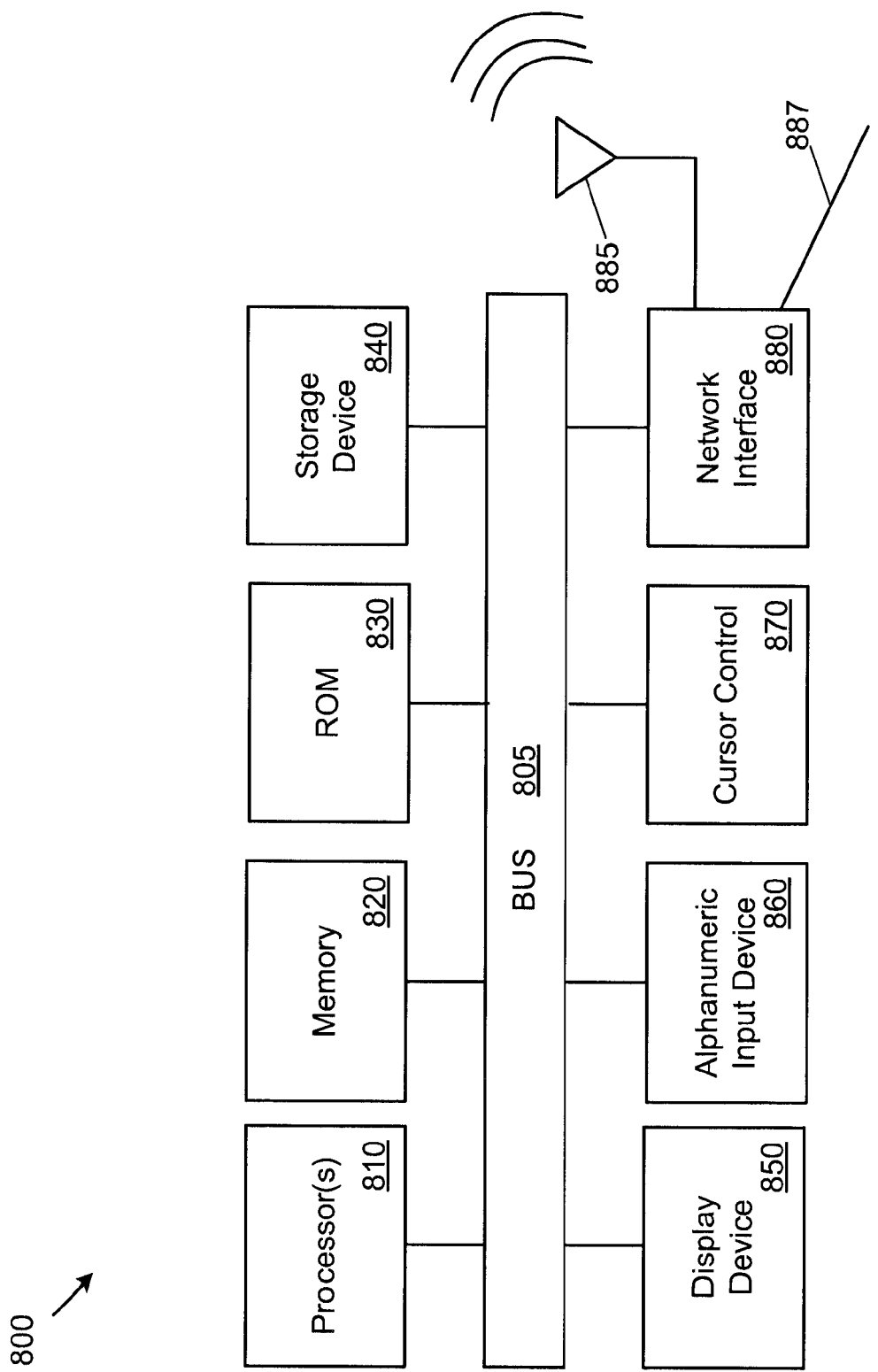
FIG. 8 is a block diagram of one embodiment of an electronic system.

FIG. 8 is a block diagram of one embodiment of an electronic system. The electronic system illustrated in FIG. 8 is intended to represent a range of electronic systems (either wired or wireless) including, for example, desktop computer systems, laptop computer systems, cellular telephones, personal digital assistants (PDAs) including cellular-enabled PDAs, set top boxes, entertainment systems or other consumer electronic devices. Alternative electronic systems may include more, fewer and/or different components. The electronic system of FIG. 8 may be used to provide the client device and/or the server device.

Electronic system 800 includes bus 805 or other communication device to communicate information, and processor 810 coupled to bus 805 that may process information. While electronic system 800 is illustrated with a single processor, electronic system 800 may include multiple processors and/or co-processors. Electronic system 800 further may include random access memory (RAM) or other dynamic storage device 820 (referred to as main memory), coupled to bus 805 and may store information and instructions that may be executed by processor 810. Main memory 820 may also be used to store temporary variables or other intermediate information during execution of instructions by processor 810.

Electronic system 800 may also include read only memory (ROM) and/or other static storage device 830 coupled to bus 805 that may store static information and instructions for processor 810. Data storage device 840 may be coupled to bus 805 to store information and instructions. Data storage device 840 such as flash memory or a magnetic disk or optical disc and corresponding drive may be coupled to electronic system 800.

Electronic system 800 may also be coupled via bus 805 to display device 850, such as a cathode ray tube (CRT) or liquid crystal display (LCD), to display information to a user. Electronic system 800 can also include an alphanumeric input device 860, including alphanumeric and other keys, which may be coupled to bus 805 to communicate information and command selections to processor 810. Another type of user input device is cursor control 870, such as a touchpad, a mouse, a trackball, or cursor direction keys to communicate direction information and command selections to processor 810 and to control cursor movement on display 850.

Electronic system 800 further may include one or more network interface(s) 880 to provide access to a network, such as a local area network. Network interface(s) 880 may include, for example, a wireless network interface having antenna 885, which may represent one or more antenna(e). Electronic system 800 can include multiple wireless network interfaces such as a combination of WiFi, Bluetooth and cellular telephony interfaces. Network interface(s) 880 may also include, for example, a wired network interface to communicate with remote devices via network cable 887, which may be, for example, an Ethernet cable, a coaxial cable, a fiber optic cable, a serial cable, or a parallel cable.

In one embodiment, network interface(s) 880 may provide access to a local area network, for example, by conforming to IEEE 802.11b and/or IEEE 802.11g standards, and/or the wireless network interface may provide access to a personal area network, for example, by conforming to Bluetooth standards. Other wireless network interfaces and/or protocols can also be supported.

In addition to, or instead of, communication via wireless LAN standards, network interface(s) 880 may provide wireless communications using, for example, Time Division, Multiple Access (TDMA) protocols, Global System for Mobile Communications (GSM) protocols, Code Division, Multiple Access (CDMA) protocols, and/or any other type of wireless communications protocol.

One or more Application Programming Interfaces (APIs) may be used in some embodiments. An API is an interface implemented by a program code component or hardware component (hereinafter "API-implementing component") that allows a different program code component or hardware component (hereinafter "API-calling component") to access and use one or more functions, methods, procedures, data structures, classes, and/or other services provided by the API-implementing component. An API can define one or more parameters that are passed between the API-calling component and the API-implementing component.

An API allows a developer of an API-calling component (which may be a third party developer) to leverage specified features provided by an API-implementing component. There may be one API-calling component or there may be more than one such component. An API can be a source code interface that a computer system or program library provides in order to support requests for services from an application. An operating system (OS) can have multiple APIs to allow applications running on the OS to call one or more of those APIs, and a service (such as a program library) can have multiple APIs to allow an application that uses the service to call one or more of those APIs. An API can be specified in terms of a programming language that can be interpreted or compiled when an application is built.

In some embodiments the API-implementing component may provide more than one API, each providing a different view of or with different aspects that access different aspects of the functionality implemented by the API-implementing component. For example, one API of an API-implementing component can provide a first set of functions and can be exposed to third party developers, and another API of the API-implementing component can be hidden (not exposed) and provide a subset of the first set of functions and also provide another set of functions, such as testing or debugging functions which are not in the first set of functions. In other embodiments the API-implementing component may itself call one or more other components via an underlying API and thus be both an API-calling component and an API-implementing component.

An API defines the language and parameters that API-calling components use when accessing and using specified features of the API-implementing component. For example, an API-calling component accesses the specified features of the API-implementing component through one or more API calls or invocations (embodied for example by function or method calls) exposed by the API and passes data and control information using parameters via the API calls or invocations. The API-implementing component may return a value through the API in response to an API call from an API-calling component. While the API defines the syntax and result of an API call (e.g., how to invoke the API call and what the API call does), the API may not reveal how the API call accomplishes the function specified by the API call. Various API calls are transferred via the one or more application programming interfaces between the calling (API-calling component) and an API-implementing component. Transferring the API calls may include issuing, initiating, invoking, calling, receiving, returning, or responding to the function calls or messages; in other words, transferring can describe actions by either of the API-calling component or the API-implementing component. The function calls or other invocations of the API may send or receive one or more parameters through a parameter list or other structure. A parameter can be a constant, key, data structure, object, object class, variable, data type, pointer, array, list or a pointer to a function or method or another way to reference a data or other item to be passed via the API.

Furthermore, data types or classes may be provided by the API and implemented by the API-implementing component. Thus, the API-calling component may declare variables, use pointers to, use or instantiate constant values of such types or classes by using definitions provided in the API.

Generally, an API can be used to access a service or data provided by the API-implementing component or to initiate performance of an operation or computation provided by the API-implementing component. By way of example, the API-implementing component and the API-calling component may each be any one of an operating system, a library, a device driver, an API, an application program, or other module (it should be understood that the API-implementing component and the API-calling component may be the same or different type of module from each other). API-implementing components may in some cases be embodied at least in part in firmware, microcode, or other hardware logic. In some embodiments, an API may allow a client program to use the services provided by a Software Development Kit (SDK) library. In other embodiments an application or other client program may use an API provided by an Application Framework. In these embodiments the application or client program may incorporate calls to functions or methods provided by the SDK and provided by the API or use data types or objects defined in the SDK and provided by the API. An Application Framework may in these embodiments provide a main event loop for a program that responds to various events defined by the Framework. The API allows the application to specify the events and the responses to the events using the Application Framework. In some implementations, an API call can report to an application the capabilities or state of a hardware device, including those related to aspects such as input capabilities and state, output capabilities and state, processing capability, power state, storage capacity and state, communications capability, etc., and the API may be implemented in part by firmware, microcode, or other low level logic that executes in part on the hardware component.

The API-calling component may be a local component (i.e., on the same data processing system as the API-implementing component) or a remote component (i.e., on a different data processing system from the API-implementing component) that communicates with the API-implementing component through the API over a network. It should be understood that an API-implementing component may also act as an API-calling component (i.e., it may make API calls to an API exposed by a different API-implementing component) and an API-calling component may also act as an API-implementing component by implementing an API that is exposed to a different API-calling component.

The API may allow multiple API-calling components written in different programming languages to communicate with the API-implementing component (thus the API may include features for translating calls and returns between the API-implementing component and the API-calling component); however the API may be implemented in terms of a specific programming language. An API-calling component can, in one embedment, call APIs from different providers such as a set of APIs from an OS provider and another set of APIs from a plug-in provider and another set of APIs from another provider (e.g. the provider of a software library) or creator of the another set of APIs.

Figure 18:
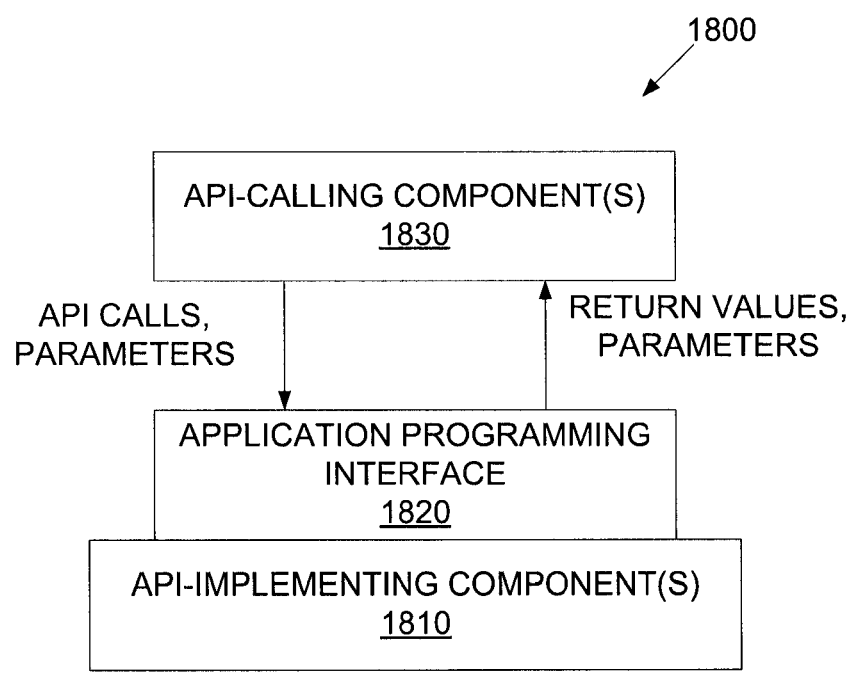
FIG. 18 illustrates a block diagram of an exemplary API architecture usable in some embodiments of the invention.

FIG. 18 is a block diagram illustrating an exemplary API architecture, which may be used in some embodiments of the invention. As shown in FIG. 18, the API architecture 1800 includes the API-implementing component 1810 (e.g., an operating system, a library, a device driver, an API, an application program, software or other module) that implements the API 1820. The API 1820 specifies one or more functions, methods, classes, objects, protocols, data structures, formats and/or other features of the API-implementing component that may be used by the API-calling component 1830. The API 1820 can specify at least one calling convention that specifies how a function in the API-implementing component receives parameters from the API-calling component and how the function returns a result to the API-calling component. The API-calling component 1830 (e.g., an operating system, a library, a device driver, an API, an application program, software or other module), makes API calls through the API 1820 to access and use the features of the API-implementing component 1810 that are specified by the API 1820. The API-implementing component 1810 may return a value through the API 1820 to the API-calling component 1830 in response to an API call.

It will be appreciated that the API-implementing component 1810 may include additional functions, methods, classes, data structures, and/or other features that are not specified through the API 1820 and are not available to the API-calling component 1830. It should be understood that the API-calling component 1830 may be on the same system as the API-implementing component 1810 or may be located remotely and accesses the API-implementing component 1810 using the API 1820 over a network. While FIG. 18 illustrates a single API-calling component 1830 interacting with the API 1820, it should be understood that other API-calling components, which may be written in different languages (or the same language) than the API-calling component 1830, may use the API 1820.

The API-implementing component 1810, the API 1820, and the API-calling component 1830 may be stored in a machine-readable non-transitory storage medium, which includes any mechanism for storing information in a form readable by a machine (e.g., a computer or other data processing system). For example, a machine-readable medium includes magnetic disks, optical disks, random access memory; read only memory, flash memory devices, etc.

Figure 19:
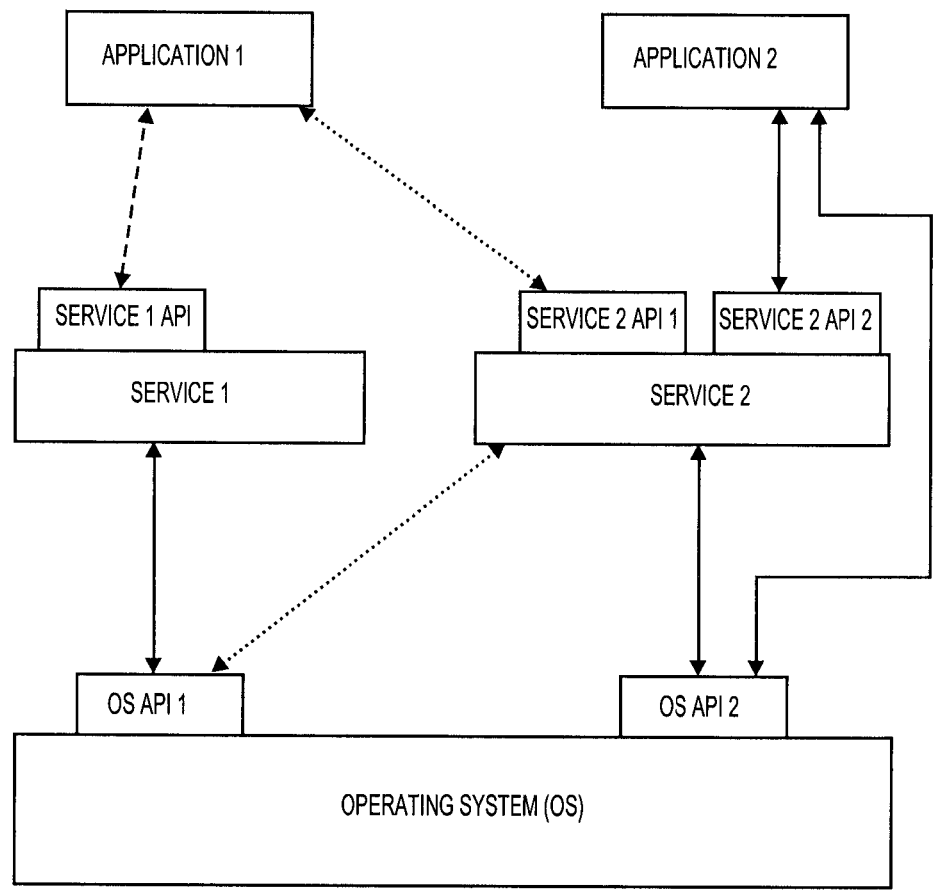
FIG. 19 shows an exemplary embodiment of a software stack usable in some embodiments of the invention.

In FIG. 19 ("Software Stack"), an exemplary embodiment, applications can make calls to Services 1 or 2 using several Service APIs and to Operating System (OS) using several OS APIs. Services 1 and 2 can make calls to OS using several OS APIs.

Note that the Service 2 has two APIs, one of which (Service 2 API 1) receives calls from and returns values to Application 1 and the other (Service 2 API 2) receives calls from and returns values to Application 2. Service 1 (which can be, for example, a software library) makes calls to and receives returned values from OS API 1, and Service 2 (which can be, for example, a software library) makes calls to and receives returned values from both OS API 1 and OS API 2. Application 2 makes calls to and receives returned values from OS API 2.

Reference in the specification to "one embodiment" or "an embodiment" means that a particular feature, structure, or characteristic described in connection with the embodiment is included in at least one embodiment of the invention. The appearances of the phrase "in one embodiment" in various places in the specification are not necessarily all referring to the same embodiment.

In the foregoing specification, the invention has been described with reference to specific embodiments thereof. It will, however, be evident that various modifications and changes can be made thereto without departing from the broader spirit and scope of the invention. The specification and drawings are, accordingly, to be regarded in an illustrative rather than a restrictive sense.

APPENDIX

The following Appendix is a draft specification of a protocol according to a particular embodiment of the invention. It will be understood that the use of certain key words (e.g. MUST, MUST NOT, SHALL, SHALL NOT, etc.) in this Appendix apply to this particular embodiment and do not apply to other embodiments described in this disclosure.

ABSTRACT

This document describes a protocol for transferring unbounded streams of multimedia data. It specifies the data format of the files and the actions to be taken by the server (sender) and the clients (receivers) of the streams. It describes version 2 of this protocol.

TABLE OF CONTENTS

1. Introduction
2. Summary
3. The Playlist file
   3.1. Introduction
   3.2. New Tags
       3.2.1. EXT-X-TARGETDURATION
       3.2.2. EXT-X-MEDIA-SEQUENCE
       3.2.3. EXT-X-KEY
       3.2.4. EXT-X-PROGRAM-DATE-TIME
       3.2.5. EXT-X-ALLOW-CACHE
       3.2.6. EXT-X-ENDLIST
       3.2.7. EXT-X-STREAM-INF
       3.2.8. EXT-X-DISCONTINUITY
       3.2.9 EXT-X-VERSION
4. Media files
5. Key files
   5.1. Introduction
   5.2. IV for AES-128
6. Client/Server Actions
   6.1. Introduction
   6.2. Server Process
   6.2.1. Introduction
   6.2.2. Sliding Window Playlists
   6.2.3. Encrypting media files
   6.2.4 Providing variant streams
   6.3. Client Process
   6.3.1. Introduction
   6.3.2. Loading the Playlist file
   6.3.3. Playing the Playlist file
   6.3.4. Reloading the Playlist file
   6.3.5. Determining the next file to load
   6.3.6. Decrypting encrypted media files
7. Protocol version compatibility
8. Examples
   8.1 Introduction
   8.2. Simple Playlist file
   8.3. Sliding Window Playlist, using HTTPS
   8.4. Playlist file with encrypted media files
   8.5. Variant Playlist file
9. Security Considerations
10. References
    Normative References
    Informative References

1. INTRODUCTION

This document describes a protocol for transferring unbounded streams of multimedia data. The protocol supports the encryption of media data and the provision of alternate versions (e.g. bitrates) of a stream. Media data can be transferred soon after it is created, allowing it to be played in near real-time. Data is usually carried over HTTP [RFC2616].

External references that describe related standards such as HTTP are listed in Section 11.

2. Summary

A multimedia presentation is specified by a URI [RFC3986] to a Playlist file, which is an ordered list of media URIs and informational tags. Each media URI refers to a media file which is a segment of a single contiguous stream.

To play the stream, the client first obtains the Playlist file and then obtains and plays each media file in the Playlist. It reloads the Playlist file as described in this document to discover additional segments.

The key words "MUST", "MUST NOT", "REQUIRED", "SHALL", "SHALL NOT", "SHOULD", "SHOULD NOT", "RECOMMENDED", "MAY", and "OPTIONAL" in this document are to be interpreted as described in RFC 2119 [RFC2119].

3. THE PLAYLIST FILE

3.1. Introduction

Playlists MUST be Extended M3U Playlist files [M3U]. This document extends the M3U file format by defining additional tags.

An M3U Playlist is a text file that consists of individual lines. Lines are terminated by either a single LF character or a CR character followed by an LF character. Each line is a URI, a blank, or starts with the comment character '#'. Blank lines are ignored. White space MUST NOT be present, except for elements in which it is explicitly specified.

A URI line identifies a media file or a variant Playlist file (see Section 3.2.7).

URIs MAY be relative. A relative URI MUST be resolved against the URI of the Playlist file that contains it.

Lines that start with the comment character '#' are either comments or tags. Tags begin with #EXT. All other lines that begin with '#' are comments and SHOULD be ignored.

The duration of a Playlist file is the sum of the durations of the media files within it.

M3U Playlist files whose names end in .m3u8 and/or have the HTTP Content-Type "application/vnd.apple.mpegurl" are encoded in UTF-8 [RFC3629]. Files whose names end with .m3u and/or have the HTTP Content-Type [RFC2616] "audio/mpegurl" are encoded in US-ASCII [US_ASCII].

Playlist files MUST have names that end in .m3u8 and/or have the Content-Type "application/vnd.apple.mpegurl" (if transferred over HTTP), or have names that end in .m3u and/or have the HTTP Content-Type type "audio/mpegurl" (for compatibility).

The Extended M3U file format defines two tags: EXTM3U and EXTINF. An Extended M3U file is distinguished from a basic M3U file by its first line, which MUST be #EXTM3U.

EXTINF is a record marker that describes the media file identified by the URI that follows it. Each media file URI MUST be preceded by an EXTINF tag. Its format is:
    #EXTINF:<duration>,<title>
"duration" is an integer that specifies the duration of the media file in seconds. Durations SHOULD be rounded to the nearest integer. The remainder of the line following the comma is the title of the media file, which is an optional human-readable informative title of the media segment.

This document defines the following new tags: EXT-X-TARGETDURATION, EXT-X-MEDIA-SEQUENCE, EXT-X-KEY, EXT-X-PROGRAM-DATE-TIME, EXT-X-ALLOW-CACHE, EXT-X-STREAM-INF, EXT-X-ENDLIST, EXT-X-DISCONTINUITY, and EXT-X-VERSION.

3.2. New Tags 3.2.1. EXT-X-TARGETDURATION

The EXT-X-TARGETDURATION tag specifies the maximum media file duration. The EXTINF duration of each media file in the Playlist file MUST be less than or equal to the target duration. This tag MUST appear once in the Playlist file. Its format is:
    #EXT-X-TARGETDURATION:<s>
where s is an integer indicating the target duration in seconds.

3.2.2. EXT-X-MEDIA-SEQUENCE

Each media file URI in a Playlist has a unique sequence number. The sequence number of a URI is equal to the sequence number of the URI that preceded it plus one. The EXT-X-MEDIA-SEQUENCE tag indicates the sequence number of the first URI that appears in a Playlist file. Its format is:
    #EXT-X-MEDIA-SEQUENCE:<number>
A Playlist file MUST NOT contain more than one EXT-X-MEDIA-SEQUENCE tag. If the Playlist file does not contain an EXT-X-MEDIA-SEQUENCE tag then the sequence number of the first URI in the playlist SHALL be considered to be 0.

A media file's sequence number is not required to appear in its URI.

See Section 6.3.2 and Section 6.3.5 for information on handling the EXT-X-MEDIA-SEQUENCE tag.

3.2.3. EXT-X-KEY

Media files MAY be encrypted. The EXT-X-KEY tag provides information necessary to decrypt media files that follow it. Its format is:
    #EXT-X-KEY:METHOD=<method>[,URI="<URI>"][,IV=<IV>]
The METHOD attribute specifies the encryption method. Two encryption methods are defined: NONE and AES-128.

An encryption method of NONE means that media files are not encrypted. If the encryption method is NONE, the URI and the IV attributes MUST NOT be present.

An encryption method of AES-128 means that media files are encrypted using the Advanced Encryption Standard [AES_128] with a 128-bit key and PKCS7 padding [RFC5652]. If the encryption method is AES-128, the URI attribute MUST be present. The IV attribute MAY be present; see Section 5.2.

The URI attribute, if present, specifies how to obtain the key. The IV attribute, if present, specifies the Initialization Vector to be used with the key. The IV attribute appeared in protocol version 2.

A new EXT-X-KEY supersedes any prior EXT-X-KEY.

If the Playlist file does not contain an EXT-X-KEY tag then media files are not encrypted.

See Section 5 for the format of the key file, and Section 5.2, Section 6.2.3 and Section 6.3.6 for additional information on media file encryption.

3.2.4. EXT-X-PROGRAM-DATE-TIME

The EXT-X-PROGRAM-DATE-TIME tag associates the beginning of the next media file with an absolute date and/or time. The date/time representation is ISO/IEC 8601:2004 [ISO_8601] and SHOULD indicate a time zone. For example:

EXT-X-PROGRAM-DATE-TIME:<YYYY-MM-DDThh:mm:ssZ>

See Section 6.2.1 and Section 6.3.3 for more information on the EXT-X-PROGRAM-DATE-TIME tag.

3.2.5. EXT-X-ALLOW-CACHE

The EXT-X-ALLOW-CACHE tag indicates whether the client MAY or MUST NOT cache downloaded media files for later replay. It MAY occur anywhere in the Playlist file; it MUST NOT occur more than once. Its format is:

EXT-X-ALLOW-CACHE:<YES|NO>

See Section 6.3.3 for more information on the EXT-X-ALLOW-CACHE tag.

3.2.6. EXT-X-ENDLIST

The EXT-X-ENDLIST tag indicates that no more media files will be added to the Playlist file. It MAY occur anywhere in the Playlist file; it MUST NOT occur more than once. Its format is:

EXT-X-ENDLIST 3.2.7. EXT-X-STREAM-INF

The EXT-X-STREAM-INF tag indicates that the next URI in the Playlist file identifies another Playlist file. Its format is:

EXT-X-STREAM-INF:[attribute=value]
[,attribute=value]*
<URI>

An attribute MUST NOT occur more than once in the same EXT-X-STREAM-INF tag. The following attributes are defined:

BANDWIDTH=<n> where n is a number of bits per second. It MUST be an upper bound of the overall bitrate of each media file, calculated to include container overhead, that appears or will appear in the Playlist.

PROGRAM-ID=<i> where i is a number that uniquely identifies a particular presentation within the scope of the Playlist file.

A Playlist file MAY contain multiple EXT-X-STREAM-INF tags with the same PROGRAM-ID to identify different encodings of the same presentation. These variant playlists MAY contain additional EXT-X-STREAM-INF tags.

CODECS="[format] [,format]*"

where each format specifies a media sample type that is present in a media file in the Playlist file.

Valid format identifiers are those in the ISO File Format Name Space defined by RFC 4281 [RFC4281].

RESOLUTION=<N>x<M> where N is the approximate encoded horizontal resolution of video within the stream, expressed as a number of pixels, and M is the approximate encoded vertical resolution.

3.2.8. EXT-X-DISCONTINUITY

The EXT-X-DISCONTINUITY tag indicates an encoding discontinuity between the media file that follows it and the one that preceded it. The set of characteristics that MAY change is:

file format
number and type of tracks
encoding parameters
encoding sequence
timestamp sequence Its format is:

EXT-X-DISCONTINUITY

See Section 4, Section 6.2.1, and Section 6.3.3 for more information about the EXT-X-DISCONTINUITY tag.

3.2.9. EXT-X-VERSION

The EXT-X-VERSION tag indicates the compatibility version of the Playlist file. The Playlist file, its associated media, and its server MUST comply with all provisions of the most-recent version of this document describing the protocol version indicated by the tag value.

Its format is:

EXT-X-VERSION:<n> where n is an integer indicating the protocol version.

A Playlist file MUST NOT contain more than one EXT-X-VERSION tag. A Playlist file that does not contain an EXT-X-VERSION tag MUST comply with version 1 of this protocol.

4. MEDIA FILES

Each media file URI in a Playlist file MUST identify a media file which is a segment of the overall presentation. Each media file MUST be formatted as an MPEG-2 Transport Stream or an MPEG-2 audio elementary stream [ISO_13818].

Transport Stream files MUST contain a single MPEG-2 Program. There SHOULD be a Program Association Table and a Program Map Table at the start of each file. A file that contains video SHOULD have at least one key frame and enough information to completely initialize a video decoder.

A media file in a Playlist MUST be the continuation of the encoded stream at the end of the media file with the previous sequence number unless it was the first media file to appear in the Playlist file or if it is preceded by an EXT-X-DISCONTINUITY tag.

Clients SHOULD be prepared to handle multiple tracks of a particular type (e.g. audio or video). A client with no other preference SHOULD choose the one with the lowest numerical PID that it can play. Clients MUST ignore private streams inside Transport Streams that they do not recognize.

The encoding parameters for samples within a stream inside a media file and between corresponding streams across multiple media files SHOULD remain consistent. However clients SHOULD deal with encoding changes as they are encountered, for example by scaling video content to accommodate a resolution change.

5. KEY FILES

5.1. Introduction

An EXT-X-KEY tag with the URI attribute identifies a Key file. A Key file contains the cipher key that MUST be used to decrypt subsequent media files in the Playlist.

The AES-128 encryption method uses 16-octet keys. The format of the Key file is simply a packed array of these 16 octets in binary format.

5.2. IV for AES-128

128-bit AES requires the same 16-octet Initialization Vector (IV) to be supplied when encrypting and decrypting. Varying this IV increases the strength of the cipher.

If the EXT-X-KEY tag has the IV attribute, implementations MUST use the attribute value as the IV when encrypting or decrypting with that key. The value MUST be interpreted as a 128-bit hexadecimal number and MUST be prefixed with 0x or 0X.

If the EXT-X-KEY tag does not have the IV attribute, implementations MUST use the sequence number of the media file as the IV when encrypting or decrypting that media file. The big-endian binary representation of the sequence number SHALL be placed in a 16-octet buffer and padded (on the left) with zeros.

6. CLIENT/SERVER ACTIONS

6.1. Introduction

This section describes how the server generates the Playlist and media files and how the client should download and play them.

6.2. Server Process

6.2.1. Introduction

The production of the MPEG-2 stream is outside the scope of this document, which simply presumes a source of a continuous stream containing the presentation.

The server MUST divide the stream into individual media files whose duration is approximately equal. The server SHOULD attempt to divide the stream at points that support effective decode of individual media files, e.g. on packet and key frame boundaries.

The server MUST create a URI for each media file that will allow its clients to obtain the file.

The server MUST create a Playlist file. The Playlist file MUST conform to the format described in Section 3. A URI for each media file that the server wishes to make available MUST appear in the Playlist in the order in which it is to be played. The entire media file MUST be available to clients if its URI is in the Playlist file.

The Playlist file MUST contain an EXT-X-TARGETDURATION tag. It MUST indicate the maximum EXTINF value of any media file added to the Playlist file. Its value MUST remain constant for the entire presentation. A typical target duration is 10 seconds.

The Playlist file SHOULD contain one EXT-X-VERSION tag which indicates the compatibility version of the stream. Its value SHOULD be the lowest protocol version with which the server, Playlist file, and associated media files all comply.

The server MUST create a URI for the Playlist file that will allow its clients to obtain the file.

If the Playlist file is distributed by HTTP, the server SHOULD support client requests to use the "gzip" Content-Encoding.

Changes to the Playlist file MUST be made atomically from the point of view of the clients.

Every media file URI in a Playlist MUST be prefixed with an EXTINF tag indicating the rounded duration of the media file.

The server MAY associate an absolute date and time with a media file by prefixing its URI with an EXT-X-PROGRAM-DATE-TIME tag. The value of the date and time provides an informative mapping of the timeline of the media to an appropriate wall-clock time, which may be used as a basis for seeking, for display, or for other purposes. If a server provides this mapping, it SHOULD place an EXT-X-PROGRAM-DATE-TIME tag after every EXT-X-DISCONTINUITY tag in the Playlist file.

If the Playlist contains the final media file of the presentation then the Playlist file MUST contain the EXT-X-ENDLIST tag.

If the Playlist does not contain the EXT-X-ENDLIST tag, the server MUST make a new version of the Playlist file available that contains at least one new media file URI. It MUST be made available relative to the time that the previous version of the Playlist file was made available: no earlier than one-half the target duration after that time, and no later than 1.5 times the target duration after that time.

If the server wishes to remove an entire presentation, it MUST make the Playlist file unavailable to clients. It SHOULD ensure that all media files in the Playlist file remain available to clients for at least the duration of the Playlist file at the time of removal.

6.2.2. Sliding Window Playlists

The server MAY limit the availability of media files to those which have been most recently added to the Playlist. To do so the Playlist file MUST ALWAYS contain exactly one EXT-X-MEDIA-SEQUENCE tag. Its value MUST be incremented by 1 for every media file URI that is removed from the Playlist file.

Media file URIs MUST be removed from the Playlist file in the order in which they were added.

When the server removes a media file URI from the Playlist, the media file SHOULD remain available to clients for a period of time equal to the duration of the media file plus the duration of the longest Playlist file in which the media file has appeared.

If a server plans to remove a media file after it is delivered to clients over HTTP, it SHOULD ensure that the HTTP response contains an Expires header that reflects the planned time-to-live.

The duration of a Playlist file that does not contain the EXT-X-ENDLIST tag MUST be at least three times the target duration.

6.2.3. Encrypting Media Files

If media files are to be encrypted the server MUST define a URI which will allow authorized clients to obtain a Key file containing a decryption key. The Key file MUST conform to the format described in Section 5.

The server MAY set the HTTP Expires header in the key response to indicate that the key may be cached.

If the encryption METHOD is AES-128, AES-128 CBC encryption SHALL be applied to individual media files. The entire file MUST be encrypted. Cipher Block Chaining MUST NOT be applied across media files. The IV used for encryption MUST be either the sequence number of the media file or the value of the IV attribute of the EXT-X-KEY tag, as described in Section 5.2.

The server MUST encrypt every media file in a Playlist using the method and other attributes specified by the EXT-X-KEY tag that most immediately precedes its URI in the Playlist file. Media files preceded by an EXT-X-KEY tag whose METHOD is NONE, or not preceded by any EXT-X-KEY tag, MUST NOT be encrypted.

The server MUST NOT remove an EXT-X-KEY tag from the Playlist file if the Playlist file contains a URI to a media file encrypted with that key.

6.2.4. Providing Variant Streams

A server MAY offer multiple Playlist files to provide different encodings of the same presentation. If it does so it SHOULD provide a variant Playlist file that lists each variant stream to allow clients to switch between encodings dynamically.

Variant Playlists MUST contain an EXT-X-STREAM-INF tag for each variant stream. Each EXT-X-STREAM-INF tag for the same presentation MUST have the same PROGRAM- ID attribute value. The PROGRAM-ID value for each presentation MUST be unique within the variant Playlist.

If an EXT-X-STREAM-INF tag contains the CODECS attribute, the attribute value MUST include every format defined by [RFC4281] that is present in any media file that appears or will appear in the Playlist file.

The server MUST meet the following constraints when producing variant streams:

Each variant stream MUST present the same content, including stream discontinuities.

Each variant Playlist file MUST have the same target duration.

Content that appears in one variant Playlist file but not in another MUST appear either at the beginning or at the end of the Playlist file and MUST NOT be longer than the target duration.

Matching content in variant streams MUST have matching timestamps. This allows clients to synchronize the streams.

Elementary Audio Stream files MUST signal the timestamp of the first sample in the file by prepending an ID3 PRIV tag [ID3] with an owner identifier of "com.apple.streaming.transportStreamTimestamp". The binary data MUST be a 33-bit MPEG-2 Program Elementary Stream timestamp expressed as a big-endian eight-octet number.

In addition, all variant streams SHOULD contain the same encoded audio bitstream. This allows clients to switch between streams without audible glitching.

6.3. Client Process

6.3.1. Introduction

How the client obtains the URI to the Playlist file is outside the scope of this document; it is presumed to have done so.

The client MUST obtain the Playlist file from the URI. If the Playlist file so obtained is a variant Playlist, the client MUST obtain the Playlist file from the variant Playlist.

This document does not specify the treatment of variant streams by clients.

6.3.2. Loading the Playlist File

Every time a Playlist file is loaded or reloaded from the Playlist URI:

The client MUST ensure that the Playlist file begins with the EXTM3U tag and that the EXT-X-VERSION tag, if present, specifies a protocol version supported by the client; if not, the client MUST NOT attempt to use the Playlist.

The client SHOULD ignore any tags and attributes it does not recognize.

The client MUST determine the next media file to load as described in Section 6.3.5.

If the Playlist contains the EXT-X-MEDIA-SEQUENCE tag, the client SHOULD assume that each media file in it will become unavailable at the time that the Playlist file was loaded plus the duration of the Playlist file. The duration of a Playlist file is the sum of the durations of the media files within it.

6.3.3. Playing the Playlist File

The client SHALL choose which media file to play first from the Playlist when playback starts. If the EXT-X-ENDLIST tag is not present and the client intends to play the media regularly (i.e. in playlist order at the nominal playback rate), the client SHOULD NOT choose a file which starts less than three target durations from the end of the Playlist file. Doing so can trigger playback stalls.

To achieve regular playback, media files MUST be played in the order that they appear in the Playlist file. The client MAY present the available media in any way it wishes, including regular playback, random access, and trick modes.

The client MUST be prepared to reset its parser(s) and decoder(s) before playing a media file that is preceded by an EXT-X-DISCONTINUITY tag.

The client SHOULD attempt to load media files in advance of when they will be required for uninterrupted playback to compensate for temporary variations in latency and throughput.

If the Playlist file contains the EXT-X-ALLOW-CACHE tag and its value is NO, the client MUST NOT cache downloaded media files after they have been played. Otherwise the client MAY cache downloaded media files indefinitely for later replay.

The client MAY use the value of the EXT-X-PROGRAM-DATE-TIME tag to display the program origination time to the user. If the value includes time zone information the client SHALL take it into account, but if it does not the client MUST NOT infer an originating time zone.

The client MUST NOT depend upon the correctness or the consistency of the value of the EXT-X-PROGRAM-DATE-TIME tag.

6.3.4. Reloading the Playlist File

The client MUST periodically reload the Playlist file unless it contains the EXT-X-ENDLIST tag.

However the client MUST NOT attempt to reload the Playlist file more frequently than specified by this section.

When a client loads a Playlist file for the first time or reloads a Playlist file and finds that it has changed since the last time it was loaded, the client MUST wait for a period of time before attempting to reload the Playlist file again. This period is called the initial minimum reload delay. It is measured from the time that the client began loading the Playlist file.

The initial minimum reload delay is the duration of the last media file in the Playlist. Media file duration is specified by the EXTINF tag.

If the client reloads a Playlist file and finds that it has not changed then it MUST wait for a period of time before retrying. The minimum delay is a multiple of the target duration. This multiple is 0.5 for the first attempt, 1.5 for the second, and 3.0 thereafter.

6.3.5. Determining the Next File to Load

The client MUST examine the Playlist file every time it is loaded or reloaded to determine the next media file to load.

The first file to load MUST be the file that the client has chosen to play first, as described in Section 6.3.3.

If the first file to be played has been loaded and the Playlist file does not contain the EXT-X-MEDIA-SEQUENCE tag then the client MUST verify that the current Playlist file contains the URI of the last loaded media file at the offset it was originally found at, halting playback if it does not. The next media file to load MUST be the first media file URI following the last-loaded URI in the Playlist.

If the first file to be played has been loaded and the Playlist file contains the EXT-X-MEDIA-SEQUENCE tag then the next media file to load SHALL be the one with the lowest sequence number that is greater than the sequence number of the last media file loaded.

6.3.6. Decrypting Encrypted Media Files

If a Playlist file contains an EXT-X-KEY tag that specifies a Key file URI, the client MUST obtain that key file and use the key inside it to decrypt all media files following the EXT-X-KEY tag until another EXT-X-KEY tag is encountered.

If the encryption METHOD is AES-128, AES-128 CBC decryption SHALL be applied to individual media files. The entire file MUST be decrypted. Cipher Block Chaining MUST NOT be applied across media files. The IV used for decryption MUST be either the sequence number of the media file or the value of the IV attribute of the EXT-X-KEY tag, as described in Section 5.2.

If the encryption METHOD is NONE, the client MUST treat all media files following the EXT-X-KEY tag as cleartext (not encrypted) until another EXT-X-KEY tag is encountered.

7. PROTOCOL VERSION COMPATIBILITY

Clients and servers MUST implement protocol version 2 or higher to use:
The IV attribute of the EXT-X-KEY tag.

8. EXAMPLES

8.1. Introduction

This section contains several example Playlist files.

8.2. Simple Playlist File

EXTM3U
EXT-X-TARGETDURATION:5220
EXTINF:5220,
http://media.example.com/entire.ts
EXT-X-ENDLIST

8.3. Sliding Window Playlist, Using HTTPS

EXTM3U
EXT-X-TARGETDURATION:8
EXT-X-MEDIA-SEQUENCE:2680
EXTINF:8,
https://priv.example.com/fileSequence2680.ts
EXTINF:8,
https://priv.example.com/fileSequence2681.ts
EXTINF:8,
https://priv.example.com/fileSequence2682.ts

8.4. Playlist File with Encrypted Media Files

EXTM3U
EXT-X-MEDIA-SEQUENCE:7794
EXT-X-TARGETDURATION:15
EXT-X-KEY:METHOD=AES-128,URI="https://priv.example.com/key.php?r=52"
EXTINF:15,
http://media.example.com/fileSequence52-1.ts
EXTINF:15,
http://media.example.com/fileSequence52-2.ts
EXTINF:15,
http://media.example.com/fileSequence52-3.ts
EXT-X-KEY:METHOD=AES-128,URI="https://priv.example.com/key.php?r=53"
EXTINF:15,
http://media.example.com/fileSequence53-1.ts

8.5. Variant Playlist File

EXTM3U
EXT-X-STREAM-INF:PROGRAM-ID=1,BANDWIDTH=1280000
http://example.com/low.m3u8
EXT-X-STREAM-INF:PROGRAM-ID=1,BANDWIDTH=2560000
http://example.com/mid.m3u8
EXT-X-STREAM-INF:PROGRAM-ID=1,BANDWIDTH=7680000
http://example.com/hi.m3u8
EXT-X-STREAM-INF:PROGRAM-ID=1,BANDWIDTH=65000,CODECS="mp4a.40.5"
http://example.com/audio-only.m3u8

9. Security Considerations

Since the protocol generally uses HTTP to transfer data, most of the same security considerations apply. See section 15 of RFC 2616 [RFC2616].

Media file parsers are typically subject to "fuzzing" attacks. Clients SHOULD take care when parsing files received from a server so that non-compliant files are rejected.

Playlist files contain URIs, which clients will use to make network requests of arbitrary entities. Clients SHOULD range-check responses to prevent buffer overflows. See also the Security Considerations section of RFC 3986 [RFC3986].

Clients SHOULD load resources identified by URI lazily to avoid contributing to denial-of-service attacks.

HTTP requests often include session state ("cookies"), which may contain private user data. Implementations MUST follow cookie restriction and expiry rules specified by RFC 2965 [RFC2965]. See also the Security Considerations section of RFC 2965, and RFC 2964 [RFC2964].

Encryption keys are specified by URI. The delivery of these keys SHOULD be secured by a mechanism such as HTTP over TLS [RFC5246] (formerly SSL) in conjunction with a secure realm or a session cookie.

10. REFERENCES

Normative References

[AES_128] U.S. Department of Commerce/National Institute of Standards and Technology, "Advanced Encryption Standard (AES), FIPS PUB 197", November 2001, <http://csrc.nist.gov/publications/fips/fipsl97/fips-197.pdf <http://csrc.nist.gov/publications/fips/fips197/fips-197.pdf>>.

[ISO_13818] International Organization for Standardization, "ISO/IEC International Standard 13818; Generic coding of moving pictures and associated audio information", October 2007, <http://www.iso.org/iso/catalogue_detail?csnumber=44169>.

[ISO_8601] International Organization for Standardization, "ISO/IEC International Standard 8601:2004; Data elements and interchange formats—Information interchange—Representation of dates and times", December 2004, <http://www.iso.org/iso/catalogue_detail?csnumber=40874>.

[RFC2046] Freed, N. and N. Borenstein, "Multipurpose Internet Mail Extensions (MIME) Part Two: Media Types", RFC 2046, November 1996.

[RFC2119] Bradner, S., "Key words for use in RFCs to Indicate Requirement Levels", BCP 14, RFC 2119, March 1997.

[RFC2616] Fielding, R., Gettys, J., Mogul, J., Frystyk, H., Masinter, L., Leach, P., and T. Berners-Lee, "Hypertext Transfer Protocol—HTTP/1.1", RFC 2616, June 1999.

[RFC2964] Moore, K. and N. Freed, "Use of HTTP State Management", BCP 44, RFC 2964, October 2000.

[RFC2965] Kristol, D. and L. Montulli, "HTTP State Management Mechanism", RFC 2965, October 2000.

[RFC3629] Yergeau, F., "UTF-8, a transformation format of ISO 10646", STD 63, RFC 3629, November 2003.

[RFC3986] Berners-Lee, T., Fielding, R., and L. Masinter, "Uniform Resource Identifier (URI): Generic Syntax", STD 66, RFC 3986, January 2005.

[RFC4281] Gellens, R., Singer, D., and P. Frojdh, "The Codecs Parameter for "Bucket" Media Types", RFC 4281, November 2005.

[RFC5246] Dierks, T. and E. Rescorla, "The Transport Layer Security (TLS) Protocol Version 1.2", RFC 5246, August 2008.

[RFC5652] Housley, R., "Cryptographic Message Syntax (CMS)", RFC 5652, September 2009.

[US_ASCII] American National Standards Institute, "ANSI X3.4-1986, Information Systems—Coded Character Sets 7-Bit American National Standard Code for Information Interchange (7-Bit ASCII)", December 1986.

12.2. Informative References

[ID3] ID3.org <http://ID3.org>, "The ID3 audio file data tagging format", <http://www.id3.org/Developer_Information>.

[M3U] Nullsoft, Inc., "The M3U Playlist format, originally invented for the Winamp media player", <http://wikipedia.org/wiki/M3U>.

What is claimed is:

1. A machine readable non-transitory storage medium storing executable instructions that when executed by a data processing system cause the system to perform a method comprising:
executing a user application on a client device to present content of media files on the client device, to control access to content of the media files for presentation by the user application, and to retrieve a decryption key from a media source remote from the client device; and
running a media serving process on the client device remote from the media source as a different software process separate from the user application, to retrieve a playlist specifying the media files and the media source at which the media files are available, to retrieve the decryption key from the user application, to retrieve the media files from the media source, to decode the retrieved media files using the decryption key, and to provide decoded content from the media files to the user application, wherein access to the content of the media files is controlled by a key processed by, or retrieved by and processed by, the user application and transmitted to the media serving process, and when the user application retrieves the key, the retrieving of the key is independent of the media serving process retrieving the media files and wherein the user application provides a user interface to control the presentation and communicates with the media serving process through an Application Programming Interface (API) and wherein the media serving process retrieves the playlist from the user application or from the media source.

2. The medium as in claim 1, wherein the media serving process and the user application share the same privileges with respect to memory control, memory space, memory allocation, filesystem control, and network control.

3. The medium as in claim 2 wherein the user application processes the decryption key used by the media serving process to decode the retrieved media files.

4. The medium as in claim 2 wherein the user application installs a client certificate which is used to answer a server challenge when a connection is made to download the decryption key.

5. The medium as in claim 2 wherein the playlist contains URLs for decryption keys, wherein the URLs use a custom URL scheme.

6. The medium as in claim 1 wherein the media serving process calls, through the API, the user application when the media serving process fails to load or decode a media file so that the user application retrieves one or more keys which are returned to the media serving process.

7. The medium as in claim 1 wherein the user application processes the decryption key used by the media serving process to decode retrieved media files.

8. The medium as in claim 7 wherein the user application installs a client certificate which is used to answer a server challenge when a connection is made to download the decryption key.

9. The medium as in claim 8 wherein the playlist contains URLs for decryption keys, wherein the URLs use a custom URL scheme.

10. A machine implemented method performed by a data processing system, the method comprising:
executing a user application on a client device to present content of media files on the client device, to control access to content of the media files for presentation by the user application, and to retrieve a decryption key from a media source remote from the client device; and
running a media serving process on the client device remote from the media source as a different software process separate from the user application, to retrieve a playlist specifying the media files and the media source at which the media files are available, to retrieve the decryption key from the user application, to retrieve the media files from the media source, to decode the retrieved media files using the decryption key, and to provide decoded content from the media files to the user application, wherein access to the content of the media files is controlled by a key processed by, or retrieved by and processed by, the user application and transmitted to the media serving process, and when the user application retrieves the key, the retrieving of the key is independent of the media serving process retrieving the media files and wherein the user application provides a user interface to control the presentation and communicates with the media serving process through an Application Programming Interface (API) and wherein the media serving process retrieves the playlist from the user application or from the media source.

11. The method as in claim 10, wherein the media serving process and the user application share the same privileges with respect to memory control, memory space, memory allocation, filesystem control, and network control.

12. The method as in claim 11 wherein the user application processes the decryption key used by the media serving process to decode the retrieved media files.

13. The method as in claim 11 wherein the user application installs a client certificate which is used to answer a server challenge when a connection is made to download the decryption key.

14. The method as in claim 11 wherein the playlist contains URLs for decryption keys, wherein the URLs use a custom URL scheme.

15. The method as in claim 10 wherein the user application processes the decryption key used by the media serving process to decode the retrieved media files, wherein the user application installs a client certificate which is used to answer a server challenge when a connection is made to download the decryption key, and wherein the playlist contains URLs for decryption keys that are retrieved through a custom URL scheme.

16. A data processing system comprising:
means for executing a user application on a client device to present content of media files on the client device, to control access to content of the media files for presentation by the user application, and to retrieve a decryption key from a media source remote from the client device; and
means for running a media serving process on the client device remote from the media source as a different software process separate from the user application, to retrieve a playlist specifying the media files and the media source at which the media files are available, to retrieve the decryption key from the user application, to retrieve the media files from the media source, to decode the retrieved media files using the decryption key, and to provide decoded content from the media files to the user application, wherein access to the content of the media files is controlled by a key processed by, or retrieved by and processed by, the user application and transmitted to the media serving process, and when the user application retrieves the key, the retrieving of the key is independent of the media serving process retrieving the media files and wherein the user application provides a user interface to control the presentation and communicates with the media serving process through an Application Programming Interface (API) and wherein the media serving process retrieves the playlist from the user application or from the media source.

17. The system as in claim 16, wherein the media serving process and the user application share the same privileges with respect to memory control, memory space, memory allocation, filesystem control, and network control.

18. A machine readable non-transitory storage medium storing executable instructions that when executed by a data processing system cause the system to perform a method comprising:
executing a user application on a client device to present content of media files on the client device through a user interface provided by the user application and to control access to content of the media files for presentation by the user application; and
running a media server process on the client device remote from a media source as a different software process separate from the user application, to retrieve a playlist specifying the media files and the media source at which the media files are available, to retrieve the media files from the media source, and to decode the retrieved media files;

receiving, by the media server process, a URL in the playlist, which URL refers to data to be used by the media server process to decode at least one of the media files;
calling, by the media server process through an Application Programming Interface (API), the user application to process the URL to obtain the data to be used by the media server process;
receiving, by the media server process, the data in response to the user application processing the URL to obtain the data;
decoding, by the media server process, at least one of the media files using the data; and
providing, by the media server process, the decoded at least one of the media files to the user application, wherein access to the content of the media files is controlled by a key processed by, or retrieved and processed by, the user application and transmitted to the media server process, and when the user application retrieves the key, the retrieving of the key is independent of the media server process retrieving the media files.

19. The medium as in claim 18 wherein the data is a decryption key.

20. The medium as in claim 19 wherein the user application uses a custom URL to protect content provided through the user application.

21. The medium as in claim 20 wherein a registry stores a relationship between the custom URL and the user application, and wherein the media server process checks the registry to call the user application when the media server process is unable to decode a media file.

22. The medium as in claim 21 wherein the custom URL is specified by an EXT-X-KEY tag.

23. The medium as in claim 21 wherein the user application is authorized by a provider of the media files.

24. The medium as in claim 20 wherein the user application installs, into a registry, a relationship between a custom URL, which is used to retrieve one or more decryption keys for the media files, and the user application, and wherein the user application installs the relationship into the registry when the user application is first installed or first launched.

25. The medium as in claim 24 wherein the relationship points the media server process to the user application which uses the custom URL.

26. The medium as in claim 20 wherein the custom URL is not supported by the media server process.

27. The medium as in claim 20 wherein the custom URL is used to retrieve the decryption key which is used by the media server process to decode the media files in the playlist.

28. The medium as in claim 27 wherein a resolution of the custom URL by the user application depends upon at least one of (a) the user application's level of privilege relative to content in the media files; (b) the content in the media files; and (c) a date or time or both of the request to present the content in the media files.

29. The medium as in claim 28 wherein the decryption key is returned to the media server process through the user application.

30. A machine readable non-transitory storage medium storing executable instructions that when executed by a data processing system cause the system to perform a method comprising:
executing a user application on a client device remote from a media server, the user application being configured to control access to content of the media files for presentation by the user application and to present content of media files on the client device through a user interface of the user application;

running a media server process on the client device remote from the media server as a different software process separate from the user application, to retrieve a playlist specifying the media files and the media source at which the media files are available;

receiving, by the media server process, a URL in or for the playlist, which URL refers to data to be used to process at least one of the media files;

calling, by the media server process, the user application to process the URL to obtain the data to be used by the remote media server;

receiving, by the media server process, the data in response to the user application processing the URL to obtain the data, wherein access to the content of the media files is controlled by the data to be used to process the at least one of the media files, the data processed by, or retrieved and processed by, the user application and transmitted to the media server process, and when the user application retrieves the data, the retrieving of the data is independent of the media server process retrieving the media files and wherein the user application communicates with the media server process through an Application Programming Interface (API) and wherein the media server process retrieves the playlist from the user application or from the media server; and transmitting the data to the remote media server.

31. The medium as in claim 30 wherein the URL is a custom URL for one of the playlist or a decryption key for at least one media file in the playlist and wherein the user application uses the custom URL to protect content provided through the user application.

32. The medium as in claim 30 wherein a registry stores a relationship between the custom URL and the user application, and wherein the media server process examines the registry to call the user application when the remote media server is unable to process the URL.

33. The medium as in claim 32 wherein the remote media server is part of a set top box and is configured to retrieve and process a playlist and is configured to produce a message, which is transmitted back to the media server process, to request a resolution of the custom URL and wherein the transmitting of the data to the remote media server provides the resolution of the custom URL.

34. A method of presenting media files on a client device and controlling access by the client device to content of the media files, the method comprising:

sending a playlist and a key, by a user application running on the client device, to a media serving process running on the client device, wherein the playlist comprises one or more URIs each identifying a media file containing media content, and wherein the key controls access to the content of the media files;

requesting from the media source, by the media serving process, one or more media files using the one or more URIs in the playlist file;

receiving from the media source, by the media serving process, the one or more media files;

accessing, by the media serving process, the content of the one or more media files received from the media source;

requesting, by the media serving process, a new key from the user application to access the content of the one or more media files, when accessing of the content of the one or more media files fails, and:

retrieving, by the user application, a new key to access the one or more media files;

sending, by the user application, the new key to the media serving process;

accessing, by the media serving process, the content of the one or more media files using the new key; and sending, by the media serving process, the content of the one or more media files to the user application for presentation on the client device by the user application.

35. The medium of claim 5 wherein at least one URL for a decryption key comprises a parameter specifying an initialization value for decryption.

36. The method of claim 14 wherein at least one URL for a decryption key comprises a parameter specifying an initialization value for decryption.

37. The medium of claim 22 wherein the custom URL comprises a parameter specifying an initialization value for decryption.

38. The medium of claim 31 wherein the URL is a custom URL for a decryption key and the URL comprises a parameter specifying an initialization value from decryption.

* * * * *